(12) United States Patent
Morioka et al.

(10) Patent No.: US 9,223,098 B2
(45) Date of Patent: Dec. 29, 2015

(54) LENS ARRAY AND OPTICAL MODULE INCLUDING THE SAME

(75) Inventors: Shimpei Morioka, Kawaguchi (JP);
Tadanobu Niimi, Kawaguchi (JP);
Kazutaka Shibuya, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 363 days.

(21) Appl. No.: 13/990,361

(22) PCT Filed: Dec. 8, 2011

(86) PCT No.: PCT/JP2011/078474
§ 371 (c)(1),
(2), (4) Date: May 29, 2013

(87) PCT Pub. No.: WO2012/086429
PCT Pub. Date: Jun. 28, 2012

(65) Prior Publication Data
US 2013/0266260 A1     Oct. 10, 2013

(30) Foreign Application Priority Data
Dec. 21, 2010   (JP) .................................. 2010-284718

(51) Int. Cl.
*G02B 6/42*   (2006.01)
*G02B 6/32*   (2006.01)

(52) U.S. Cl.
CPC ............... *G02B 6/42* (2013.01); *G02B 6/4214* (2013.01); *G02B 6/4249* (2013.01); *G02B 6/325* (2013.01); *G02B 6/4246* (2013.01); *G02B 6/4286* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 6,385,374 | B2 * | 5/2002 | Kropp .............................. | 385/47 |
| 6,636,540 | B2 * | 10/2003 | Uebbing ......................... | 372/36 |
| 8,283,678 | B2 * | 10/2012 | Morioka ......................... | 257/82 |
| 8,737,784 | B2 * | 5/2014 | Kawai ............................. | 385/47 |
| 8,787,714 | B2 * | 7/2014 | Morioka ......................... | 385/33 |

(Continued)

FOREIGN PATENT DOCUMENTS

| | | |
|---|---|---|
| JP | 2004-085913 A | 3/2004 |
| JP | 2006-344915 A | 12/2006 |

(Continued)

*Primary Examiner* — Rhonda Peace
(74) *Attorney, Agent, or Firm* — Law Office of Katsuhiro Arai

(57) ABSTRACT

A lens array satisfies $a+b+d_1+e+\Delta L \leq W_1$ where:
- a: positional accuracy of first lens faces 11,
- b: positional accuracy of second lens faces 12,
- $d_1$: positional accuracy of light-emitting elements 7,
- e: positional accuracy of optical fibers 5,
- $\Delta L = \alpha \times \Delta T \times L$ ($\alpha$: coefficient of linear expansion of lens array main body 4; $\Delta T$: temperature change in the lens array main body 4; and L: distance from a fixed position on a first surface 4a to a position of a lens face on the first surface 4a farthest from the fixed position),
- $W_1$: a distance between attachment positions before and after movement, under a premise that a photovoltaic device 3 is moved from an attachment position at which optical coupling efficiency between the light-emitting elements 7 and fiber ends 5a indicates a maximum efficiency to an attachment position at which efficiency reduction equivalent to 2 dB is indicated.

18 Claims, 44 Drawing Sheets

(56) References Cited

U.S. PATENT DOCUMENTS

| | | | |
|---|---|---|---|
| 9,057,852 B2 * | 6/2015 | Morioka et al. | 1/1 |
| 9,063,281 B2 * | 6/2015 | Lin | 1/1 |
| 2004/0096152 A1 | 5/2004 | Nakama et al. | |
| 2009/0154877 A1 | 6/2009 | Morioka | |
| 2009/0244904 A1 | 10/2009 | Morioka | |
| 2010/0295063 A1 | 11/2010 | Morioka | |
| 2011/0057204 A1 * | 3/2011 | Morioka | 257/84 |
| 2012/0263416 A1 * | 10/2012 | Morioka | 385/33 |
| 2014/0328558 A1 * | 11/2014 | Morioka et al. | 385/33 |

FOREIGN PATENT DOCUMENTS

| | | |
|---|---|---|
| JP | 2009-163213 A | 7/2009 |
| JP | 2009-229996 A | 10/2009 |
| JP | 2010-262222 A | 11/2010 |

* cited by examiner

LENS ARRAY AND OPTICAL MODULE INCLUDING THE SAME

This application is the U.S. National Phase under 35 U.S.C. §371 of International Application PCT/JP2011/078474, filed Dec. 8, 2011, which claims priority to Japanese Patent Application No. 2010-284718, filed Dec. 21, 2010. The International Application was published under PCT Article 21(2) in a language other than English.

TECHNICAL FIELD

The present invention relates to a lens array and an optical module including the lens array. In particular, the present invention relates to a lens array suitable for optically coupling a plurality of light-emitting elements and end faces of a plurality of optical fibers, and an optical module including the lens array.

BACKGROUND ART

In recent years, in reflection of the need for higher-speed communication and more compact communication devices, there has been an increasing demand for a lens array in which a plurality of lenses are arranged in parallel, as a compactly structured optical component effective for actualizing multichannel optical communication.

This type of lens array is conventionally configured such that a photovoltaic device including a plurality of light-emitting elements (such as a vertical cavity surface emitting laser [VCSEL]) can be attached thereto and a plurality of optical fibers can be attached thereto.

In a state in which the lens array is disposed between the photovoltaic device and plurality of the optical fibers in this way, the lens array optically couples light emitted from each light-emitting element of the photovoltaic device to an end face of each optical fiber. As a result, multichannel optical communication can be performed.

In addition, since the past, the photovoltaic device attached to this type of lens array has been problematic in that, as a result of changes in the output characteristics of the light from the light-emitting elements caused by the effects of temperature and the like, there is risk of disruption in appropriate transmission of communication information.

As a lens array intended to counter such problems, for example, a lens array such as that described in Patent Literature 1 has been proposed. In other words, in Patent Literature 1, some of the light emitted from the light-emitting elements and entering the lens array is reflected as monitor light by a reflection surface disposed on the optical path of the lens array. The reflected monitor light is converged by the lens faces and emitted towards light-receiving elements provided outside of the lens array. On the photovoltaic device side, output control of the light-emitting elements is performed based on the intensity and the amount of light of the monitor light received by the light-receiving elements, thereby stabilizing the output of the light-emitting elements.

Patent Literature 1: Japanese Patent Laid-open Publication No. 2006-344915

DISCLOSURE OF INVENTION

Problem to be Solved by the Invention

To achieve high optical coupling efficiency by optical coupling being appropriately performed between the light-emitting elements of the photovoltaic device and the end faces of the optical fibers, it is important that the photovoltaic device and the optical fibers are attached in appropriate positions on the lens array when the photovoltaic device and the optical fibers are attached to the lens array.

Here, in some instances, in a state in which the end portions of the optical fibers in the length direction thereof are held within an optical connector (such as a mechanically transferable splicing connector [MT connector]), the optical fibers are attached to the lens array together with the optical connector. Some optical connectors used for attachment of the optical fibers such as this include an optical-fiber positioning structure on the optical fiber side (such as a circular boss hole into which a circular pin can be inserted) for positioning the optical fiber in relation to the lens array.

In addition, a lens array supporting the optical-fiber positioning structure on the optical fiber side such as this includes an optical-fiber positioning structure on the lens array side (such as a circular pin) that is capable of engaging with the optical-fiber positioning structure on the optical fiber side.

The dimensions of this type of optical-fiber positioning structure are prescribed by IEC 61754-5 which is the international standards for F12-type multi-core fiber connectors (the corresponding Japanese industrial standards are JIS C 5981). When the optical-fiber positioning structure is formed based on standards such as these, sufficient positioning accuracy can be achieved merely by a mechanical operation of engaging (such as fitting) the optical-fiber positioning structure on the optical fiber side with the corresponding optical-fiber positioning structure on the lens array side when positioning the optical fiber.

However, a photovoltaic-device positioning structure for positioning the photovoltaic device in relation to the lens array is not standardized. Therefore, sufficient positioning accuracy is difficult to achieve merely by a mechanical operation.

Therefore, since the past, to perform highly accurate positioning when positioning the photovoltaic device, an alignment operation referred to as active alignment has been performed in which the optimal position of the photovoltaic device is determined by image recognition or by actually making the photovoltaic device emit signal light.

When active alignment is performed, some degree of error in the alignment of the outgoing direction of light of the light-emitting elements of the photovoltaic device is allowed since its effect on optical coupling efficiency is considered small. However, the direction perpendicular to the outgoing direction of light of the light-emitting elements has a significant effect on optical coupling efficiency, and alignment thereof requires particularly high accuracy.

In addition, since the past, the lens array has been most commonly formed by injection molding of a resin material (such as polyetherimide) using a mold. However, such lens arrays are expected to deform (expand) in accompaniment with temperature change as a result of heat generation by the laser itself, or temperature increase in usage environments where temperature easily changes to a high temperature, such as within a server. In addition, such lens arrays are expected to contract during low temperatures, compared to room temperature. Therefore, when the photovoltaic device is positioned, such deformation of the lens array due to temperature change is required to be assumed. Highly accurate positioning is required to be performed such that accurate attachment position of the photovoltaic device is achieved even when deformation occurs. In recent times in particular, optical modules are required to support higher usage environment temperatures (such as 105° C.) than in the past. To meet such requirements, it is extremely important to take into consideration deformation of the lens array caused by temperature change when the photovoltaic device is positioned. However, no effective technology has been proposed that can achieve highly accurate positioning of the photovoltaic device taking into consideration such deformation of the lens array.

Furthermore, compensation, based on the monitor light, of the changes in output characteristics of the outgoing light of the light-emitting elements caused by temperature change is described above. However, even such configurations aiming to stabilize communication in high-temperature environments can lose significance if the positioning accuracy of the photovoltaic device does not correspond with the deformation of the lens array caused by temperature change. This is because, even when the output of the light-emitting elements is stabilized based on the monitor light at high temperatures, should the changes in relative positions between the photovoltaic device, lens array, and optical fibers become unallowable as a result of deformation of the lens array caused by temperature change, sufficient optical coupling efficiency between the light-emitting elements and the end faces of the optical fibers via the lens array cannot be achieved, resulting in disruptions in stable communication.

Here, the present invention has been achieved in light of the above-described issues. An object of the present invention is to provide a lens array and an optical module including the lens array in which appropriate attachment of a photovoltaic device can be performed taking into consideration deformation of a lens array main body caused by temperature change, monitor light can be effectively used, and optical performance and temperature stability thereof can be improved.

Means for Solving Problem

To achieve the above-described object, a lens array according to a first aspect of the present invention is a lens array to which a photovoltaic device and a plurality of optical fibers can be attached, the photovoltaic device in which a plurality of light-emitting elements are formed in an array and at least one light-receiving element is formed that receives monitor light for monitoring light emitted from at least one of the plurality of light emitting elements. The lens array is capable of optically coupling the plurality of light-emitting elements and end faces of the plurality of optical fibers. The lens array includes: a photovoltaic-device positioning structure on the lens array side that is formed on a first surface of a lens array main body to which the photovoltaic device is attached and that is used to perform positioning of the photovoltaic device when the photovoltaic device is attached; an optical-fiber positioning structure on the lens array side that is formed on a second surface of the lens array main body to which the plurality of optical fibers are attached and that is used to perform positioning of the plurality of optical fibers when the plurality of optical fibers are attached; a plurality of first lens faces that are formed on the first surface such as to be arrayed in a predetermined array direction corresponding with the plurality of light-emitting elements and into which the light emitted from each of the plurality of light-emitting elements enters; a plurality of second lens faces that are formed on the second surface such as to be arrayed along a predetermined direction corresponding with the end faces of the plurality of optical fibers and that emit the light of each of the plurality of light-emitting elements that has entered each of the plurality of first lens faces towards the end faces of the plurality of optical fibers, the number of second lens faces being the same as the number of first lens faces; at least one third lens face that is formed on the first surface and that emits the monitor light that has entered from an inner side of the lens array main body towards the light-receiving element; and a light control section that is disposed such as to be positioned on an optical path connecting the first lens faces and the second lens faces and an optical path connecting the first lens faces and the third lens face in the lens array main body, the light control section into which the light of each of the plurality of light-emitting elements that has entered the plurality of first lens faces enters, the light control section performing control such as to reflect the incident light of each of the plurality of light-emitting elements at a predetermined reflection factor and advance the light towards the third lens face side, and transmit the incident light at a predetermined transmission factor and advance the light towards the second lens face side, during which the light control section reflects at least the light from one of the plurality of light-emitting elements as the monitor light. As the photovoltaic device, a photovoltaic device is attached that includes a photovoltaic-device positioning structure on the photovoltaic device side that engages with the photovoltaic-device positioning structure on the lens array side during positioning thereof. as the optical fibers, optical fibers are attached that include an optical-fiber positioning structure on the optical fiber side that engages with the optical-fiber positioning structure on the lens array side during positioning thereof. Together with the photovoltaic device and the optical fibers, the lens array satisfies a following conditional expression (1):

$$a+b+d_1+e+\Delta L \le W_1 \qquad (1)$$

where, a: positional accuracy [μm] of the first lens faces b: positional accuracy [μm] of the second lens faces $d_1$: positional accuracy [μm] of the light-emitting elements of the photovoltaic device e: positional accuracy [μm] of the optical fibers ΔL: amount of change [μm] in lens position as a result of temperature change expressed by a following expression:

$\Delta L = \alpha \times \Delta T \times L$ (where, α: coefficient of linear expansion [1/° C.] of the lens array main body; ΔT: temperature change [° C.] in the lens array main body; and L: distance [mm] between a fixed position on the first surface and a position of a lens face on the first surface farthest from the fixed position)

$W_1$: first tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements thereof and the end faces of the optical fibers indicates a maximum efficiency set in advance to an attachment position at which a reduction in optical coupling efficiency equivalent to 2 dB from the maximum efficiency is indicated.

In the invention according to the first aspect, as a result of conditional expression (1) being satisfied, when the photovoltaic device is attached to the lens array main body, alignment in the outgoing direction of the light of the light-emitting elements (in other words, the axial direction of the optical axis of the first lens face) and any direction perpendicular thereto is not required. Highly accurate positioning of the photovoltaic device can be easily performed such that sufficient optical coupling efficiency between the light-emitting elements and the end faces of the optical fibers can be achieved regardless of temperature change merely by a mechanical operation of engaging the photovoltaic-device positioning structure on the photovoltaic device side with the photovoltaic-device positioning structure on the lens array side. As a result, appropriate attachment of the photovoltaic device taking into consideration deformation of the lens array main body as a result of temperature change can be easily performed, the monitor light can be effectively used, and manufacturing efficiency, optical performance, and temperature stability thereof can be improved.

In addition, a lens array according to a second aspect is the lens array according to the first aspect, in which, together with the photovoltaic device and the optical fibers, the lens array further satisfies a following conditional expression (2):

$$a+c+d_1+d_2+\Delta L \leq W_2 \tag{2}$$

where, c: positional accuracy [μm] of the third lens face $d_2$: positional accuracy [μm] of the light-receiving element of the photovoltaic device $W_2$: second tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements and the light-receiving element thereof indicates a maximum efficiency set in advance to an attachment position at which a reduction in optical coupling efficiency equivalent to 2 dB from the maximum efficiency is indicated.

In the invention according to the second aspect, as a result of conditional expression (2) being further satisfied, highly accurate positioning of the photovoltaic device can be easily performed such that sufficient optical coupling efficiency between the light-emitting elements and the light-receiving elements can also be achieved regardless of temperature change merely by a mechanical operation of engaging the photovoltaic-device positioning structure on the photovoltaic device side with the photovoltaic-device positioning structure on the lens array side. As a result, the monitor light can be easily obtained with certainty, and optical performance and temperature stability thereof can be further improved.

Furthermore, a lens array according to a third aspect is the lens array according to the first or second aspect, in which, further, the photovoltaic-device positioning structure on the lens array side is formed into a circular hole, a circular through hole, or a circular pin. As the photovoltaic device, a photovoltaic device can be attached that includes a photovoltaic-device positioning structure on the photovoltaic device side that is formed into a circular pin, a circular hole, or a circular through hole capable of engaging with the photovoltaic-device positioning structure on the lens array side.

In the invention according to the third aspect, because the photovoltaic-device positioning structure can be formed into a simple shape, manufacturing cost can be further reduced.

Still further, a lens array according to a fourth aspect is a lens array to which a photovoltaic device and a plurality of optical fibers can be attached, the photovoltaic device in which a plurality of light-emitting elements are formed in an array and at least one light-receiving element is formed that receives monitor light for monitoring light emitted from at least one of the plurality of light emitting elements. The lens array is capable of optically coupling the plurality of light-emitting elements and end faces of the plurality of optical fibers. The lens array includes: an optical-fiber positioning structure on the lens array side that is formed on a second surface of the lens array main body to which the plurality of optical fibers are attached and that is used to perform positioning of the plurality of optical fibers when the plurality of optical fibers are attached; a plurality of first lens faces that are formed on a first surface of the lens array main body to which the photovoltaic device is attached, such as to be arrayed in a predetermined array direction corresponding with the plurality of light-emitting elements and into which the light emitted from each of the plurality of light-emitting elements enters; a plurality of second lens faces that are formed on the second surface such as to be arrayed along a predetermined direction corresponding with the end faces of the plurality of optical fibers and that emit the light of each of the plurality of light-emitting elements that has entered each of the plurality of first lens faces towards the end faces of the plurality of optical fibers, the number of second lens faces being the same as the number of first lens faces; at least one third lens face that is formed on the first surface and that emits the monitor light that has entered from an inner side of the lens array main body towards the light-receiving element; and a light control section that is disposed such as to be positioned on an optical path connecting the first lens faces and the second lens faces and an optical path connecting the first lens faces and the third lens face in the lens array main body, the light control section into which the light of each of the plurality of light-emitting elements that has entered the plurality of first lens faces enters, the light control section performing control such as to reflect the incident light of each of the plurality of light-emitting elements at a predetermined reflection factor and advance the light towards the third lens face side, and transmit the incident light at a predetermined transmission factor and advance the light towards the second lens face side, during which the light control section reflects at least the light from one of the plurality of light-emitting elements as the monitor light. The photovoltaic device is attached by positioning performed by an alignment operation. As the optical fibers, optical fibers are attached that include an optical-fiber positioning structure on the optical fiber side that engages with the optical-fiber positioning structure on the lens array side during positioning thereof. Together with the photovoltaic device and the optical fibers, the lens array satisfies a following conditional expression (1):

$$a+b+d_1+e+\Delta L \leq W_1 \tag{1}$$

where, a: positional accuracy [μm] of the first lens faces b: positional accuracy [μm] of the second lens faces $d_1$: positional accuracy [μm] of the light-emitting elements of the photovoltaic device e: positional accuracy [μm] of the optical fibers $\Delta L$: amount of change [μm] in lens position as a result of temperature change expressed by a following expression:

$\Delta L = \alpha \times \Delta T \times L$ (where, $\alpha$: coefficient of linear expansion [1/° C.] of the lens array main body; $\Delta T$: temperature change [° C.] in the lens array main body; and L: distance [mm] between a fixed position on the first surface and a position of a lens face on the first surface farthest from the fixed position)

$W_1$: first tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements thereof and the end faces of the optical fibers indicates a maximum efficiency set in advance to an attachment position at which a reduction in optical coupling efficiency equivalent to 2 dB from the maximum efficiency is indicated.

In the invention according to the fourth aspect, as a result of conditional expression (1) being satisfied, when the photovoltaic device is attached to the lens array main body by positioning performed by alignment operation, highly accurate positioning of the photovoltaic device can be easily performed such that sufficient optical coupling efficiency between the light-emitting elements and the end faces of the optical fibers can be achieved regardless of temperature change. As a result, appropriate attachment of the photovoltaic device taking into consideration deformation of the lens array main body as a result of temperature change can be easily performed, the monitor light can be effectively used, and optical performance and temperature stability thereof can be improved.

A lens array according to a fifth aspect is the lens array according to the fourth aspect in which, together with the photovoltaic device and the optical fibers, the lens array further satisfies a following conditional expression (2):

$$a+c+d_1+d_2+\Delta L \leq W_2 \quad (2)$$

where, c: positional accuracy [μm] of the third lens face $d_2$: positional accuracy [μm] of the light-receiving element of the photovoltaic device $W_2$: second tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements and the light-receiving element thereof indicates a maximum efficiency set in advance to an attachment position at which a reduction in optical coupling efficiency equivalent to 2 dB from the maximum efficiency is indicated.

In the invention according to the fifth aspect, as a result of conditional expression (2) being further satisfied, when the photovoltaic device is attached to the lens array main body by positioning performed by alignment operation, highly accurate positioning can be performed such that sufficient optical coupling efficiency between the light-emitting elements and the light-receiving elements can also be achieved regardless of temperature change. As a result, the monitor light can be easily obtained with certainty, and optical performance and temperature stability thereof can be further improved.

Furthermore, a lens array according to a sixth embodiment is the lens array according to any one of the first to fifth aspects in which, further, the optical-fiber positioning structure on the lens array side is formed into a circular pin, a circular hole, or a circular through hole. As the plurality of optical fibers, optical fibers can be attached that includes an optical-fiber positioning structure on the optical fiber side that is formed into a circular hole, a circular through hole, or a circular pin capable of engaging with the optical-fiber positioning structure on the lens array side.

In the invention according to the sixth aspect, as a result of the optical-fiber positioning structure being capable of being formed into a shape suitable for standards, positioning of the optical fibers can be easily performed with high accuracy.

Still further, a lens array according to a seventh aspect is the lens array according to any one of the first to sixth aspects in which, further, as the photovoltaic device, a photovoltaic device is attached in which the light-receiving elements are formed along the array direction of the light-emitting elements, the number of light-receiving elements being the same as the number of light-emitting elements. The third lens faces are formed in an array along the array direction of the first lens faces, the number of third lens faces being the same as the number of first lens faces and the number of second lens faces.

In the invention according to the seventh aspect, because the monitor light of each light-emitting element can be obtained, the output of the outgoing light of each light-emitting element can be stabilized with certainty. In addition, as a result of a plurality of light-emitting elements and third lens faces being formed, the effects achieved when conditional expression (2) is satisfied are more significant.

A lens array according to an eighth aspect is the lens array according to any one of the first to seventh aspects in which, further, the light control section includes: a recessing section that is formed in a recessing manner in the lens array main body and into which the light of each of the plurality of light-emitting elements that has entered the plurality of first lens faces enters; a prism that is disposed within a space formed by the recessing section and forms an optical path for the light of each of the plurality of light-emitting elements that advances towards the second lens face side after entering the recessing section; and a reflective/transmissive layer that is disposed in a position within the space formed by the recessing section on an upstream side in an advancing direction of the light of each of the plurality of light-emitting elements in relation to the prism, and reflects the light of each of the plurality of light-emitting elements that has entered the recessing section at the predetermined reflection factor towards the third lens face side and transmits the light of each of the plurality of light-emitting elements that has entered the recessing section at the predetermined transmission factor towards the prism side, during which the reflective/transmissive layer reflects at least the light from one of the plurality of light-emitting elements as the monitor light.

In the invention according to the eighth aspect, the monitor light can be obtained with certainty by a simple configuration.

Furthermore, an optical module according to a ninth aspect includes a lens array according to any one of the first to eighth aspects and a photovoltaic device corresponding with the lens array.

In the invention according to the ninth aspect, highly accurate positioning of the photovoltaic device can be performed such that sufficient optical coupling efficiency between the light-emitting elements and the end faces of the optical fibers can be achieved regardless of temperature change.

Effect of the Invention

In the present invention, appropriate attachment of the photovoltaic device taking into consideration deformation of the lens array main body caused by temperature change can be performed, monitor light can be effectively used, and optical performance and temperature stability thereof can be improved.

EXPLANATIONS OF LETTERS OR NUMERALS

Figure 1:
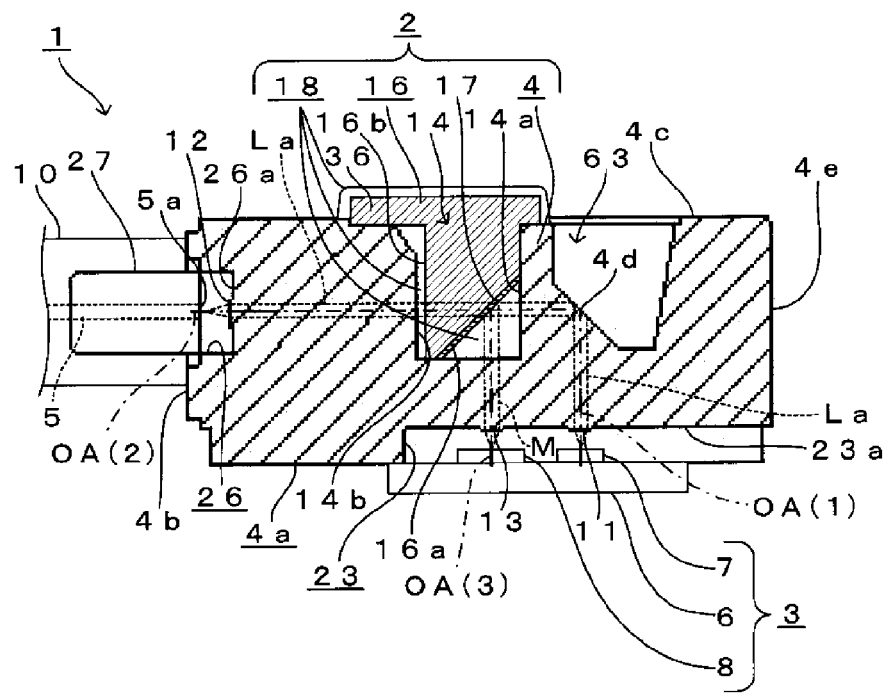
FIG. 1 is an overall configuration diagram of an overview of an optical module together with a vertical cross-sectional view of a lens array, in a lens array and an optical module according to a first embodiment of the present invention.

1 optical module
2 lens array
3 photovoltaic device
4 lens array main body
5 optical fiber
5*a* end face of optical fiber
7 light-emitting element
8 light-receiving element
11 first lens face
12 second lens face
13 third lens face
14 recessing section
16 prism
17 reflective/transmissive layer
18 filler material
24 device-positioning recessing section
27 fiber-positioning projecting section
124 device-positioning projecting section
127 fiber-positioning recessing section

BEST MODE(S) FOR CARRYING OUT THE INVENTION

First Embodiment

A lens array and an optical module including the lens array according to a first embodiment of the present invention will hereinafter be described with reference to FIG. 1 to FIG. 18.

Figure 2:
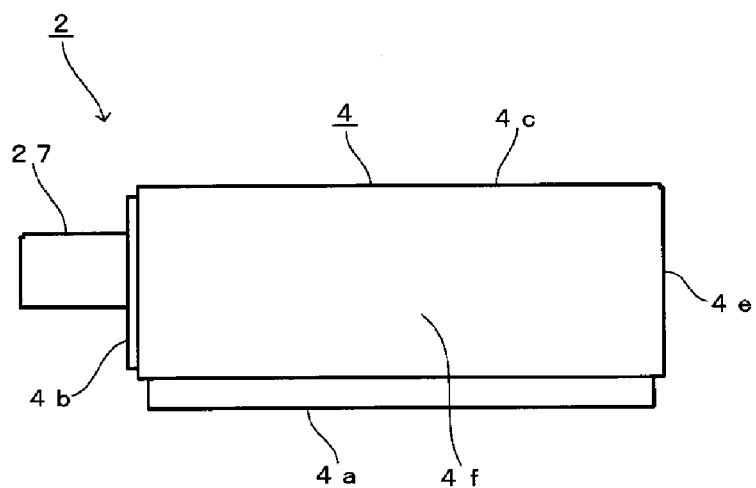
FIG. 2 is a front view of the lens array shown in FIG. 1.
Figure 3:
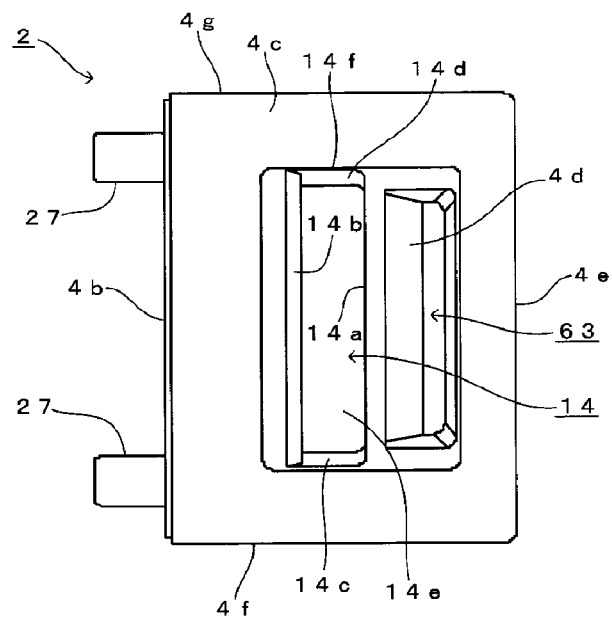
FIG. 3 is a planar view of a lens array main body.
Figure 4:
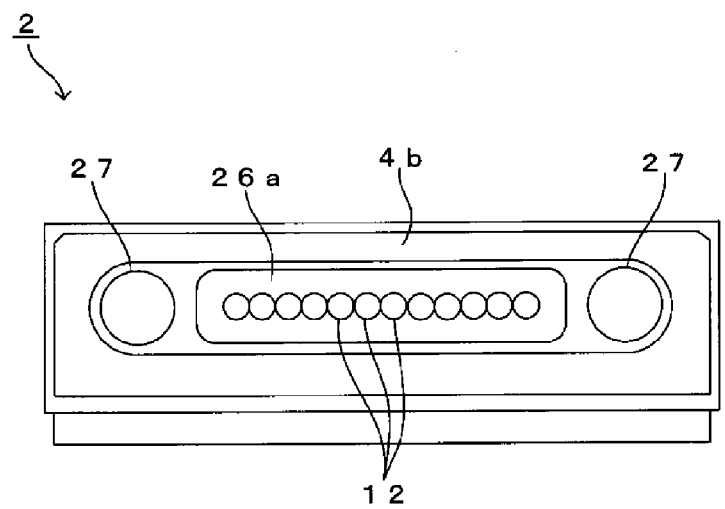
FIG. 4 is a left-side view of the lens array shown in FIG. 1.
Figure 5:
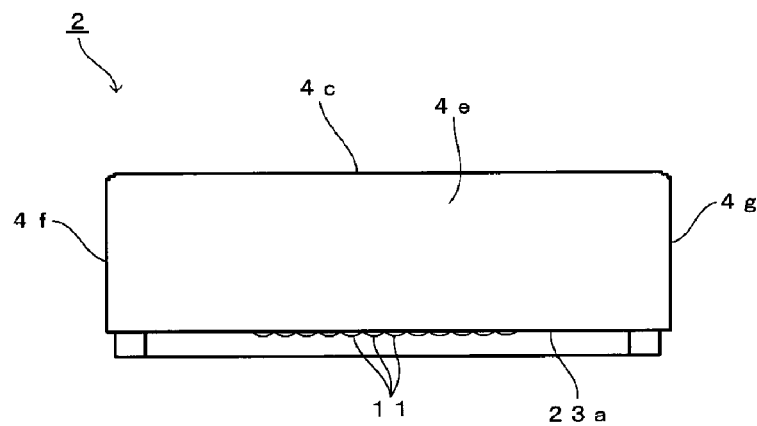
FIG. 5 is a right-side view of the lens array shown in FIG. 1.
Figure 6:
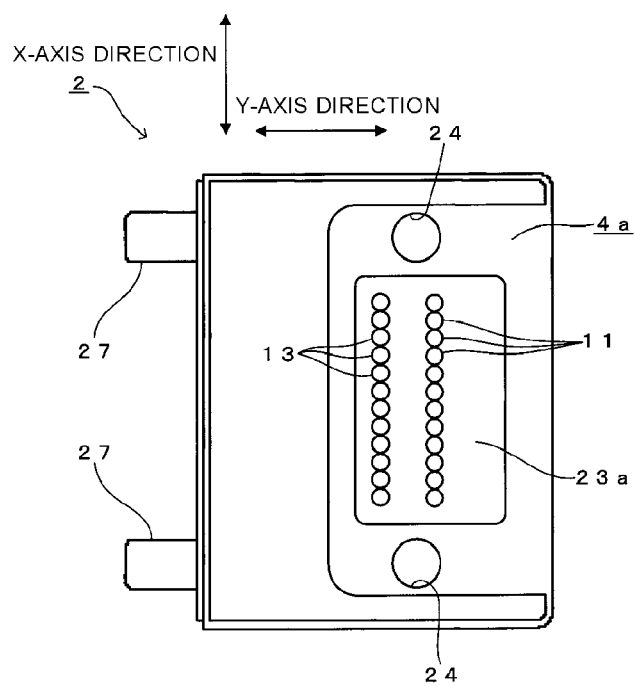
FIG. 6 is a bottom view of the lens array shown in FIG. 1.

Here, FIG. 1 is an overall configuration diagram of an overview of an optical module 1 according to the present embodiment, together with a vertical cross-sectional view of a lens array 2 according to the present embodiment. In addition, FIG. 2 is a front view of the lens array 2 shown in FIG. 1. FIG. 3 is a planar view of the lens array 2 shown in FIG. 1. FIG. 4 is a left-side view of the lens array 2 shown in FIG. 1. FIG. 5 is a right-side view of the lens array 2 shown in FIG. 1. FIG. 6 is a bottom view of the lens array 2 shown in FIG. 1.

As shown in FIG. 1, the lens array 2 according to the present embodiment is disposed between a photovoltaic device 3 and optical fibers 5.

Here, the photovoltaic device 3 has a plurality of light-emitting elements 7 on a surface of a semiconductor substrate 6 facing the lens array 2, the light-emitting elements 7 emitting laser light La in a direction perpendicular to the surface (upward direction in FIG. 1). The light-emitting elements 7 configure the above-described VCSEL. In FIG. 1, the light-emitting elements 7 are formed in an array along a direction perpendicular to the surface of the paper on which FIG. 1 is printed. In addition, the photovoltaic device 3 has a plurality of light-receiving elements 8 on the surface of the semiconductor substrate 6 facing the lens array 2, in positions near the left-hand side in FIG. 1 of the light-emitting elements 7. The light-receiving elements 8 receive monitor light M for monitoring the output (such as intensity or amount of light) of the laser light La emitted from the light-emitting elements 7. The number of light-receiving elements 8 is the same as the number of light-emitting elements 7. The light-receiving elements 8 are formed in an array in the same direction as the light-emitting elements 7. The positions in the array direction match between corresponding elements 7 and 8. In other words, the light-receiving elements 8 are formed at the same pitch as the light-emitting elements 7. The light-receiving elements 8 may be configured by photodetectors. In addition, as long as at least a single light-receiving element 8 is formed, the number of light-receiving elements 8 is not necessarily required to be the same as the number of light-emitting elements. Fewer light-receiving elements 8 may be formed than the light-emitting elements 7. Furthermore, a control circuit (not shown) that controls the output of the laser light La emitted from the light-emitting elements 7 based on the intensity and the amount of light of the monitor light M received by the light-receiving elements 8 is connected to the photovoltaic device 3. The photovoltaic device 3 such as this is configured, for example, to be arranged opposing the lens array 2 in a state in which the semiconductor substrate 6 is in contact with the lens array 2. The photovoltaic device 3 together with the lens array 2 configures the optical module 1 by, for example, being attached to the lens array 2 by a known fixing means (not shown) such as a clamp spring or an adhesive.

In addition, the same number of optical fibers 5 as the number of light-emitting elements 7 and the number of light-receiving elements 8 are arranged. The optical fibers 5 are formed in an array at the same pitch as the light-emitting elements 7 along the direction perpendicular to the surface of the paper on which FIG. 1 is printed in FIG. 1. The optical fibers 5 are multi-mode optical fibers 5 having the same dimensions as one another. A portion of each optical fiber 5 on an end face 5a side is held within a multi-core integrated optical connector 10, such as an MT connector. The optical fibers 5 such as this are, for example, attached to the lens array 2 by a known fixing means (not shown) (such as a clamp spring) in a state in which an end surface of the optical connector 10 on the lens array 2 side is in contact with the lens array 2.

The lens array 2 optically couples each light-emitting element 7 with the end face 5a of each optical fiber 5 in a state in which the lens array 2 is disposed between the photovoltaic device 3 and the optical fibers 5 such as those described above.

The lens array 2 will be described in further detail. As shown in FIG. 1, the lens array 2 has a light-transmissive lens array main body 4. The outer shape of the lens array main body 4 is formed into a substantially rectangular plate shape. In other words, as shown in FIG. 1 and FIG. 3, the rough outer shape of the lens array main body 4 is configured by each planar surface: an upper end surface 4c, a lower end surface 4a, a left end surface 4b, a right end surface 4e, a front end surface 4f, and a back end surface 4g. The upper and lower end surfaces 4c and 4a are parallel with each other. The left and right end surfaces 4b and 4e are also parallel with each other. Furthermore, the upper and lower end surfaces 4c and 4a and the left and right end surfaces 4b and 4e are perpendicular to each other.

The lower end surface 4a of the lens array main body 4 such as this functions as a first surface to which the photovoltaic device 3 is attached. As shown in FIG. 1 and FIG. 6, a plurality (12 lens faces) of first lens faces (convex lens faces) 11 having a circular planar shape are formed on the lower end surface 4a. The number of first lens faces 11 is the same as the number of light-emitting elements 7. Here, as shown in FIG. 1, a portion having a substantially rectangular planar shape in a predetermined area on the right side in FIG. 1 of the lower end surface 4a is formed into a recessing plane (referred to, hereinafter, as a lens formation surface 23a) that recesses further upwards than other portions with a counterbore 23 therebetween. The plurality of first lens faces 11 are formed on the lens formation surface 23a on the lower end surface 4a such as this. However, the lens formation surface 23a is formed in parallel with the other portions of the lower end surface 4a. In addition, the first lens faces 11 are formed such as to be arrayed in a predetermined array direction (the direction perpendicular to the surface of the paper on which FIG. 1 is printed in FIG. 1, and a vertical direction in FIG. 6) corresponding with the light-emitting elements 7. Furthermore, the first lens faces 11 are formed having the same dimensions as one another and are formed at the same pitch as the light-emitting elements 7. The first lens faces 11 that are adjacent to each other in the array direction may be formed in an adjoining state in which respective peripheral end sections are in contact with each other. In addition, as shown in FIG. 1, an optical axis OA(1) of each first lens face 11 preferably matches a center axis of the laser light La emitted from each light-emitting element 7 corresponding with each first lens face 11. More preferably, the optical axis OA(1) of each first lens face 11 is formed perpendicular to the lower end surface 4a of the lens array main body 4.

As shown in FIG. 1, the laser light La emitted from each light-emitting element 7 corresponding with each first lens face 11 enters each first lens face 11 such as this. Each first lens face 11 advances the incident laser light La of each light-emitting element 7 into the lens array main body 4. Each first lens face 11 may collimate or converge the incident laser light La of each light-emitting element 7.

On the other hand, the left end surface 4b of the lens array main body 4 functions as a second surface to which the plurality of optical fibers 5 are attached. As shown in FIG. 1 and FIG. 4, a plurality of second lens faces (convex lens faces) 12 having a circular planar shape are formed on the left end surface 4b. The number of second lens faces 12 is the same as the number of the first lens faces 11. Here, as shown in FIG. 1 and FIG. 4, a portion having a substantially rectangular planar shape in a predetermined area in the center of the left end surface 4b is formed into a recessing plane (referred to, hereinafter, as a lens formation surface 26a) that recesses further to the right in FIG. 1 than other portions on the peripheral side surrounding the portion with a counterbore 26 therebetween. The plurality of second lens faces 12 are formed on the lens formation surface 26a on the left end surface 4b such as this. However, the lens formation surface 26a is formed in parallel with the other portions of the left end surface 4b. In addition, the second lens faces 12 are formed such as to be arrayed in the same direction as the array direction of the end faces 5a of the optical fibers 5, or in other words, the array direction of the first lens faces 11. Furthermore, the second lens faces 12 are formed having the same dimensions as one another and are formed at the same pitch as the first lens faces 11. The second lens faces 12 that are adjacent to each other in the array direction may be formed in an adjoining state in which respective peripheral end sections are in contact with each other. In addition, an optical axis OA(2) of each second lens face 12 is preferably formed to be positioned coaxially with the center axis of the end face 5a of each optical fiber 5 corresponding with each second lens face 12. More preferably, the optical axis OA(2) of each second lens face 12 is formed perpendicular to the left end surface 4b of the lens array main body 4.

The laser light La of each light-emitting element 7 that has entered each first lens face 11 corresponding with each second lens face 12 and advanced on an optical path within the lens array main body 4 enters each second lens face 12, as shown in FIG. 1. At this time, the center axis of the laser light La of each light-emitting element 7 preferably matches the optical axis OA(2) of each second lens face 12. Each second lens face 12 converges the incident laser light La of each light-emitting element 7 and emits the converged laser light La to the end face 5a of each optical fiber 5a corresponding with each second lens face 12.

In this way, each light-emitting element 7 and the end face 5a of each optical fiber 5 are optically coupled by the first lens face 11 and the second lens face 12.

Furthermore, as shown in FIG. 1 and FIG. 6, third lens faces (convex lens face) 13 having a circular planar shape are formed on the lens formation surface 23a on the lower end surface 4a of the lens array main body 4, in positions near the left-hand side in FIG. 1 of the first lens faces 11. The number of third lens faces 13 is the same as the number of the light-receiving elements 8 (according to the present embodiment, the number of third lens faces 13 is also the same as the number of light-emitting elements 7, the number of optical fibers 5, the number of first lens faces 11, and the number of second lens faces 12). The third lens faces 13 are formed such as to be arrayed in a predetermined array direction corresponding with the light-receiving elements 8, or in other words, the same direction as the array direction of the first lens faces 11. Furthermore, the third lens faces 13 are formed having the same dimensions as one another and are formed at the same pitch as the light-receiving elements 8. The third lens faces 13 that are adjacent to each other in the array direction may be formed in an adjoining state in which respective peripheral end sections are in contact with each other. In addition, an optical axis OA(3) of each third lens face 13 preferably matches the center axis of a light-receiving surface of each light-receiving element 8 corresponding with each third lens face 13. More preferably, the optical axis OA(3) of each third lens face 13 is formed perpendicular to the lower end surface 4a of the lens array main body 4.

The monitor light M of each light-emitting element 7 corresponding with each third lens face 13 enters each third lens face 13 from within the lens array main body 4, as shown in FIG. 1. Each third lens face 13 converges the incident monitor light M of each light-emitting element 7 and emits the converged monitor light M towards each light-receiving element 8 corresponding with each third lens face 13.

Still further, as shown in FIG. 1 and FIG. 3, a second recessing section 63 having a substantially trapezoidal vertical cross-sectional shape is formed in a recessing manner on the upper end surface 4c of the lens array main body 4. A sloped surface 4d forming a portion of the inner surface of the second recessing section 63 serves as a total reflection surface 4d. As shown in FIG. 1, the total reflection surface 4d is formed into a sloped surface having a tilt in relation to both the lower end surface 4a and the left end surface 4b of the lens array main body 4 such that the upper end portion thereof is positioned further to the left side in FIG. 1 (in other words, towards a recessing section 14 side, described hereafter) than the lower end portion thereof. The total reflection surface 4d is disposed on the optical path of the laser light La of each light-emitting element 7 between the first lens faces 11 and a first optical surface 14a of the recessing section 14, described hereafter.

As shown in FIG. 1, the laser light La of each light-emitting element 7 that has entered each first lens face 11 enters the total reflection surface 4d such as this at an angle of incidence that is the critical angle or greater, from below in FIG. 1. The total reflection surface 4d totally reflects the incident laser light La of each light-emitting element 7 towards the left side in FIG. 1.

The tilt angle of the total reflection surface 4d is preferably 40° to 50° (more preferably 45°) in the clockwise direction in FIG. 1, with reference to the lower end surface 4a (0°). The total reflection surface 4d may be coated with a reflective film composed of Au, Ag, Al, or the like.

In addition, as shown in FIG. 1 and FIG. 3, the recessing section 14 is formed in a recessing manner on the upper end surface 4c of the lens array main body 4 such as to be positioned on the optical path connecting the first lens faces 11 and the second lens faces 12.

Here, as shown in FIG. 1, the first optical surface 14a forming a portion of the inner surface of the recessing section 14 as shown in FIG. 1 is formed on the right side surface of the recessing section 14. The first optical surface 14a is formed in parallel with the left end surface 4b of the lens array main body 4.

As shown in FIG. 1, the laser light La of each light-emitting element 7 that has been totally reflected by the total reflection surface 4d perpendicularly enters the first optical surface 14a such as this. The angle of incidence (in other words, a direction of incidence) is an angle (direction of incidence) that is also perpendicular to the left end surface 4b.

In addition, as shown in FIG. 1, a second optical surface 14b is formed on the left side surface of the recessing section 14 such as to form a portion of the inner surface of the recessing section 14 and form a portion opposing the first optical surface 14a on the left side in FIG. 1. The second optical surface 14b is also formed in parallel with the left end surface 4b.

As shown in FIG. 1, the laser light La of each light-emitting element 7 that has entered the first optical surface 14a and subsequently advanced toward the second lens face 12 side perpendicularly enters the second optical surface 14b such as this. The second optical surface 14b then perpendicularly transmits the incident laser light La of each light-emitting element 7.

Furthermore, as shown in FIG. 1, a prism 16 having a trapezoidal vertical cross-sectional shape is disposed in a space formed by the recessing section 14.

Here, as shown in FIG. 1, the prism 16 has a first prism face 16a forming a portion of the surface of the prism 16 in a position facing the first optical surface 14a on the left side in FIG. 1. The first prism face 16a is formed into a sloped surface having a predetermined tilt angle in relation to the lower end surface 4a and the left end surface 4b of the lens array main body 4 such that the upper end portion thereof is positioned further to the right side in FIG. 1 (in other words, towards the first optical surface 14a side) than the lower end portion thereof. As a result, as shown in FIG. 1, a space having a right-triangular vertical cross-sectional shape is formed between the first prism face 16a and the first optical surface 14a. The first prism face 16a may be disposed in parallel with the total reflection surface 4d.

In addition, as shown in FIG. 1, the prism. 16 has a second prism face 16b that forms a portion of the surface of the prism 16 and forms a portion opposing the first prism face 16a. The second prism face 16b is disposed in parallel with the second optical surface 14b in a position facing the second optical surface 14b on the right side in FIG. 1 with a predetermined amount of space therebetween.

Furthermore, as shown in FIG. 1, the prism 16 is positioned in relation to the recessing section 14 such that a right end surface in FIG. 1 is in contact with a portion extending upwards from the upper end of the first optical surface 14a on the right side surface of the recessing section 14, a lower end surface in FIG. 1 is in contact with a bottom surface 14e of the recessing section 14, and a shoulder section 36 formed in the upper end portion is in contact with the upper end surface 4c of the lens array main body 4.

The prism 16 such as this forms the optical path of the laser light La of each light-emitting element 7 that has entered the first optical surface 14a and subsequently advances towards the second lens face 12 side.

Still further, as shown in FIG. 1, a filler material 18 composed of a light-transmissive adhesive material fills the space between the recessing section 14 and the prism 16. The prism 16 is stably held within the recessing section 14 by the adhesive force of the filler material 18. In addition, as shown in FIG. 1, the filler material 18 is also disposed on the shoulder section 36, and is used to bond the shoulder section 36 to the upper end surface 4c of the lens array main body 4. A thermosetting resin or an ultraviolet-curable resin can be used as the filler material 18 such as this.

In addition, according to the present embodiment, the filler material 18 is formed having the same refractive index as the prism 16. For example, in some instances, the prism 16 is composed of Ultem (registered trademark) manufactured by SABIC Innovative Plastics Holding B.V. as a polyetherimide and the filler material 18 is composed of LumipluS (registered trademark) manufactured by Mitsubishi Gas Chemical Company, Inc. In this instance, the refractive indexes of the prism 16 and the filler material 18 are both 1.64 in relation to light having a wavelength of 850 nm. In addition, for example, in some instances, the prism 16 is composed of ARTON (registered trademark) manufactured by JSR Corporation as a cyclic olefin resin, and the filler material 18 is composed of A1754B manufactured by TECS Co., Ltd. as an ultraviolet (UV)-curable resin. In this instance, the refractive indexes of the prism 16 and the filler material 18 are both 1.50 in relation to light having a wavelength of 850 nm.

Furthermore, as shown in FIG. 1, a reflective/transmissive layer 17 having a thin thickness is formed within the space formed by the recessing section 14 and in a position on the upstream side in the advancing direction of the laser light La of each light-emitting element 7 in relation to the prism 16. Here, as shown in FIG. 1, the surface of the reflective/transmissive layer 17 on the first optical surface 14a side faces the first optical surface 14a with the filler material 18 therebetween, and the surface on the first prism face 16a side is in contact with the first prism face 16a. The reflective/transmissive layer 17 such as this may be formed by the first prism face 16a being coated with a single layer film composed of a single metal, such as Ni, Cr, or Al, or a dielectric multilayer film obtained by a plurality of dielectrics having differing dielectric constants (such as $TiO_2$ and $SiO_2$) being alternately stacked. In this instance, a known coating technique, such as Inconel deposition, is used for coating. When coating such as this is used, the reflective/transmissive layer 17 can be formed into a very thin thickness of, for example, 1 μm or less. However, the reflective/transmissive layer 17 may be configured by a glass filter. In addition, the reflective/transmissive layer 17 may be formed in parallel with the first prism face 16a.

Here, as shown in FIG. 1, the laser light La of each light-emitting element 7 that has perpendicularly entered the first optical surface 14a advances straight towards the second lens face 12 side on the optical path within the filler material 18 filling the space between the first optical surface 14a and the reflective/transmissive layer 17 without refracting. At this time, when the filler material 18 is formed having the same refractive index as the lens array main body 4 as well, Fresnel reflection at the interface between the first optical surface 14a and the filler material 18 can be suppressed. In this instance, the lens array main body 4 may be composed of the same material as the prism 16. Furthermore, the laser light La of each light-emitting element 7 that has advanced into the filler material 18 between the first optical surface 14a and the reflective/transmissive layer 17 in this way enters the reflective/transmissive layer 17. Then, the reflective/transmissive layer 17 reflects the incident laser light La of each light-emitting element 7 towards the third lens face 13 side at a predetermined reflection factor and transmits the laser light La towards the prism 16 side at a predetermined transmission factor. At this time, because the reflective/transmissive layer 17 has a thin thickness, the refraction of the laser light La transmitted through the reflective/transmissive layer 17 can be ignored (considered to be directly advancing transmission). As the reflection factor and the transmission factor of the reflective/transmissive layer 17, desired values can be set based on the material, thickness, and the like of the reflective/transmissive layer 17, to the extent that an amount of monitor light M sufficient for monitoring the output of the laser light La can be obtained. For example, when the reflective/transmissive layer 17 is formed by the above-described single layer film, the reflection factor of the reflective/transmissive layer 17 can be 20% and the transmission factor can be 60% (absorption factor 20%), although depending on the thickness thereof. In addition, for example, when the reflective/transmissive layer 17 is formed by the above-described dielectric multilayer film, the reflection factor of the reflective/transmissive layer 17 can be 10% and the transmission factor can be 90%, although depending on the thickness and the number of layers thereof.

As shown in FIG. 1, during reflection or transmission such as this, the reflective/transmissive layer 17 reflects some (light amounting to the reflection factor) of the laser light La of each light-emitting element 7 that has entered the reflective/transmissive layer 17 as the monitor light M of each light-emitting element 7 corresponding to each light-emitting element 7, towards the third lens face 13 corresponding with each beam of monitor light M.

Furthermore, the monitor light M of each light-emitting element 7 reflected by the reflective/transmissive layer 17 in this way advances within the lens array main body 4 towards the third lens face 13 side, and is emitted from each third lens face 13 towards each light-receiving element 8 corresponding to each third lens face 13.

On the other hand, the laser light La of each light-emitting element 7 transmitted by the reflective/transmissive layer 17 enters the first prism face 16a immediately after transmittance. The direction of incidence of the laser light La of each light-emitting element 7 in relation to the first prism face 16a can be considered to be the same as the direction of incidence of the laser light La of each light-emitting element 7 in relation to the reflective/transmissive layer 17. This is because the reflective/transmissive layer 17 is very thin and the refraction of the laser light La by the layer 17 can be ignored. The laser light La of each light-emitting element 7 that has entered the first prism face 16a advances towards the second lens face 12 side on the optical path within the prism 16.

At this time, because the prism 16 is formed having the same refractive index as the filler material 18, when the laser light La of each light-emitting element 7 enters the first prism face 16a, refraction does not occur in the laser light La. The laser light La of each light-emitting element 7 that has advanced on the optical path within the prism 16 perpendicularly enters the second prism face 16b and is perpendicularly emitted outside of the prism 16 from the second prism face 16b.

Next, the laser light La of each light-emitting element 7 emitted from the second prism face 16b perpendicularly enters the filler material 18 filling the space between the second prism face 16b and the second optical surface 14b. The perpendicularly incident laser light La of each light-emitting element 7 advances straight towards the second lens face 12 side on the optical path within the filler material 18 without refracting. At this time, because the filler material 18 is formed having the same refractive index as the prism 16, Fresnel reflection at the interface between the second prism face 16b and the filler material 18 is suppressed.

The laser light La of each light-emitting element 7 that has advanced within the filler material 18 between the second prism face 16b and the second optical surface 14b in this way is perpendicularly emitted from the filler material 18 and, immediately thereafter, perpendicularly enters the second optical surface 14b, as described above. The laser light La of each light-emitting element 7 that has perpendicularly entered the second optical surface 14b advances towards the second lens face 12 side on the optical path within the lens array main body 4 after the second optical surface 14b, and is then emitted by each second lens face 12 towards the end face of each optical fiber 5 corresponding with each second lens face 12.

As shown in FIG. 3, the recessing section 14 is formed such that the bottom surface 14e as well as all side surfaces 14a to d of the recessing section 14 fit within an area indicated by the outer shape of an opening section 14f of the recessing section 14 when viewed from a surface-normal direction of the upper end surface 4c (above in FIG. 1). In other words, the recessing section 14 is formed such that the respective projection surfaces in the surface-normal direction of the upper end surface 4c of the bottom surface 14e and all side surfaces 14a to d fit within the area indicated by the outer shape of the opening section 14f. The shape of the recessing section 14 such as this is a shape enabling detachability from a mold to be ensured. This similarly applies to the above-described second recessing section 63.

The recessing section 14, the prism 16, the reflective/transmissive layer 17, and the filler material 18, such as those described above, configure a light control section of the present invention that performs control such as to separate the laser light La of each light-emitting element 7 into transmitted light advancing towards the second lens face 12 side and reflected light (monitor light) advancing towards the third lens face 13 side. The configuration and variations of the light control section such as this are described in the specification and drawings of Japanese Patent Application No. 2010-195737 previously filed by the applicant of the present invention.

In addition, as shown in FIG. 1 to FIG. 4 and FIG. 6, a pair of fiber-positioning projecting sections 27 are formed such as to be perpendicular to the left end surface 4b, on the left end surface 4b of the lens array main body 4 in positions on both outer sides of the lens formation surface 26a in the array direction of the second lens faces 12, as an optical-fiber positioning structure on the lens array side. The pair of fiber-positioning projecting sections 27 are formed into circular pin shapes (circular columnar shapes) having the same dimensions that project from the left end surface 4b towards the optical fiber 5 side.

Figure 7:
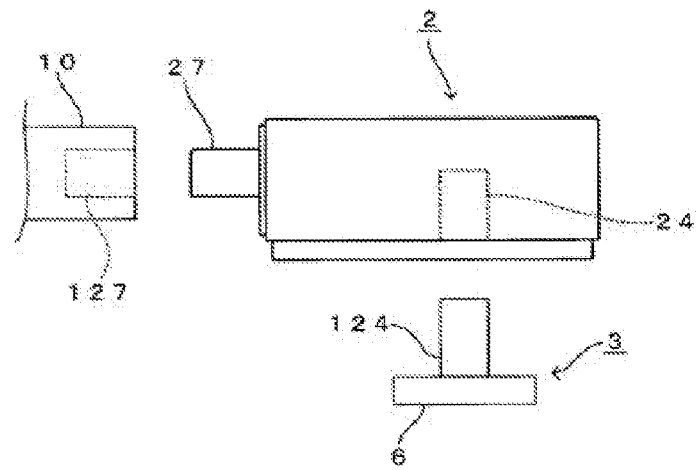
FIG. 7 is an overall configuration diagram of positioning structures of a photovoltaic device and optical fibers in the optical module shown in FIG. 1.

On the other hand, as a configuration on the optical fiber 5 side corresponding with the pair of fiber-positioning projecting sections 27, as shown in FIG. 7, a pair of fiber-positioning recessing sections 127 are formed in the optical connector 10, as an optical-fiber positioning structure on the optical fiber side. However, in FIG. 7, because both fiber-positioning recessing sections 127 overlap in the direction perpendicular to the surface of the paper on which FIG. 7 is printed, only one fiber-positioning recessing section 127 towards the front of the paper surface is visible. The pair of fiber-positioning recessing sections 127 are formed into circular boss-hole shapes having the same dimensions such as to satisfy dimensional accuracy adhering to the above-described standards (IEC 61754-5, JIS C 5981) for F12-type multi-core fiber connectors.

As shown in FIG. 7, when the optical fibers 5 are attached to the lens array 2, the corresponding fiber-positioning projecting sections 27 are inserted into the fiber-positioning recessing sections 127. As a result, positioning of the optical fibers 5 when attaching the optical fibers 5 to the lens array 2 is performed.

Furthermore, as shown in FIG. 6, a pair of device-positioning recessing sections 24 are formed on the lower end surface 4a of the lens array main body 4 in positions on both outer sides of the lens formation surface 23a in the array direction of the first lens faces 11 and the third lens faces 13, as a photovoltaic-device positioning structure on the lens array side. The pair of device-positioning recessing sections 24 are formed into circular boss-hole shapes having the same dimensions, and the center axes thereof are formed in parallel with the optical axis OA(1) of the first lens faces 11.

On the other hand, as a configuration on the photovoltaic device 3 side corresponding with the pair of device-positioning recessing sections 24, as shown in FIG. 7, a pair of device-positioning projecting sections 124 are formed in the semiconductor substrate 6, as the photovoltaic-device positioning structure on the photovoltaic device side. However, in FIG. 7, because both device-positioning projecting sections 124 overlap in the direction perpendicular to the surface of the paper on which FIG. 7 is printed, only one device-positioning projecting section 124 towards the front of the paper surface is visible. The pair of device-positioning projecting sections 124 are formed into circular pin shapes having the same dimensions that extend in a direction parallel to the center axis of the outgoing light from the light-emitting elements 7.

As shown in FIG. 7, when the photovoltaic device 3 is attached to the lens array 2, each device-positioning projecting section 124 is inserted into the corresponding device-positioning recessing section 24. As a result, positioning of the photovoltaic device 3 when attaching the photovoltaic device 3 to the lens array 2 is performed.

Here, as described above, the fiber-positioning recessing section 127 formed in the optical connector 10 is formed having standardized dimensions. Therefore, an alignment operation is not required for positioning the optical fibers 5. Sufficient positioning accuracy can be achieved merely by a mechanical operation in which the fiber-positioning projecting sections 27 are inserted into the fiber-positioning recessing sections 127. When such sufficient positioning accuracy is achieved, no problems regarding the attachment position in relation to the lens array 2 occur on the optical fiber 5 side, even in an instance in which the lens array main body 4 deforms as a result of temperature change.

Conversely, regarding the positioning of the photovoltaic device 3, the standards of the device-positioning projecting section 124 is not prescribed. Therefore, conventionally, sufficient positioning accuracy that can support heat deformation of the lens array main body 4 was difficult to achieve merely by a mechanical operation.

However, according to the present embodiment, a means is employed for positioning the photovoltaic device 3 as well with high accuracy without requiring an alignment operation.

In other words, the lens array 2 according to the present embodiment, together with the photovoltaic device 3 and the optical fibers 5, satisfy a following conditional expression (1):

$$a+b+d_1+e+\Delta L \leq W_1 \quad (1)$$

In expression (1), a represents the positional accuracy [μm] of the first lens faces 11 and is a type of error (dimensional error) in manufacturing of the lens array main body 4 (the same applies hereafter). The value of a may be, for example, a value obtained by adding the total of the displacement amount (error) from an optimal formation position (position based on design) of each first lens face 11 towards the direction perpendicular to the optical axis OA(1) of each first lens face 11, for all first lens faces 11. Expression (1) can be said to indicate the tendency for the positional accuracy required of each first lens face 11 to be high (less error), the greater the number of first lens faces 11 is. Here, a position that is the center point of each first lens face 11 can be used as the position of each first lens face 11. In addition, a reference point for the position of each first lens face 11 can be the center point of a single device-positioning recessing section 24. However, the value of a may be a value obtained by further adding, to the above-described total value of the displacement amount in the direction perpendicular to the optical axis OA(1) of each first lens face 11, the displacement amount from the optimal formation position (position based on design) of each device-positioning recessing section 24 towards the direction perpendicular to the optical axis OA(1) of each device-positioning recessing section 24. In this instance, a position that is the center point of the device-positioning recessing section 24 can be used as the position of the device-positioning recessing section 24. In addition, in this instance, the reference point for the position of the first lens face 11 and the device-positioning recessing section 24 can be a point other than the center point of the device-positioning recessing section 24. As an example of the reference point, a center point on a virtual line segment that connects the center points of the pair of device-positioning recessing sections 24, or a point (the point not deviating from the lower end surface 4a) on a virtual line parallel with the lower end surface 4a of the lens array main body 4 that is perpendicular to the virtual line segment of the center point can be given.

In addition, in expression (1), b represents the positional accuracy [μm] of the second lens faces 12 and is a type of error in manufacturing of the lens array main body 4 (the same applies hereafter). The value of b may be, for example, a value obtained by adding the total of the displacement amount from an optimal formation position (position based on design) of each second lens face 12 towards the direction perpendicular to the optical axis OA(2) of each second lens face 12, for all second lens faces 12. Expression (1) can be said to indicate the tendency for the positional accuracy required of each second lens face 11 to be high (less error), the greater the number of second lens faces 12 is. Here, a position that is the center point of each second lens face 12 can be used as the position of each second lens face 12. In addition, a reference point for the position of each second lens face 12 can be the center point of a single fiber-positioning projecting section 27. However, the value of b may be a value obtained by further adding, to the above-described total value of the displacement amount in the direction perpendicular to the optical axis OA(2) of each second lens face 12, the displacement amount from the optimal formation position (position based on design) of each fiber-positioning recessing section 27 towards the direction perpendicular to the optical axis OA(2) of each fiber-positioning recessing section 27. In this instance, a position that is the center point of the fiber-positioning recessing section 27 can be used as the position of the fiber-positioning recessing section 27. In addition, in this instance, the reference point for the position of the second lens face 12 and the fiber-positioning recessing section 27 can be a point other than the center point of the fiber-positioning recessing section 27. As an example of the reference point, a center point on a virtual line segment that connects the center points of the pair of fiber-positioning recessing sections 27, or a point (the point not deviating from the left end surface 4b) on a virtual line parallel with the left end surface 4b of the lens array main body 4 that is perpendicular to the virtual line segment of the center point can be given.

Furthermore, in expression (1), $d_1$ represents the positional accuracy [μm] of the light-emitting elements 7 of the photovoltaic device 3 and is a type of error in manufacturing of the photovoltaic device 3 (the same applies hereafter). The value of $d_1$ may be, for example, a value obtained by adding the total of the displacement amount from an optimal formation position (position based on design) of each light-emitting element 7 towards the direction perpendicular to the outgoing direction of the laser light La of each light-emitting element 7 (in other words, the optical axis OA(1) direction), for all light-emitting elements 7. Expression (1) can be said to indicate the tendency for the positional accuracy required of each light-emitting element 7 to be high (less error), the greater the number of light-emitting elements 7 is. Here, a position that is the light-emitting point of each light-emitting element 7 can be used as the position of each light-emitting element 7. In addition, a reference point for the position of each light-emitting element 7 can be the center point of a single device-positioning projecting section 124. However, the value of $d_1$ may be a value obtained by further adding, to the above-described total value of the displacement amount in the direction perpendicular to the outgoing direction of the laser light La of each light-emitting element 7, the displacement amount from the optimal formation position (position based on design) of each device-positioning projecting section 124 towards the direction perpendicular to the outgoing direction of the laser light La of each device-positioning projecting section 124. In this instance, a position that is the center point of the device-positioning projecting section 124 can be used as the position of the device-positioning projecting section 124. In addition, in this instance, the reference point for the position of the light-emitting element 7 and the device-positioning projecting section 124 can be a point other than the center point of the device-positioning projecting section 124. As an example of the reference point, a center point on a virtual line segment that connects the center points of the pair of device-positioning projecting sections 124, or a point (the point not deviating from an element formation surface) on a virtual line parallel with an element formation surface of the semiconductor substrate 6 that is perpendicular to the virtual line segment of the center point can be given.

Still further, in expression (1), e represents the positional accuracy [μm] of the optical fibers 5 and is a type of error in manufacturing (assembly) of the optical connector 10 (the same applies hereafter). The value of e may be, for example, a value obtained by adding the total of the displacement amount from an optimal formation position (position based on design) of the end face 5 of each optical fiber 5 towards the direction perpendicular to the fiber axis direction of the end face 5a of each optical fiber (in other words, the optical axis OA(2) direction), for all optical fibers 5. Expression (1) can be said to indicate the tendency for the positional accuracy required of each optical fiber 5 to be high (less error), the greater the number of optical fibers 5 is. Here, a position that is the center point of the end face 5a of each optical fiber 5 can be used as the position of the end face 5a of each optical fiber 5. In addition, a reference point for the position of each optical fiber 5 can be the center point of a single fiber-positioning recessing section 127. However, the value of e may be a value obtained by further adding, to the above-described total value of the displacement amount in the direction perpendicular to the fiber axis direction of the end face 5a of each optical fiber 5, the displacement amount from the optimal formation position (position based on design) of each fiber-positioning recessing section 127 towards the direction perpendicular to the fiber axis direction of each fiber-positioning recessing section 127. In this instance, a position that is the center point of the fiber-positioning recessing section 127 can be used as the position of the fiber-positioning recessing section 127. In addition, in this instance, the reference point for the position of the end face 5a of the optical fiber 5 and the fiber-positioning recessing section 127 can be a point other than the center point of the fiber-positioning recessing section 127. As an example of the reference point, a center point on a virtual line segment that connects the center points of the pair of fiber-positioning recessing sections 127, or a point (the point not deviating from the end face of the optical connector 10) on a virtual line parallel with the end face of the optical connector 10 that is perpendicular to the virtual line segment of the center point can be given.

In addition, in expression (1), ΔL represents the amount of change [μm] in the lens position caused by temperature change expressed by a following expression (the same applies hereafter):

$$\Delta L = \alpha \times \Delta T \times L \quad (1a)$$

In expression (1a), α represents a coefficient of linear expansion [1/° C.] of the lens array main body. In addition, in expression (1a), ΔT represents the temperature change [° C.] in the lens array main body 4.

Furthermore, in expression (1a), L represents the distance [mm] based on design between a fixed position on the lower end surface 4a of the lens array main body 4 and a position of the lens face (in other words, the first lens face 11 or the third lens face 13) on the lower end surface 4a farthest from the fixed position. As the fixed position, a position is preferably used that can be considered to be the center of deformation when the lens array main body 4 to which the photovoltaic device 3 is attached deforms as a result of temperature change.

Figure 8:
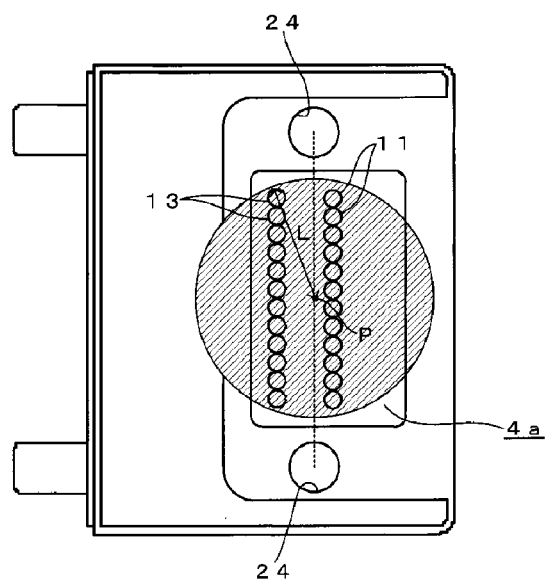
FIG. 8 is a first explanatory diagram used to describe L and $\Delta L$ in expression (1).

For example, in an instance in which the semiconductor substrate 6 less easily deforms as a result of temperature change than the lens array main body 4 (has a smaller coefficient of linear expansion), the position of the center point of the virtual line segment connecting the center points of the pair of device-positioning recessing sections 24 may be used as the fixed position. In this instance, as L in expression (1a), the distance between the fixed position and the center point of the lens face 11 (13) on the lower end surface 4a farthest from the fixed position or a point on the peripheral end portion (point farthest from the fixed position) may be used. Here, FIG. 8 shows a fixed position P and the corresponding L in this instance. In FIG. 8, the lens face 11 (13) on the lower end surface 4a farthest from the fixed position P is the outermost third lens face 13 in the array direction among the plurality of third lens faces 13. The distance from the point farthest from the fixed position P on the peripheral end portion of the outermost third lens face 13 and the fixed position P is L. The shaded portion in FIG. 8 indicates an area corresponding with ΔL that satisfies expression (1) in the instance in which the semiconductor substrate 6 less easily deforms as a result of temperature change than the lens array main body 4. The outline of the area forms a circle having a radius L+ΔL with the fixed position P as the center. This corresponds with the lens array main body 4 being considered to deform with the fixed position P at the center. All lens faces 11 (13) are clearly contained within the area.

Figure 9:
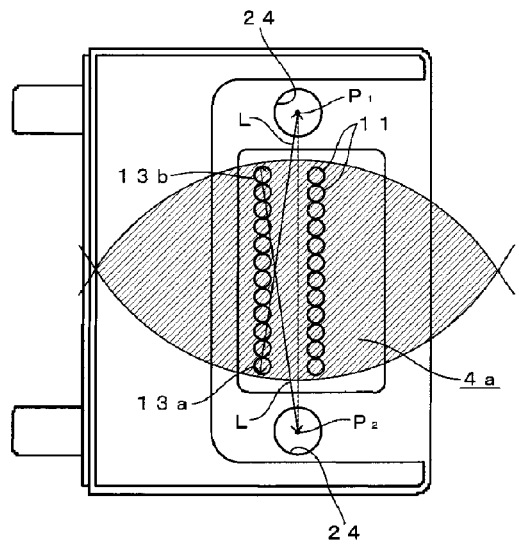
FIG. 9 is a second explanatory diagram used to described L and ΔL in expression (1).

On the other hand, in an instance in which the semiconductor substrate 6 more easily deforms as a result of temperature change than the lens array main body 4 (has a greater coefficient of linear expansion), the positions of the respective center points of the pair of device-positioning recessing sections 24 may be used as fixed positions (two fixed positions). In this instance, as L in expression (1a), the greater of the distance between one fixed position and the center point of the lens face 11 (13) on the lower end surface 4a farthest from the one fixed position or a point on the peripheral end portion (point farthest from the one fixed position), and the distance between the other fixed position and the center point of the lens face 11 (13) on the lower end surface 4a farthest from the other fixed position or a point on the peripheral end portion (point farthest from the other fixed position) may be used. Here, FIG. 9 shows two fixed position $P_1$ and $P_2$ and the corresponding L in this instance. In FIG. 9, the lens face 11 (13) on the lower end surface 4a farthest from the one fixed position $P_1$ is a third lens face 13a on one end side in the array direction among the plurality of third lens faces 13. The lens face 11 (13) on the lower end surface 4a farthest from the other fixed position $P_2$ is a third lens face 13b on the other end side in the array direction among the plurality of third lens faces 13. In FIG. 9, the distance between the one fixed position $P_1$ and the point farthest from the one fixed position $P_1$ on the peripheral end portion of the third lens face 13a on the one end side in the array direction matches the distance between the other fixed position $P_2$ and the point farthest from the other fixed position $P_2$ on the peripheral end portion of the third lens face 13b on the other end side in the array direction. Therefore, in FIG. 9, the distance between $P_1$ and 13a and the distance between $P_2$ and 13b are both L. The shaded portion in FIG. 9 indicates an area corresponding with ΔL that satisfies expression (1) in the instance in which the semiconductor substrate 6 more easily deforms as a result of temperature change than the lens array main body 4. The outline of the area forms a shape surrounded by an arc having a radius L+ΔL with the one fixed position $P_1$ as the center and an arc having a radius L+ΔL with the other fixed position $P_2$ as the center. This corresponds with the lens array main body 4 being considered to deform with the two fixed positions $P_1$ and $P_2$ at the center. All lens faces 11 (13) are clearly contained within the area.

Finally, in expression (1), $W_1$ represents a first tolerance [μm] (the same applies hereafter). Here, the first tolerance refers to a distance (attachment position margin width) between an attachment position before movement and an attachment position after movement, under a premise that the photovoltaic device 3 is moved along the direction perpendicular to the optical axis OA(1) of the first lens faces 11 from an attachment position to the lens array main body 4 at which the optical coupling efficiency between the light-emitting elements 7 and the end faces 5a of the optical fibers 5 indicates a maximum efficiency set in advance to an attachment position at which a reduction in optical coupling efficiency equivalent to 2 dB from the maximum efficiency is indicated.

As a result of expression (1) such as this being satisfied, when the photovoltaic device 3 is attached to the lens array main body 4, alignment in the outgoing direction of the laser light La of the light-emitting element 7 (in other words, the optical axis OA(1) direction) and any direction perpendicular thereto is not required. Highly accurate positioning of the photovoltaic device 3 can be easily performed such that sufficient optical coupling efficiency between the light-emitting elements 7 and the end faces 5a of the optical fibers 5 can be achieved regardless of temperature increase merely by a mechanical operation of inserting the device-positioning projecting sections 124 into the device-positioning recessing sections 24. Specifically, even when the lens array main body 4 deforms as a result of temperature increase, the error based on design in the optical coupling efficiency between the light-emitting elements 7 and the end faces 5a of the optical fibers 5 can be controlled within 2 dB.

To manufacture a lens array 2 that satisfies expression (1) such as this, for example, first, optimal lens array, photovoltaic device, and optical fibers having no dimensional errors or attachment errors (in other words, based on design) are assumed. Next, regarding the assumed optimal optical system, a simulation for optical coupling efficiency between the light-emitting elements and the end faces of the optical fibers under a premise that the photovoltaic device is moved in the direction perpendicular to the outgoing direction of the laser light La from the optimal attachment position corresponding with the maximum coupling efficiency between the light-emitting elements and the end faces of the optical fibers is performed. Then, the values on the left side of expression (1) are set so as to satisfy the first tolerance $W_1$ obtained from the results of the simulation. The lens array 2 is then manufactured so as to satisfy each of the set values. Here, within expression (1), the values a, b, and $\Delta L$ directly concern the dimensions of the lens array 2. These values can be reflected as the dimensional accuracy (regarding a and b) the dimensions (regarding L) of the mold used to mold the lens array main body 4, and the type of resin material (regarding $\alpha$). However, it goes without saying that the values of a, b, and $\Delta L$ are set taking into consideration the value of $d_1$ that concerns the light-emitting elements 7 of the photovoltaic device 3 and the value of e that concerns the optical fibers 5. The value of e is merely required to satisfy the dimensional accuracy in adherence to the above-described standards (IEC 61754-5, JIS C 5981) for F12-type multi-core fiber connectors.

In addition to the above-described configuration, the lens array 2 according to the present embodiment, together with the photovoltaic device 3 and the optical fibers 5, further satisfies a following conditional expression (2):

$$a+c+d_1+d_2+\Delta L \leq W_2 \quad (2)$$

In expression (2), c represents the positional accuracy [μm] of the third lens faces 13 and is a type of error in manufacturing of the lens array main body 4 (the same applies hereafter). The value of c may be, for example, a value obtained by adding the total of the displacement amount from an optimal formation position (position based on design) of each third lens face 13 towards the direction perpendicular to the optical axis OA(3) of each third lens face 13, for all third lens faces 13. Expression (2) can be said to indicate the tendency for the positional accuracy required of each third lens face 13 to be high (less error), the greater the number of third lens faces 13 is. Here, a position that is the center point of each third lens face 13 can be used as the position of each third lens face 13. In addition, a reference point for the position of each third lens face 13 can be the center point of a single device-positioning recessing section 24. However, the value of c may be a value obtained by further adding, to the above-described total value of the displacement amount in the direction perpendicular to the optical axis OA(3) of each third lens face 13, the displacement amount from the optimal formation position (position based on design) of each device-positioning recessing section 24 towards the direction perpendicular to the optical axis OA(3) of each device-positioning recessing section 24. In this instance, a position that is the center point of the device-positioning recessing section 24 can be used as the position of the device-positioning recessing section 24. In addition, in this instance, the reference point for the position of the third lens face 13 and the device-positioning recessing section 24 can be a point other than the center point of the device-positioning recessing section 24. As an example of the reference point, a center point on a virtual line segment that connects the center points of the pair of device-positioning recessing sections 24, or a point (the point not deviating from the lower end surface 4a) on a virtual line parallel with the lower end surface 4a of the lens array main body 4 that is perpendicular to the virtual line segment of the center point can be given.

In addition, in expression (2), $d_2$ represents the positional accuracy [μm] of the light-receiving elements 8 of the photovoltaic device 3 and is a type of error in manufacturing of the photovoltaic device 3 (the same applies hereafter). The value of $d_2$ may be, for example, a value obtained by adding the total of the displacement amount from an optimal formation position (position based on design) of each light-receiving element 8 towards the direction perpendicular to the direction of incidence of the monitor light M of each light-receiving element 8 (in other words, the optical axis OA(3) direction), for all light-receiving elements 8. Expression (2) can be said to indicate the tendency for the positional accuracy required of each light-receiving element 8 to be high (less error), the greater the number of light-receiving elements 8 is. Here, a center position of a light-receiving surface of each light-receiving element 8 can be used as the position of each light-receiving element 8. In addition, a reference point for the position of each light-receiving element 8 can be the center point of a single device-positioning projecting section 124. However, the value of $d_2$ may be a value obtained by further adding, to the above-described total value of the displacement amount in the direction perpendicular to the direction of incidence of the monitor light M of each light-receiving element 8, the displacement amount from the optimal formation position (position based on design) of each device-positioning projecting section 124 towards the direction perpendicular to the direction of incidence of the monitor light M of each device-positioning projecting section 124. In this instance, a position that is the center point of the device-positioning projecting section 124 can be used as the position of the device-positioning projecting section 124. In addition, in this instance, the reference point for the position of the light-receiving element 8 and the device-positioning projecting section 124 can be a point other than the center point of the device-positioning projecting section 124. As an example of the reference point, a center point on a virtual line segment that connects the center points of the pair of device-positioning projecting sections 124, or a point (the point not deviating from the element formation surface) on a virtual line parallel with the element formation surface of the semiconductor substrate 6 that is perpendicular to the virtual line segment of the center point can be given.

Furthermore, in expression (2), $W_2$ represents a second tolerance [μm] (the same applies hereafter). Here, the second tolerance refers to a distance (attachment position margin width) between an attachment position before movement and an attachment position after movement, under a premise that the photovoltaic device 3 is moved along the direction perpendicular to the optical axis OA(1) of the first lens faces 11 from an attachment position to the lens array main body 4 at which the optical coupling efficiency between the light-emitting elements 7 and the end faces 5a of the optical fibers 5 indicates a maximum efficiency set in advance to an attachment position at which a reduction in optical coupling efficiency equivalent to 2 dB from the maximum efficiency is indicated.

The meanings of the other parameters a, $d_1$, and $\Delta L$ in expression (2) are as described above in the description for expression (1).

As a result of expression (2) such as this being satisfied, when the photovoltaic device 3 is attached to the lens array main body 4, highly accurate positioning of the photovoltaic device 3 can be easily performed such that sufficient optical coupling efficiency between the light-emitting elements 7 and the light-receiving elements 8 can be achieved regardless of temperature increase merely by a mechanical operation of inserting the device-positioning projecting sections 124 into the device-positioning recessing sections 24.

To manufacture a lens array 2 that satisfies expression (2) such as this, for example, first, optimal lens array, photovoltaic device, and optical fibers having no dimensional errors or attachment errors (in other words, based on design) are assumed. Next, regarding the assumed optimal optical system, a simulation for optical coupling efficiency between the light-emitting elements and the light-receiving elements under a premise that the photovoltaic device is moved in the direction perpendicular to the outgoing direction of the laser light La from the optimal attachment position corresponding with the maximum coupling efficiency between the light-emitting elements and the light-receiving elements is performed. Then, the values on the left side of expression (2) are set so as to satisfy the second tolerance $W_2$ obtained from the results of the simulation. The lens array 2 is then manufactured so as to satisfy each of the set values. Here, within expression (2), other than the parameters in expression (1), the value of c directly concerns the dimensions of the lens array 2. The value can be reflected as the dimensional accuracy of the mold used to mold the lens array main body 4.

EXAMPLES

Examples of the present invention will be described with reference to FIG. 10 and FIG. 11.

Figure 10:
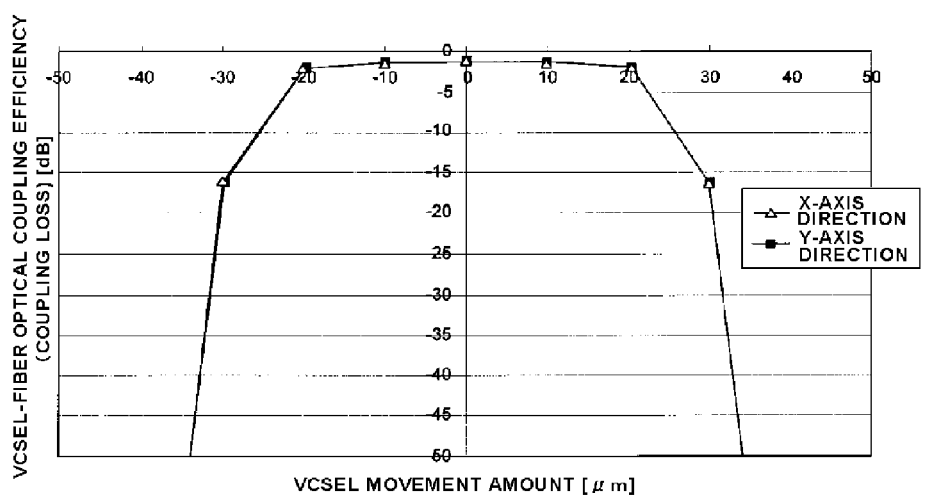
FIG. 10 is a graph showing the results of a simulation performed to determine first tolerance.

FIG. 10 shows the simulation results for optical coupling efficiency using the lens array 2 based on design between light-emitting sections (light-emitting elements) of a VCSEL including a monitor PD as the photovoltaic device 3 and the end faces 5a of multi-mode optical fibers 5 having a diameter of 50 μm, as specific simulation results for determining the first tolerance $W_1$.

The vertical axis in FIG. 10 indicates the optical coupling efficiency between the VCSEL and the fibers as coupling loss (dB). The horizontal axis in FIG. 10 indicates a movement width [μm] from a point of origin under a premise that the VCSEL is moved in the direction perpendicular to the optical axis OA(1) of the first lens faces 11 from the attachment position (point of origin on the horizontal axis) to the lens array 2 at which the optical coupling efficiency becomes the maximum efficiency based on design set in advance. The position of the optical fibers 5 in the simulation is assumed to be an (ideal) attachment position based on design having no attachment errors in relation to the lens array 2.

In FIG. 10, under a premise that the axial direction of the optical axis OA(1) of the first lens faces 11 is a Z-axis direction, the VCSEL is moved in an X-axis direction (see FIG. 6) that is perpendicular to the Z-axis direction and parallel with the array direction of the light-emitting sections, and a Y-axis direction (see FIG. 6) that is perpendicular to both the Z-axis direction and the X-axis direction. However, the directions are not limited to the X-axis direction and the Y-axis direction. Simulation results similar to those in FIG. 10 can be achieved as long as the movement of the VCSEL is performed in a direction perpendicular to the Z-axis direction.

In the simulation results, the maximum efficiency set in advance is an efficiency in which the coupling loss from an optical coupling efficiency of 100% is about 2 dB. The horizontal-axis width when the optical coupling efficiency decreases by an amount of efficiency equivalent to the coupling loss 2 dB from the maximum efficiency is 19 μm. This width is the first tolerance $W_1$.

Therefore, for example, when a=3 μm, b=4 μm, $d_1$=2 μm, e=5 μm, and ΔL=3 μm, the lens array 2, the VCSEL, and the optical fibers 5 satisfying expression (1) corresponding with FIG. 10 can be actualized. In this instance, the breakdown of L can be α=5.6×10$^{-5}$ [1/° C.], ΔT=24° C., L (corresponding to FIG. 8)=2.230 mm.

In addition to the above, for example, when a=2 μm, b=1 μm, $d_1$=1 μm, e=2 μm, and ΔL=11 μm (α=5.6×10$^{-5}$ [1/° C.], ΔT=88° C., L (corresponding to FIG. 8)=2.230 mm), the lens array 2, the VCSEL, and the optical fibers 5 satisfying expression (1) corresponding with FIG. 10 can be actualized.

Still further, in addition to the above, for example, when a=1 μm, b=2 μm, $d_1$=1 μm, e=1 μm, and ΔL=12 μm (α=5.6×10$^{-5}$ [1/° C.], ΔT=96° C., L (corresponding to FIG. 8)=2.230 mm), the lens array 2, the VCSEL, and the optical fibers 5 satisfying expression (1) corresponding with FIG. 10 can be actualized.

Figure 11:
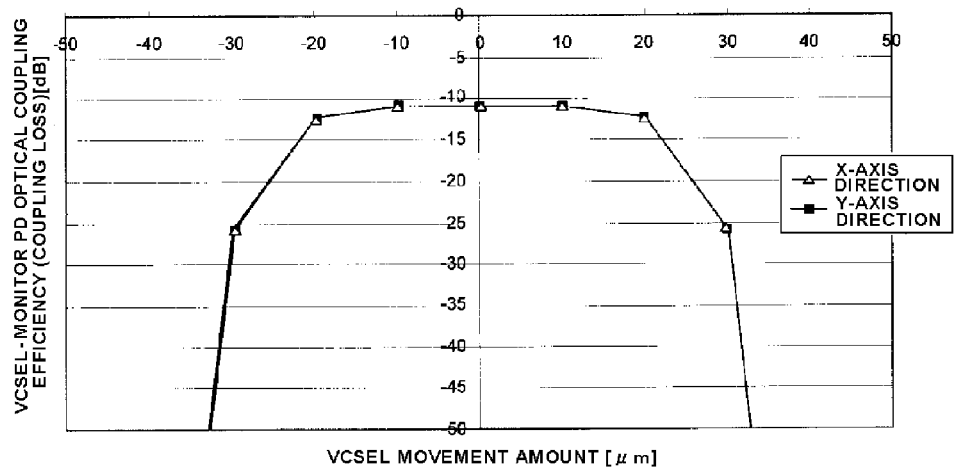
FIG. 11 is a graph showing the results of a simulation performed to determine second tolerance.

Next, FIG. 11 shows the simulation results for optical coupling efficiency using the lens array 2 based on design between light-emitting sections (light-emitting elements) of a VCSEL including a monitor PD as the photovoltaic device 3 and light-receiving sections (light-receiving elements) of the monitor PD, as specific simulation results for determining the second tolerance $W_2$.

The vertical axis and the horizontal axis in FIG. 11 are similar to those in FIG. 10. The position of the monitor PD in the simulation is assumed to move integrally with the VCSEL, in a state in which the monitor PD is formed in a (optimal) formation position based on design with no dimensional errors on the VCSEL.

In FIG. 11, in a manner similar to that in FIG. 10, the VCSEL is moved in the X-axis direction and the Y-axis direction. However, the directions are not limited to the X-axis direction and the Y-axis direction. Simulation results similar to those in FIG. 11 can be achieved as long as the movement of the VCSEL is performed in a direction perpendicular to the Z-axis direction.

In the simulation results, the maximum efficiency set in advance is an efficiency in which the coupling loss from an optical coupling efficiency of 100% is about 11 dB. The horizontal-axis width when the optical coupling efficiency decreases by an amount of efficiency equivalent to a coupling loss 2 dB from the maximum efficiency is 19 μm. This width is the second tolerance $W_2$.

Therefore, for example, when a=3 μm, c=4 μm, $d_1$=2 μm, $d_2$=2 μm, and ΔL=3 μm (α=5.6×10$^{-5}$ [1/° C.], ΔT=24° C., L (corresponding to FIG. 8)=2.230 mm), the lens array 2 and the VCSEL satisfying expression (2) corresponding with FIG. 11 can be actualized.

In addition to the above, for example, when a=2 μm, c=1 μm, $d_1$=1 μm, $d_2$=1 μm, and ΔL=11 μm (α=5.6×10$^{-5}$ [1/° C.], ΔT=88° C., L (corresponding to FIG. 8)=2.230 mm), the lens array 2 and the VCSEL satisfying expression (2) corresponding with FIG. 11 can be actualized.

Still further, in addition to the above, for example, when a=1 μm, c=2 μm, $d_1$=1 μm, $d_2$=1 μm, and ΔL=12 μm (α=5.6×10$^{-5}$ [1/° C.], ΔT=96° C., L (corresponding to FIG. 8)=2.230 mm), the lens array 2 and the VCSEL satisfying expression (2) corresponding with FIG. 11 can be actualized.

Variation Examples

In addition to the above-described configuration, various variation examples based on the design concept can be considered according to the present embodiment.

Figure 12:
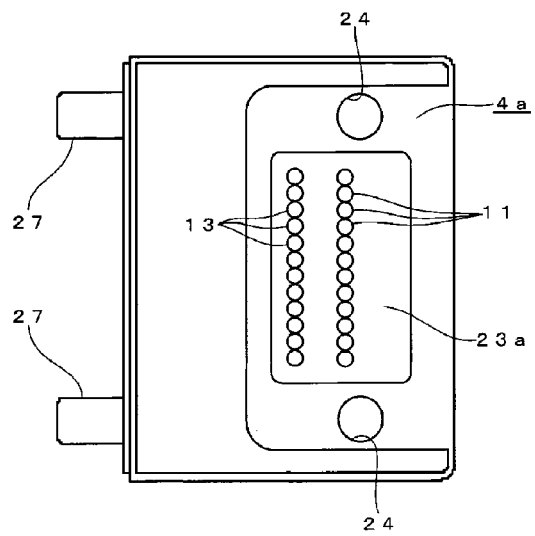
FIG. 12 is a bottom view of one variation example according to the first embodiment.
Figure 13:
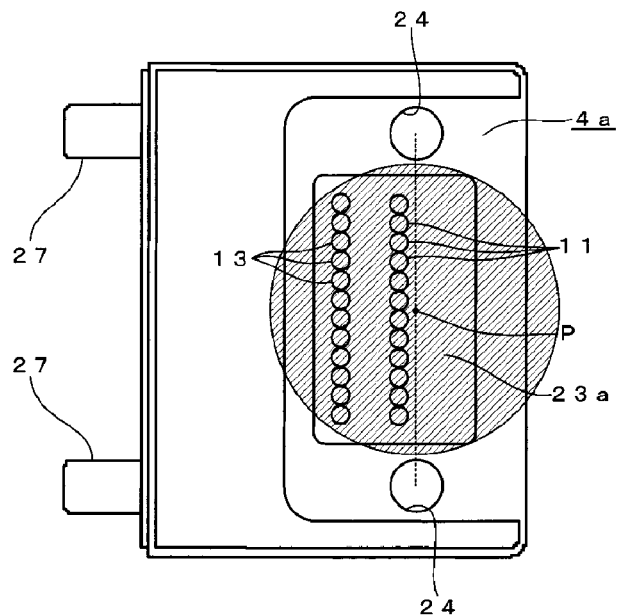
FIG. 13 is a first explanatory diagram used to describe ΔL in the configuration in FIG. 12.
Figure 14:
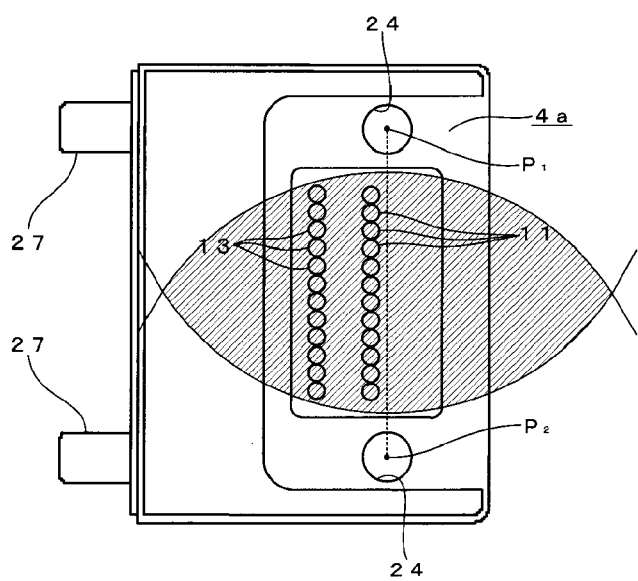
FIG. 14 is a second explanatory diagram used to describe ΔL in the configuration in FIG. 12.

For example, as shown in FIG. 12, the positions of the pair of device-positioning recessing sections 24 can be shifted further towards the first lens face 11 side than the positions shown in FIG. 6. FIG. 13 shows the area corresponding to ΔL that satisfies expression (1) in this instance, in an instance in which the semiconductor substrate 6 less easily deforms as a result of temperature change than the lens array main body 4. FIG. 14 shows the area corresponding to ΔL that satisfies expression (1), in an instance in which the semiconductor substrate 6 more easily deforms as a result of temperature change than the lens array main body 4.

In addition, if there are no issues in terms of mechanical strength of the lens array main body 4 and relationship with other shapes and the like to be formed as required in the lens array main body 4, the device-positioning recessing sections 24 may be modified in design to be through holes instead of bottomed holes. In addition, as long as there are no deviations from the above-described standards, the fiber-positioning recessing sections 127 may also be changed from bottomed holes to through holes. Furthermore, the recessing and projecting relationship between the photovoltaic-device positioning structure (projecting sections) on the photovoltaic device 3 side and the photovoltaic-device positioning structure (recessing sections) on the lens array 2 side may be reversed. In addition, the recessing and projecting relationship between the optical-fiber positioning structure (recessing sections) on the optical fiber 5 side and the optical-fiber positioning structure (projecting sections) on the lens array 2 side may also be reversed.

Figure 15:
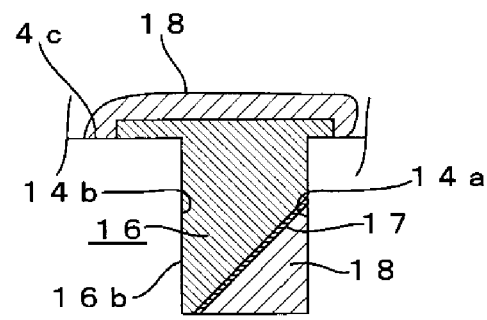
FIG. 15 is an overall vertical cross-sectional view of one variation example according to the first embodiment differing from that in FIG. 12 to FIG. 14.
Figure 16:
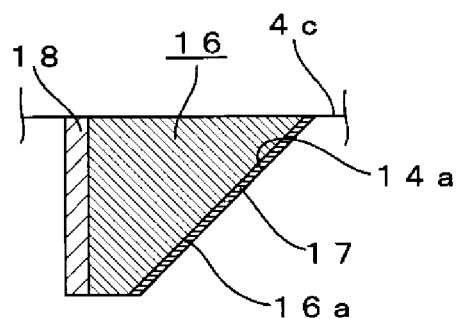
FIG. 16 is an overall vertical cross-sectional view of one variation example according to the first embodiment differing from those in FIG. 12 to FIG. 15.

Furthermore, as the light control section, in addition to the configuration shown in FIG. 1, a variation disclosed in above-described Patent Application No. 2010-195737 can be used accordingly. For example, as shown in FIG. 15, an appropriate optical path can be secured even in an instance in which the second prism face 16*b* and the second optical face 14*b* are configured such as to be in contact. Furthermore, for example, as shown in FIG. 16, a configuration is possible in which the first optical surface 14*a* is formed into a sloped surface that is in parallel with and near the first prism face 16*a*. The reflective/transmissive layer 17 is interposed between the first optical surface 14*a* and the first prism surface 16*a*. In this instance, an appropriate optical path can be secured as a result of the lens array main body 4 and the prism 16 being formed such as to have the same refractive index.

Figure 17:
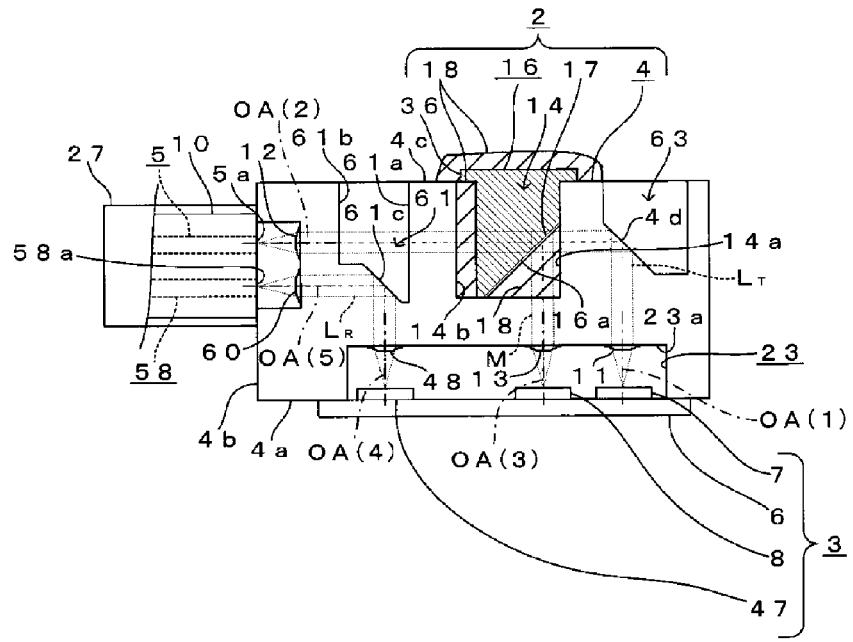
FIG. 17 is an overall vertical cross-sectional view of one variation example according to the first embodiment differing from those in FIG. 12 to FIG. 16.
Figure 18:
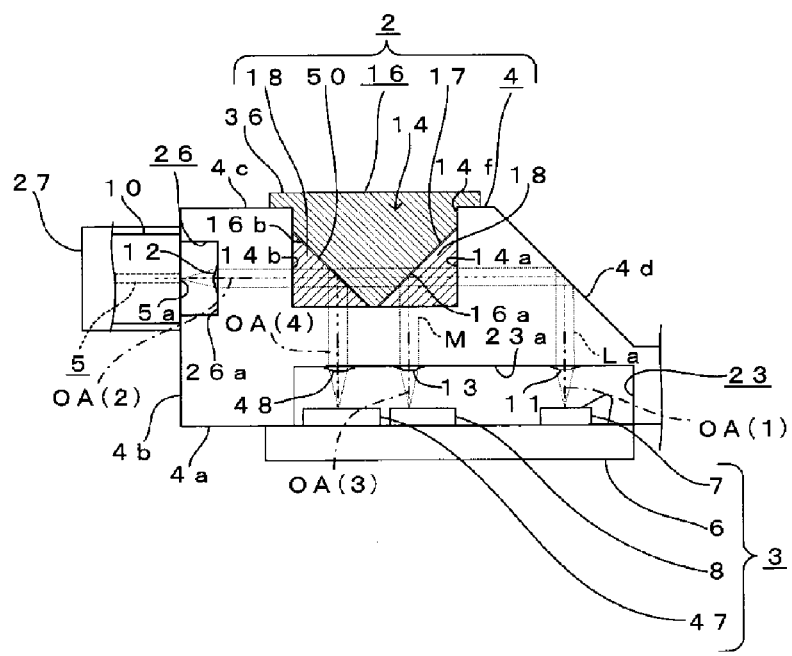
FIG. 18 is an overall vertical cross-sectional view of one variation example according to the first embodiment differing from those in FIG. 12 to FIG. 17.

Still further, for example, as shown in FIG. 17 and FIG. 18, a configuration may be used that supports bidirectional communication.

In other words, first, in the configuration in FIG. 17, the photovoltaic device 3 includes a plurality of second light-receiving elements 47 on the surface of the semiconductor substrate 6 facing the lens array 22, in positions near the left-hand side in FIG. 17 in relation to the light-receiving elements 8. The plurality of second light-receiving elements 47 are formed along the same direction as the array direction of the light-receiving elements 8, at the same pitch as the light-receiving elements 8. The number of light-receiving elements 47 is the same as the number of light-receiving elements 8. The second light-receiving elements 47 may be photodetectors. In addition, as shown in FIG. 17, a plurality of fourth lens faces 48 having a circular planar shape with the same dimensions as one another are formed on the lower end surface 4*a* (lens formation surface 23*a*) of the lens array main body 4 in positions facing the second lens receiving elements 47. The plurality of fourth lens faces 48 are formed along the same direction as the array direction of the second light-receiving elements 47, at the same pitch as the second light-receiving elements 47. The number of fourth lens faces 48 is the same as the number of second light-receiving elements 47. Furthermore, as shown in FIG. 17, reception-dedicated second optical fibers 58 are arranged in parallel near the optical fibers 5 in the optical connector 10 (near the lower side in FIG. 17). The second optical fibers 58 are formed along the same direction as the array direction of the optical fibers 5, at the same pitch as the optical fibers 5. The number of second optical fibers 58 (12 optical fibers) is the same as the number of optical fibers 5. In addition, the number of optical fibers 58 is the same as the number of second light-receiving elements 47 and the number of fourth lens faces 48. Laser light $L_R$ is emitted towards a lens array 22 from each end face 58*a* of the plurality of second optical fibers 58 facing the lens array 22. The laser light $L_R$ is equivalent to an optical signal for reception. Furthermore, as shown in FIG. 17, fifth lens faces 60 are formed on the left end surface 4*b* of the lens array main body 4 in positions adjacent to the second lens faces 12 in a direction perpendicular to the array direction of the second lens faces 12 (downward in FIG. 17) and facing the end faces 58*a* of the second optical fibers 58. The number of fifth lens faces 60 is the same as the number of second optical fibers 58. The laser light $L_R$ emitted from each second optical fiber 58 enters the fifth lens faces 60. The plurality of fifth lens faces 60 are formed having a circular planar shape with the same dimensions as one another, and are formed in an array along the array direction of the second lens faces 12 at the same pitch as the second lens faces 12. The fifth lens faces 60 may have the same dimensions as the second lens faces. Furthermore, as shown in FIG. 17, a third recessing section 61 is formed in a recessing manner on the upper end surface 4*c* of the lens array main body 4 in a position on the left side of the recessing section 14, such as to be positioned on the optical path connecting the first lens faces 11 and the second lens faces 12 and further to the left side than the recessing section 14. Here, as shown in FIG. 17, the third recessing section 61 has a third optical surface 61*a* forming a portion of the inner surface thereof (the right-side surface in FIG. 17 of the third recessing section 61). The third optical surface 61*a* is formed in parallel with the left end surface 4*b* of the lens array main body 4. Laser light $L_T$ of each light-emitting element 7 that has advanced towards the second lens face side 12 after entering the second optical surface 14*b* of the recessing section 14 perpendicularly enters the third optical surface 61*a* such as this from the right side in FIG. 17, as shown in FIG. 17. In addition, as shown in FIG. 17, the third recessing section 61 has a fourth optical surface 61*b* that forms a portion of the inner surface thereof and a portion opposing the third optical surface 61*a* on the left-hand side in FIG. 17 (Left-side surface in FIG. 17 of the third recessing section 61). The fourth optical surface 61*b* is formed in parallel with the left end surface 4*b*. The laser light $L_T$ of each light-emitting element 7 that has advanced towards the second lens face side 12 after entering the third optical surface 61*a* perpendicularly enters the fourth optical surface 61*b* from the right side in FIG. 17, as shown in FIG. 17. Furthermore, as shown in FIG. 17, the third recessing section 61 has a second total reflection surface 61*c* that forms a portion of the inner surface thereof, or in other words, a center portion of the bottom surface in FIG. 17 of the third recessing section 61. The second total reflection surface 61*c* is formed into a sloped surface such that the upper end portion thereof is positioned further to the left side in FIG. 17 than the lower end portion thereof. Portions of the bottom surface of the third recessing section 61 other than the second total reflection surface 61*c* are formed in parallel with the upper end surface 4*c* of the lens array main body 4. The second total reflection surface 61*c* may be formed in parallel with the above-described total reflection surface 4*d*. The laser light $L_R$ of each second optical fiber 58 that has entered each fifth lens face 60 enters the second total reflection surface 61*c* such as this at an angle of incidence that is the critical angle or greater, from the left side in FIG. 17. The second total reflection surface 61*c* totally reflects the incident laser light $L_R$ of each second optical fiber 58 towards the fourth lens face 48 side (downward in FIG. 17). In a configuration such as this, the laser light $L_R$ emitted from each second optical fiber 58 can be coupled with each second light-receiving element 47, via the fifth lens faces 60, the second total reflection surface 61c, and the fourth lens faces 48. Therefore, reception of optical signals can be effectively supported. In particular, the configuration in FIG. 17 is ideal for application to optical communication at 120 Gbps under the CXP standards that have been recently proposed (see September 2009 InfiniBand Architecture Specification Vol. 2, Release 1.2.1). In addition, in the configuration in FIG. 17, as described above, the laser light $L_T$ perpendicularly enters both the third optical surface 61a and the fourth optical surface 61b. Therefore, the third recessing section 61, which can be considered an effective element for forming the second total reflection surface 61c without increasing the number of components and into a shape ensuring mold-detachability, does not refract the laser light $L_R$ and change the advancing direction. Therefore, both transmission and reception of optical signals can be achieved with certainty. Preferably, the optical axis OA(4) of the fourth lens faces 48 is formed perpendicular to the lower end surface 4a, and the optical axis OA(5) of the fifth lens faces 60 are formed perpendicular to the left end surface 4b.

In the configuration in FIG. 17 such as this, a following conditional expression (3) may be further satisfied in addition to the conditional expressions (1) and (2):

$$f+g+d_3+e_2+\Delta L \leq W_3 \quad (3)$$

In expression (3), f represents the positional accuracy [μm] of the fourth lens faces 48 and is a type of error (dimensional error) in manufacturing of the lens array main body 4 (the same applies hereafter). The value of f may be, for example, a value obtained by adding the total of the displacement amount (error) from an optimal formation position (position based on design) of each fourth lens face 48 towards the direction perpendicular to the optical axis OA(4) of each fourth lens face 48, for all fourth lens faces 48. Here, a position that is the center point of each fourth lens face 48 can be used as the position of each fourth lens face 48. In addition, a reference point for the position of each fourth lens face 48 can be the center point of a single device-positioning recessing section 24. However, the value of f may be a value obtained by further adding, to the above-described total value of the displacement amount in the direction perpendicular to the optical axis OA(4) of each fourth lens face 48, the displacement amount from the optimal formation position (position based on design) of each device-positioning recessing section 24 towards the direction perpendicular to the optical axis OA(4) of each device-positioning recessing section 24. In this instance, a position that is the center point of the device-positioning recessing section 24 can be used as the position of the device-positioning recessing section 24. In addition, in this instance, the reference point for the position of the fourth lens face 48 and the device-positioning recessing section 24 can be a point other than the center point of the device-positioning recessing section 24. As an example of the reference point, a center point on a virtual line segment that connects the center points of the pair of device-positioning recessing sections 24, or a point (the point not deviating from the lower end surface 4a) on a virtual line parallel with the lower end surface 4a of the lens array main body 4 that is perpendicular to the virtual line segment of the center point can be given.

In addition, in expression (3), g represents the positional accuracy [μm] of the fifth lens faces 60 and is a type of error in manufacturing of the lens array main body 4 (the same applies hereafter). The value of g may be, for example, a value obtained by adding the total of the displacement amount from an optimal formation position (position based on design) of each fifth lens face 60 towards the direction perpendicular to the optical axis OA(5) of each fifth lens face 60, for all fifth lens faces 60. Here, a position that is the center point of each fifth lens face 60 can be used as the position of each fifth lens face 60. In addition, a reference point for the position of each fifth lens face 60 can be the center point of a single fiber-positioning projecting section 27. However, the value of g may be a value obtained by further adding, to the above-described total value of the displacement amount in the direction perpendicular to the optical axis OA(5) of each fifth lens face 60, the displacement amount from the optimal formation position (position based on design) of each fiber-positioning projecting section 27 towards the direction perpendicular to the optical axis OA(5) of each fiber-positioning projecting section 27. In this instance, a position that is the center point of the fiber-positioning projecting section 27 can be used as the position of the fiber-positioning projecting section 27. In addition, in this instance, the reference point for the position of the fifth lens face 60 and the fiber-positioning projecting section 27 can be a point other than the center point of the fiber-positioning projecting section 27. As an example of the reference point, a center point on a virtual line segment that connects the center points of the pair of fiber-positioning projecting section 27, or a point (the point not deviating from the left end surface 4b) on a virtual line parallel with the left end surface 4b of the lens array main body 4 that is perpendicular to the virtual line segment of the center point can be given.

In addition, in expression (3), $d_3$ represents the positional accuracy [μm] of the second light-receiving elements 47 of the photovoltaic device 3 and is a type of error in manufacturing of the photovoltaic device 3 (the same applies hereafter). The value of $d_3$ may be, for example, a value obtained by adding the total of the displacement amount from an optimal formation position (position based on design) of each second light-receiving element 47 towards the direction perpendicular to the direction of incidence of the laser light $L_R$ of each second light-receiving element 47 (in other words, the optical axis OA(4) direction), for all second light-receiving elements 47. Here, a center position of a light-receiving surface of each second light-receiving element 47 can be used as the position of each second light-receiving element 47. In addition, a reference point for the position of each second light-receiving element 47 can be the center point of a single device-positioning projecting section 124. However, the value of $d_3$ may be a value obtained by further adding, to the above-described total value of the displacement amount in the direction perpendicular to the direction of incidence of the laser light $L_R$ for reception of each second light-receiving element 47, the displacement amount from the optimal formation position (position based on design) of each device-positioning projecting section 124 towards the direction perpendicular to the direction of incidence of the laser light $L_R$. In this instance, a position that is the center point of the device-positioning projecting section 124 can be used as the position of the device-positioning projecting section 124. In addition, in this instance, the reference point for the position of the second light-receiving element 47 and the device-positioning projecting section 124 can be a point other than the center point of the device-positioning projecting section 124. As an example of the reference point, a center point on a virtual line segment that connects the center points of the pair of device-positioning projecting sections 124, or a point (the point not deviating from the element formation surface) on a virtual line parallel with the element formation surface of the semiconductor substrate 6 that is perpendicular to the virtual line segment of the center point can be given.

Furthermore, in expression (3), $e_2$ represents the positional accuracy [µm] of the second optical fibers 58 and is an error in manufacturing (assembly) of the optical connector 10 (the same applies hereafter). The meaning of $e_2$ is equivalent to that in which the term "optical fiber 5" used in the description of the meaning of e in expressions (1) and (2) is replaced with "second optical fiber 58".

Still further, in expression (3), $W_3$ represents a third tolerance [µm] (the same applies hereafter). Here, the third tolerance refers to a distance (attachment position margin width) between an attachment position before movement and an attachment position after movement, under a premise that the photovoltaic device 3 is moved along the direction perpendicular to the optical axis OA(4) of the fourth lens faces 48 from an attachment position to the lens array main body 4 at which the optical coupling efficiency between the end faces 58a of the second optical fibers 58 and the second light-receiving elements 47 indicates a maximum efficiency set in advance to an attachment position at which a reduction in optical coupling efficiency equivalent to 2 dB from the maximum efficiency is indicated.

The meaning of $\Delta L$ in expression (3) is as described above in the description for expression (1). However, the L in $\Delta L$ may be the distance between a fixed position on the lower end surface 4a and the fourth lens face 48 farthest from the fixed position.

As a result of expression (3) such as this being satisfied, when the photovoltaic device 3 is attached to the lens array main body 4, highly accurate positioning of the photovoltaic device 3 can be easily performed such that sufficient optical coupling efficiency between the end faces 58a of the second optical fibers 58 and the second light-receiving elements 47 can also be achieved regardless of temperature increase merely by a mechanical operation of inserting the device-positioning projecting sections 124 into the device-positioning recessing sections 24.

Next, a configuration in FIG. 18 is similar to the configuration in FIG. 17 in that the photovoltaic device 3 includes the second light-receiving elements 47 and the fourth lens faces 48 are formed in the lens array main body 4. However, in the configuration in FIG. 18, unlike the configuration in FIG. 17, the second optical fibers 58 and the fifth lens faces 60 are not provided. Both transmission and reception are performed by the optical fibers 5 and the second lens faces 12. In other words, in the configuration in FIG. 18, laser light (laser light equivalent to the above-described laser light $L_R$ for reception) having the same wavelength as each other are emitted from the end faces 5a of the optical fibers 5 towards the lens array 2. The laser light emitted from each optical fiber 5 is laser light having a different wavelength than the laser light La of each light-emitting element 7. As a more specific means, for example, a plurality of light-emitting elements are disposed on the end faces of the optical fibers 5 opposite to the end faces 5a facing the lens array 2. The number of light-emitting elements is the same as the number of optical fibers 5. The light emitted from each light-emitting element can enter each optical fiber 5. Then, the laser light emitted from each optical fiber 5 in this way enters the second lens face 12 corresponding to each optical fiber 5. In addition, as shown in FIG. 18, a second reflective/transmissive layer 50 is disposed on the second prism face 16b. The laser light that has been emitted from each optical fiber 5 and entered each second lens face 12 enters the second reflective/transmissive layer 50. The second reflective/transmissive layer 50 then reflects the incident laser light towards the fourth lens face 48 side at a predetermined reflection factor and transmits the incident laser light at a predetermined transmission factor. In a configuration such as this, the laser light emitted from each optical fiber 5 can be coupled with each second light-receiving element 47 via the second lens faces 12, the second reflective/transmissive layer 50, and the fourth lens faces 48. Therefore, bidirectional optical communication can be effectively supported. The second reflective/transmissive layer 50 may be formed by the same material and method as the reflective/transmissive layer 17.

In the configuration in FIG. 18 such as this, a following conditional expression (4) may be further satisfied in addition to conditional expressions (1) and (2):

$$f + b + d_3 + e + \Delta L \le W_3 \tag{4}$$

The meanings of the parameters in expression (4) are as described above. As a result of expression (4) such as this being satisfied, when the photovoltaic device 3 is attached to the lens array main body 4, highly accurate positioning of the photovoltaic device 3 can be easily performed such that sufficient optical coupling efficiency between the end faces 5a of the optical fibers 5 and the second light-receiving elements 47 can also be achieved regardless of temperature increase merely by a mechanical operation of inserting the device-positioning projecting sections 124 into the device-positioning recessing sections 24.

Second Embodiment

Next, a lens array and an optical module including the lens array according to a second embodiment of the present invention will be described with reference to FIG. 19 to FIG. 87, mainly focusing on the differences with the first embodiment.

Sections of which the basic configuration is the same or similar to that according to the first embodiment are described using the same reference numbers.

Figure 19:
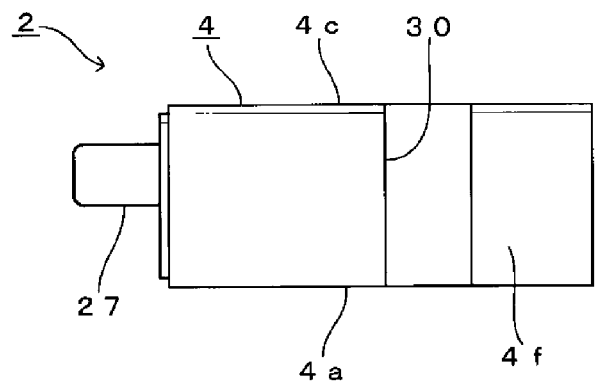
FIG. 19 is a front view of a lens array according to a second embodiment of the present invention.
Figure 20:
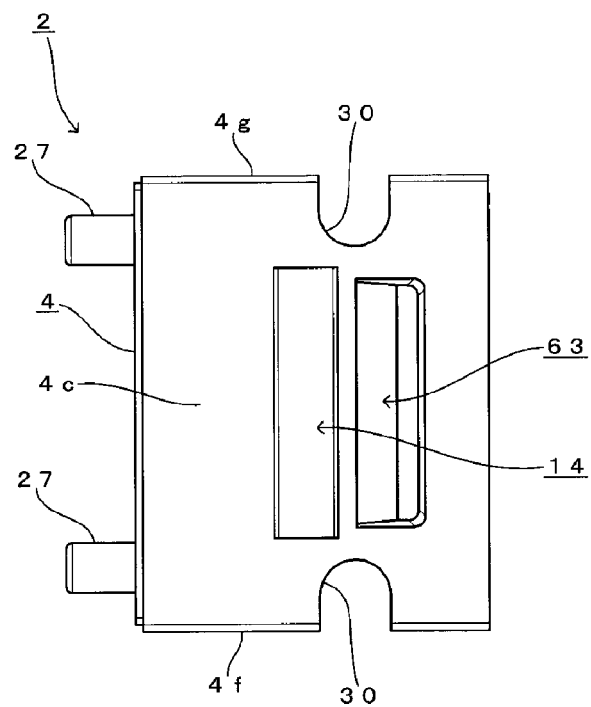
FIG. 20 is a planar view of FIG. 19.
Figure 21:
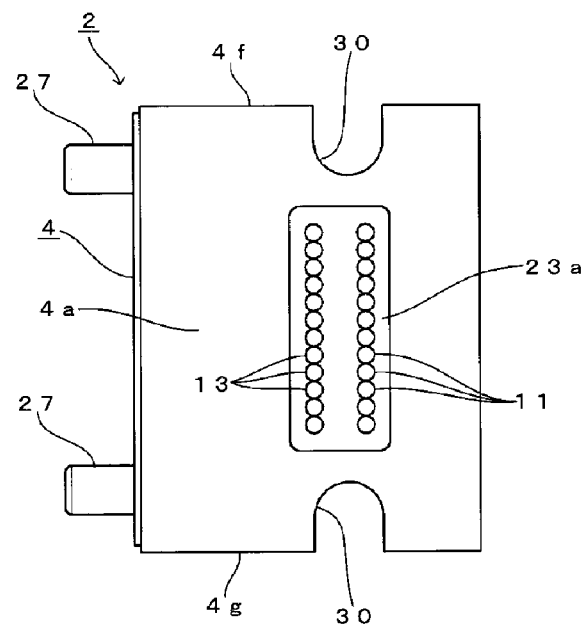
FIG. 21 is a bottom view of FIG. 19.

FIG. 19 is a front view of the lens array 2 according to the present embodiment. FIG. 20 is a planar view of FIG. 19. FIG. 21 is a bottom view of FIG. 19. The left-side view of FIG. 19 is similar to FIG. 4.

The lens array 2 according to the present embodiment is used to optically couple the photovoltaic device 3 and the optical fibers 5 in a state in which the photovoltaic device 3 and the optical fibers 5 are attached to the lens array 2 (not shown), in a manner similar to that according to the first embodiment.

However, as shown in FIG. 19 to FIG. 21, unlike that according to the first embodiment, the lens array 2 according to the present embodiment does not have the device-positioning recessing sections 24. In accompaniment, the photovoltaic device 3 (not shown) does not have the device-positioning projecting sections 124 that are to be inserted into the device-positioning recessing sections 24.

Therefore, according to the present embodiment, when the photovoltaic device 3 is attached to the lens array 2, mechanical positioning using the device-positioning recessing sections 24 and the device-positioning projecting sections 124 is not performed.

Instead, according to the present embodiment, the photovoltaic device 3 is attached to the lens array 2 after optical positioning is performed by known active alignment as an alignment operation. Here, in active alignment, the laser light La is actually emitted from each light-emitting element 7 of the photovoltaic device 3. While the coupling state (light intensity) to the end faces 5a of the optical fibers 5 and the coupling state as the monitor light M to the light-receiving elements 8 of the emitted laser light La is being observed, an optimal alignment point (in other words, attachment position) of the photovoltaic device 3 is determined. On the other hand, regarding the positioning when the optical fibers 5 are attached, in a manner similar to the first embodiment, mechanical positioning using the fiber-positioning projecting sections 27 and the fiber-positioning recessing sections 127 is performed.

As shown in FIG. 19 to FIG. 21, the lens array 2 according to the present embodiment has a pair of adhesive collecting sections 30 on the lower end surface 4a of the lens array main body 4 in positions on both outer sides of the lens formation surface 23a in the array direction of the first lens faces 11. The adhesive collecting sections 30 serve as placement positions (collecting positions) for an adhesive for bonding the lens array 2 with the photovoltaic device 3. Each adhesive collecting section 30 is formed into a curved shape in which the front end surface 4f and the back end surface 4g of the lens array main body 4 are each cut into a U-shape. In addition, the adhesive collecting section 30 is formed from the lower end surface 4a to the upper end surface 4c of the lens array main body 4. Furthermore, as shown in FIG. 20 and FIG. 21, the adhesive collecting sections 30 are formed having line symmetry (same dimensions) such that, by turning one adhesive collecting section 30 upside down in the drawings, the one adhesive collecting section 30 completely overlaps the other adhesive collecting section 30. In addition, according to the present embodiment, after positioning of the photovoltaic device 3 is performed by active alignment, adhesive is injected (placed) in the adhesive collecting sections 30 and hardened. As a result, the photovoltaic device 3 is fixed (attached) to the lens array 2 by the adhesive force of the adhesive. As the adhesive, for example, known thermosetting resins and ultraviolet-curable resins can be used.

Furthermore, according to the present embodiment, in a manner similar to the first embodiment, the lens array 2, together with the photovoltaic device 3 and the optical fibers 5, satisfies expressions (1) and (2).

However, as described above, the device-positioning recessing sections 24 are not formed in the lens array 2 according to the present embodiment. Therefore, as the reference point for the position of each first lens face 11 when setting the value of a in expressions (1) and (2), and as the reference point for the position of each third lens face 13 when setting the value of c in expression (2), the center point of the device-positioning recessing section 24 cannot be used as is used according to the first embodiment. Instead, according to the present embodiment, as the reference point for the position of each first lens face 11 and the reference point for the position of each third lens face 13, a shape center point of the adhesive collecting section 30 may be used. In this instance, as the shape center point, the center of the radius of curvature of the curved portion of the adhesive collecting section 30 may be used. According to the first embodiment, the displacement amount from the optimal formation position of the device-positioning recessing section 24 can be used for the calculation of the values of a and c. However, according to the present embodiment, instead, the displacement amount in the direction perpendicular to the optical axes OA(1) and OA(3) from the optimal formation position of the adhesive collecting section 30 may be used.

In addition, as described above, the device-positioning projecting sections 124 are not formed in the photovoltaic device 3 according to the present embodiment. Therefore, as the reference point for the position of each light-emitting element 7 when setting the value of $d_1$ in expressions (1) and (2), and as the reference point for the position of each light-receiving element 8 when setting the value of $d_2$ in expression (2), the center point of the device-positioning projecting section 124 cannot be used as is used according to the first embodiment. Instead, according to the present embodiment, as the reference point for the position of each light-emitting element 7 and the reference point for the position of each light-receiving element 8, for example, a geometric gravitational center point (or in other, a center point) of the light emitting/receiving element placement surface on the semiconductor substrate 6 may be used.

Figure 22:
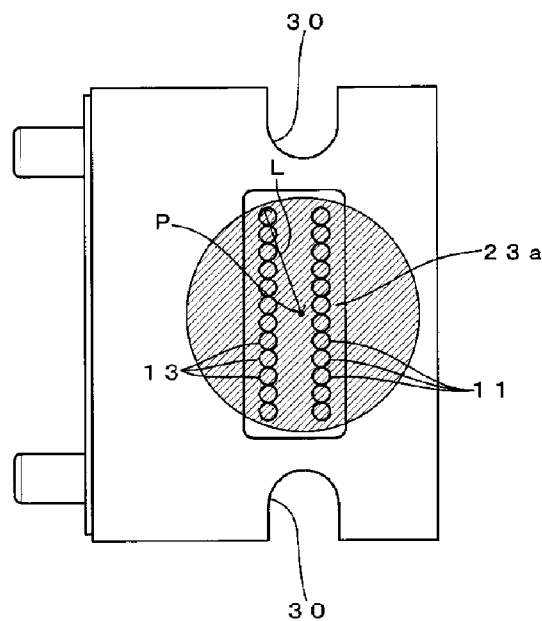
FIG. 22 is a first explanatory diagram used to describe ΔL in the configuration in FIG. 19 to FIG. 21.

Furthermore, as the fixed position on the lower end surface 4a of the lens array main body 4 when setting $\Delta L$ in expressions (1) and (2), in an instance in which the semiconductor substrate 6 less easily deforms as a result of temperature change than the lens array main body 4 (has a smaller coefficient of linear expansion), the position of a center point of a virtual line segment connecting the shape center points of the adhesive collecting sections 30 may be used. FIG. 22 shows the fixed position P and the area (shaded portion) corresponding to $\Delta L$ that satisfies expressions (1) and (2) based on the fixed position P in this instance. FIG. 22 corresponds with FIG. 8 and FIG. 13 according to the first embodiment.

Figure 23:
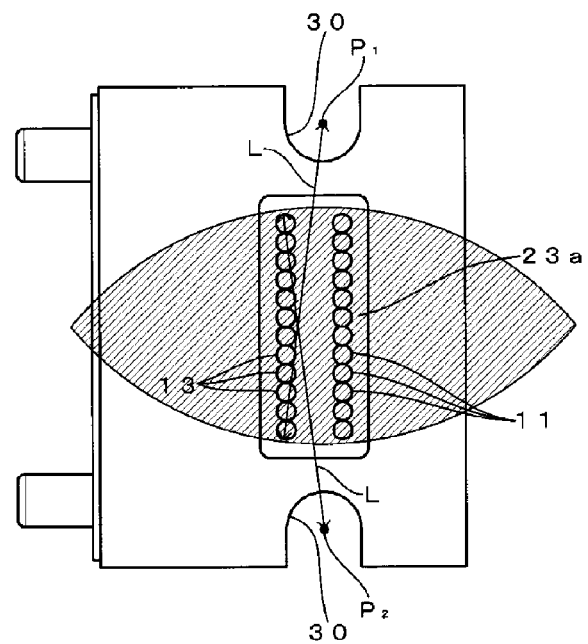
FIG. 23 is a second explanatory diagram used to describe ΔL in the configuration in FIG. 19 to FIG. 21.

On the other hand, in an instance in which the semiconductor substrate 6 more easily deforms as a result of temperature change than the lens array main body 4 (has a greater coefficient of linear expansion), the positions of the respective shape center points of the adhesive collecting sections 30 may be used as the fixed positions (two fixed positions). FIG. 23 shows the fixed positions $P_1$ and $P_2$ and the area (shaded portion) corresponding to $\Delta L$ that satisfies expressions (1) and (2) based on the fixed positions $P_1$ and $P_2$ in this instance. FIG. 23 corresponds with FIG. 9 and FIG. 14 according to the first embodiment.

According to the present embodiment, unlike the first embodiment, active alignment is required. However, as a result of the expressions (1) and (2) being satisfied, highly accurate positioning of the photovoltaic device 3 can be performed such that sufficient optical coupling efficiency between the light-emitting elements 7 and the end faces 5a of the optical fibers 5 can be achieved and sufficient optical coupling efficiency between the light-emitting elements 7 and the light-receiving elements 8 can be achieved regardless of temperature increase.

In addition, according to the present embodiment, high positioning accuracy can be achieved by active alignment. Therefore, the values of a and $d_1$ in expressions (1) and (2) and the values of c and $d_2$ in expression (2) can be set to very small values, even almost zero. Therefore, according to the present embodiment, the values of b and e in expression (1) can be made greater than those according to the first embodiment. In other words, the positional accuracy on the optical fiber 5 side can be relaxed.

According to the present embodiment, configurations other than that described above are similar to those according to the first embodiment. In addition, the variation examples according to the first embodiment can also be applied to the present embodiment. Furthermore, as variation examples unique to the present embodiment, the following first to fourteenth variation examples can be given.

First Variation Example

Figure 24:
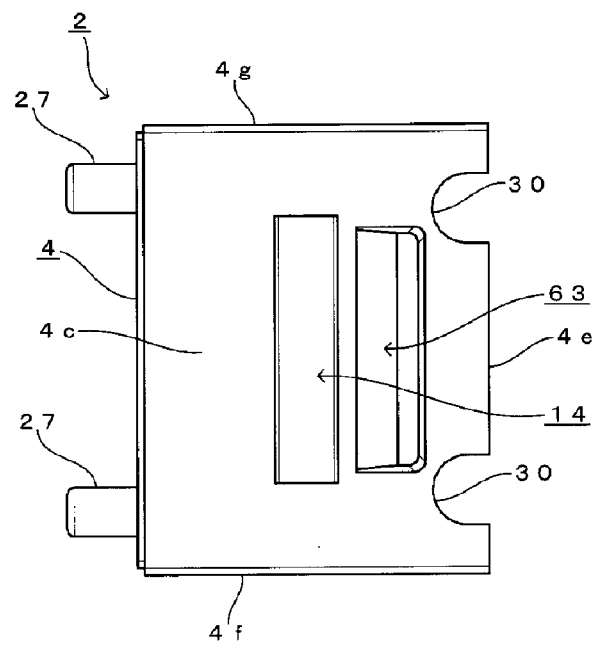
FIG. 24 is a planar view of a first variation example according to the second embodiment.
Figure 25:
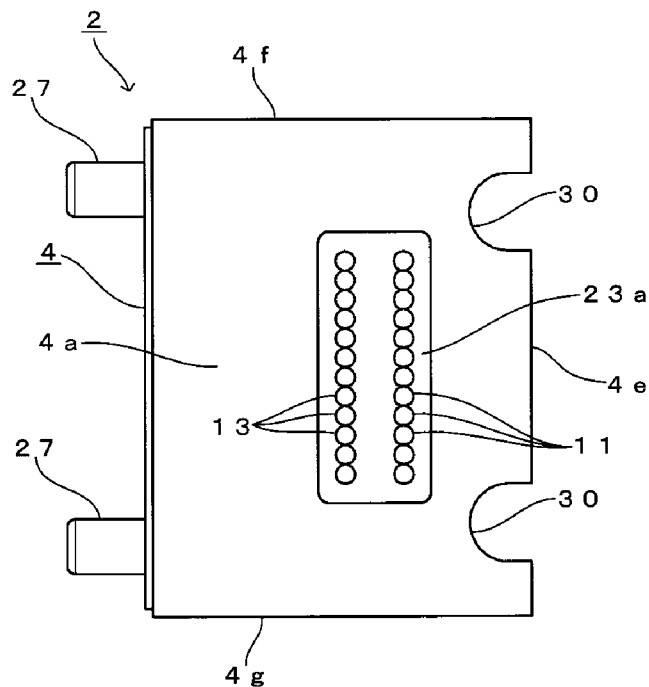
FIG. 25 is a bottom view of the first variation example according to the second embodiment.
Figure 26:
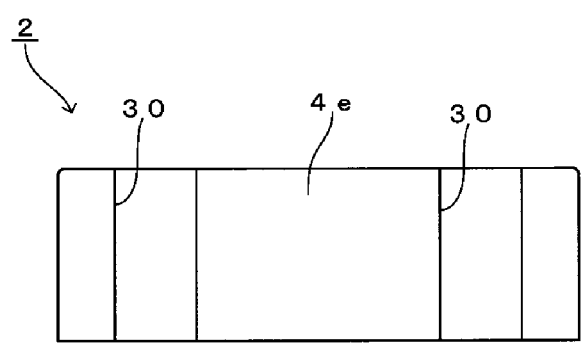
FIG. 26 is a right-side view of the first variation example according to the second embodiment.

FIG. 24 is a planar view of a first variation example of the lens array 2. FIG. 25 is a bottom view of the lens array 2 shown in FIG. 24. FIG. 26 is a right-side view of the lens array shown in FIG. 24.

As shown in FIG. 24 to FIG. 26, the lens array 2 of the present variation example differs from the configuration shown in FIG. 19 to FIG. 21 only regarding the formation positions of the adhesive collecting sections 30.

In other words, in the present variation example, the pair of adhesive collecting sections 30 are formed on the right end surface 4e of the lens array main body 4 with a space therebetween in the array direction of the first lens faces 11. Specifically, as shown in FIG. 25, one adhesive collecting section 30 on the front end surface 4f side of the lens array main body 4 is formed in a position near the front end portion of the lens formation surface 23a. The other adhesive collecting section 30 on the back end surface 4g side of the lens array main body 4 is formed in a position near the back end portion of the lens formation surface 23a.

Figure 27:
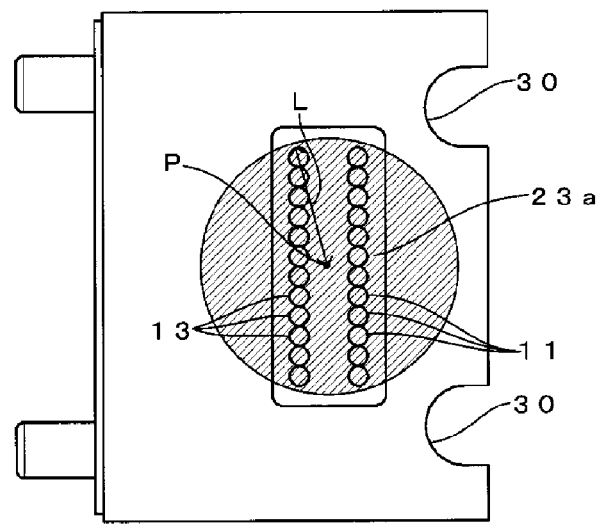
FIG. 27 is a first explanatory diagram used to describe ΔL in the first variation example according to the second embodiment.

Here, FIG. 27 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. Unlike that in FIG. 22, the fixed position P in FIG. 27 is set to the gravitational center point of the lens formation surface 23a.

Figure 28:
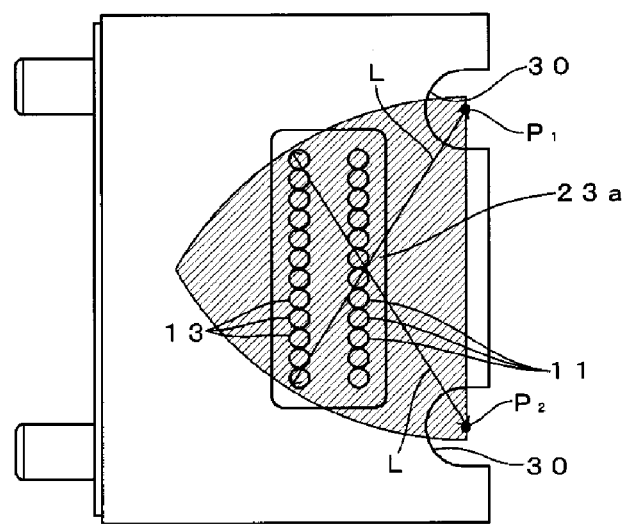
FIG. 28 is a second explanatory diagram used to describe ΔL in the first variation example according to the second embodiment.

On the other hand, FIG. 28 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. In a manner similar to that in FIG. 23, the fixed positions $P_1$ and $P_2$ in FIG. 28 are set to the shape center points of the adhesive collecting sections 30. In addition, although the shape differs from that in FIG. 23, in a manner similar to that in FIG. 23, the area corresponding to ΔL in FIG. 28 is an area in which all first lens faces 11 and third lens faces 13 are included.

In the present variation example as well, operational effects similar to those of the configuration shown in FIG. 19 to FIG. 21 can be achieved.

Second Variation Example

Figure 29:
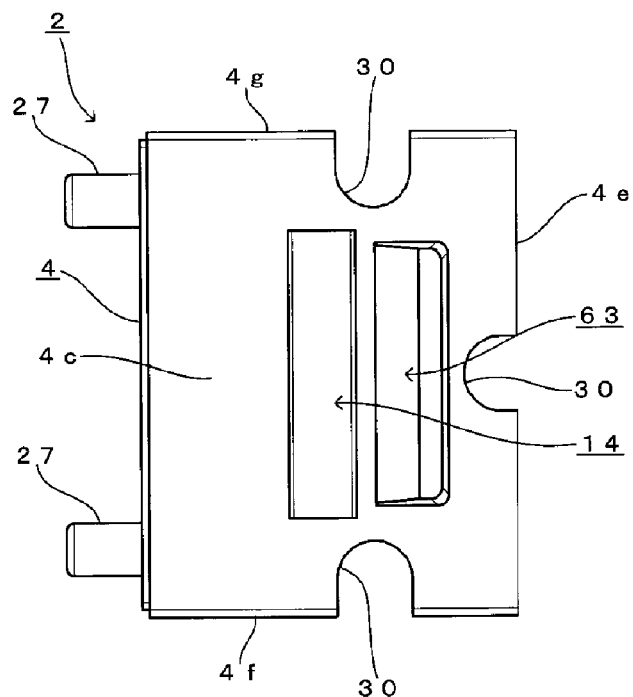
FIG. 29 is a planar view of a second variation example according to the second embodiment.
Figure 30:
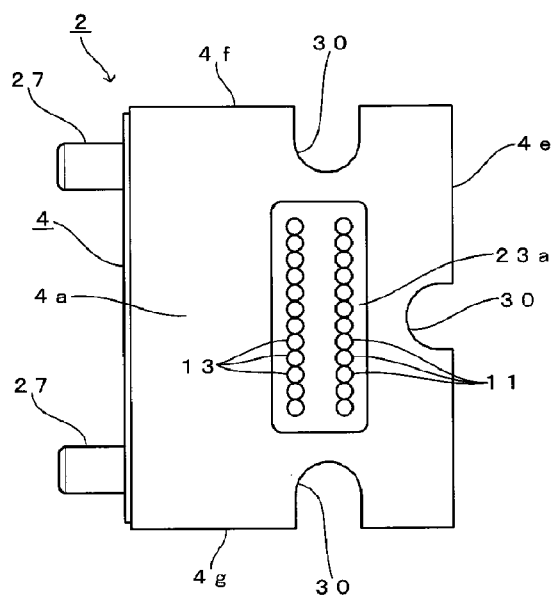
FIG. 30 is a bottom view of the second variation example according to the second embodiment.
Figure 31:
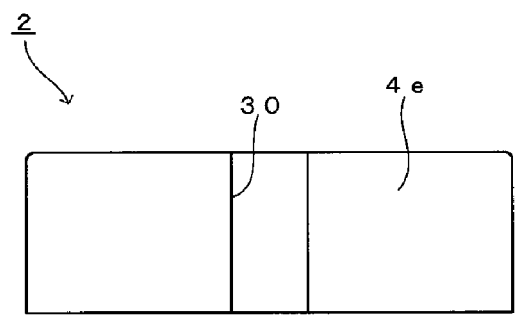
FIG. 31 is a right-side view of the second variation example according to the second embodiment.

FIG. 29 is a planar view of a second variation example of the lens array 2. FIG. 30 is a bottom view of the lens array 2 shown in FIG. 29. FIG. 31 is a right-side view of the lens array shown in FIG. 29.

As shown in FIG. 29 to FIG. 31, the lens array 2 of the present variation is equivalent to that in which a third adhesive collecting section 30 is further formed on the right end surface 4e of the lens array main body 4 in a center position in the array direction of the first lens faces 11, in addition to the configuration shown in FIG. 19 to FIG. 21.

Figure 32:
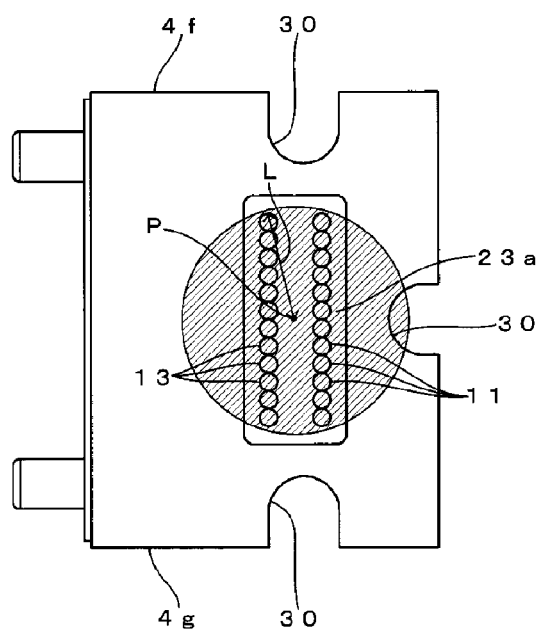
FIG. 32 is a first explanatory diagram used to describe ΔL in the second variation example according to the second embodiment.

Here, FIG. 32 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. In a manner similar to that in FIG. 23, the fixed position P is set to a center point on a virtual line segment connecting the shape center points of the pair of adhesive collecting sections 30 formed on the front end surface 4f and the back end surface 4g of the lens array main body 4.

Figure 33:
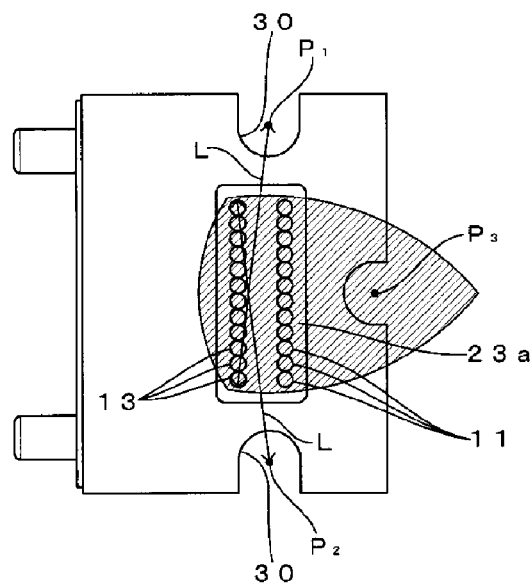
FIG. 33 is a second explanatory diagram used to describe ΔL in the second variation example according to the second embodiment.

On the other hand, FIG. 33 shows three fixed positions $P_1$, $P_2$, and $P_3$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$, $P_2$, and $P_3$ in the present variation example. In a manner similar to that in FIG. 23, the fixed positions $P_1$, $P_2$, and $P_3$ in FIG. 33 are set to the shape center points of the adhesive collecting sections 30. In addition, although the shape differs from that in FIG. 23, in a manner similar to that in FIG. 23, the area corresponding to ΔL in FIG. 33 is clearly an area in which all first lens faces 11 and third lens faces 13 are included. As L in expression (1a) in an instance such as this in which three fixed positions are set, the greatest of the distance between a first fixed position $P_1$ and the center point of the lens face 13 on the lower end surface 4a farthest from the first fixed position $P_1$ or a point on the peripheral end portion (point farthest from $P_1$), the distance between a second fixed position $P_2$ and the center point of the lens face 13 on the lower end surface 4a farthest from the second fixed position $P_2$ or a point on the peripheral end portion (point farthest from $P_2$), and the distance between a third fixed position $P_3$ and the center point of the lens face 13 on the lower end surface 4a farthest from the third fixed position $P_3$ or a point on the peripheral end portion (point farthest from $P_3$) may be used.

In the present variation example as well, operational effects similar to those of the configuration shown in FIG. 19 to FIG. 21 can be achieved.

Third Variation Example

Figure 34:
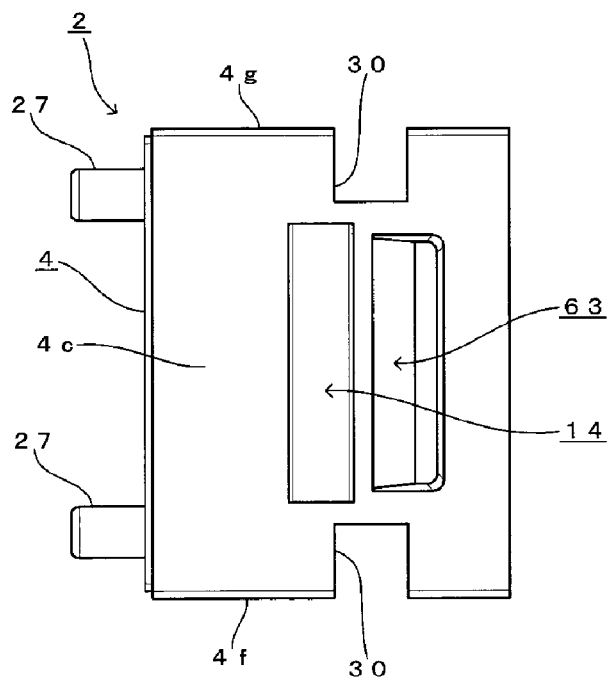
FIG. 34 is a planar view of a third variation example according to the second embodiment.
Figure 35:
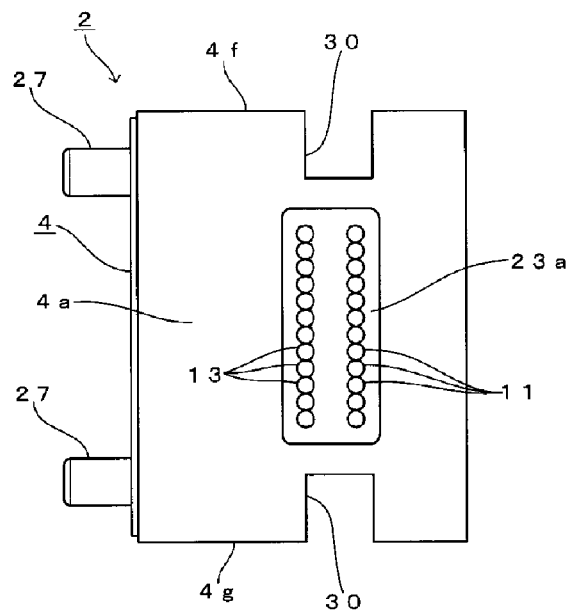
FIG. 35 is a bottom view of the third variation example according to the second embodiment.

FIG. 34 is a planar view of a third variation example of the lens array 2. FIG. 35 is a bottom view of the lens array 2 shown in FIG. 34.

As shown in FIG. 34 and FIG. 35, the lens array 2 of the present variation example differs from the configuration shown in FIG. 19 to FIG. 21 only regarding the shape of the adhesive collecting sections 30. In other words, as shown in FIG. 34 and FIG. 35, in the present variation example, each adhesive collecting section 30 is formed such that the planar shape is a square U-shape (in other words, a rectangle).

Figure 36:
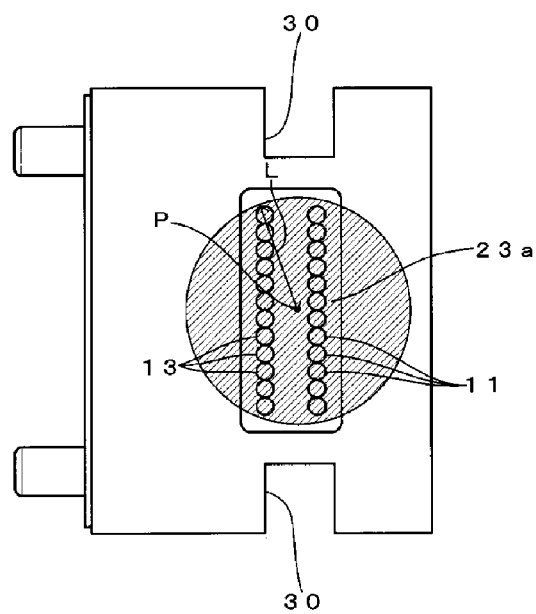
FIG. 36 is a first explanatory diagram used to describe ΔL in the third variation example according to the second embodiment.

Here, FIG. 36 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 36 is set to a center point on a virtual line segment connecting the shape center points of the pair of adhesive collecting sections 30. As the shape center point of the adhesive collecting section 30 in this instance, a geometric gravitational center point of the square U-shape may be used. The gravitational center point may be an intersection of three perpendicular lines respectively perpendicular to line segments respectively passing through the respective center points of three line segments (end sides) of the adhesive collecting section 30 having the square U-shape.

Figure 37:
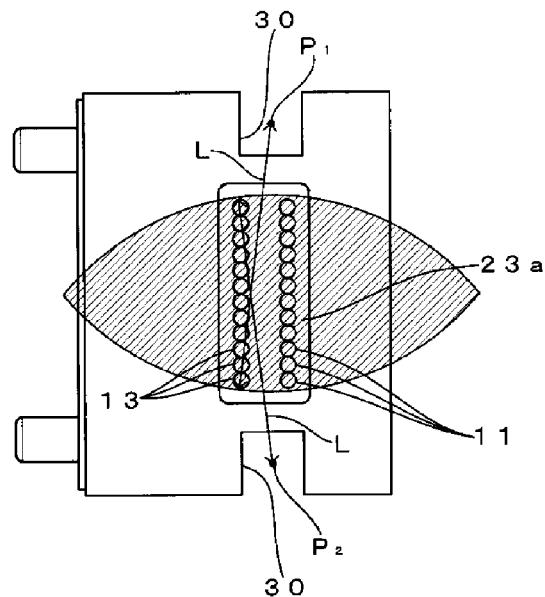
FIG. 37 is a second explanatory diagram used to describe ΔL in the third variation example according to the second embodiment.

On the other hand, FIG. 37 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 37 are set to the shape center points of the adhesive collecting sections 30 (such as the gravitational center point of the square U-shape).

In the present variation example as well, operational effects similar to those of the configuration shown in FIG. 19 to FIG. 21 can be achieved.

Fourth Variation Example

Figure 38:
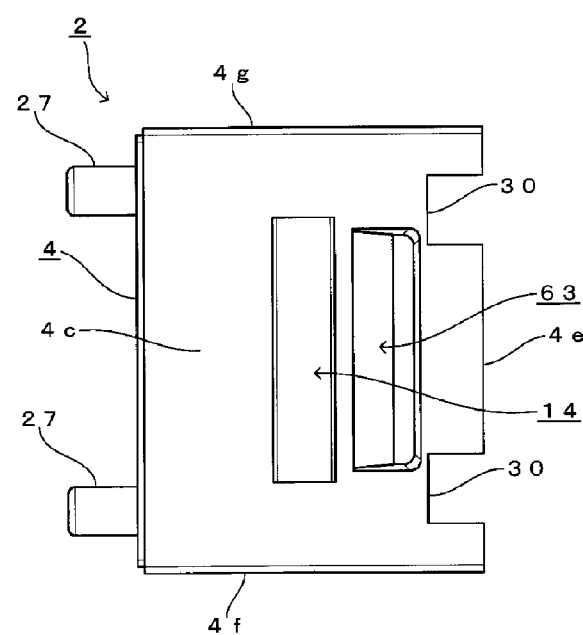
FIG. 38 is a planar view of a fourth variation example according to the second embodiment.
Figure 39:
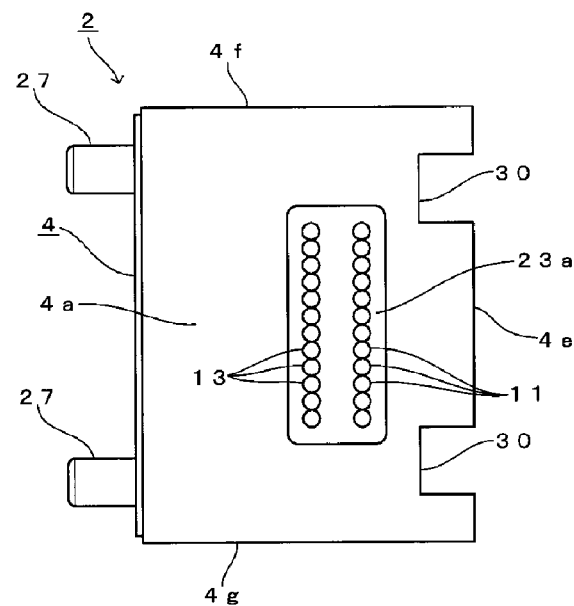
FIG. 39 is a bottom view of the fourth variation example according to the second embodiment.

FIG. 38 is a planar view of a fourth variation example of the lens array 2. FIG. 39 is a bottom view of the lens array 2 shown in FIG. 38.

As shown in FIG. 38 and FIG. 39, the lens array 2 of the present variation example differs from the first variation example only regarding the shape of the adhesive collecting sections 30. Specifically, in a manner similar to the third variation example, the planar shape of the adhesive collecting section 30 is formed into a square U-shape.

Figure 40:
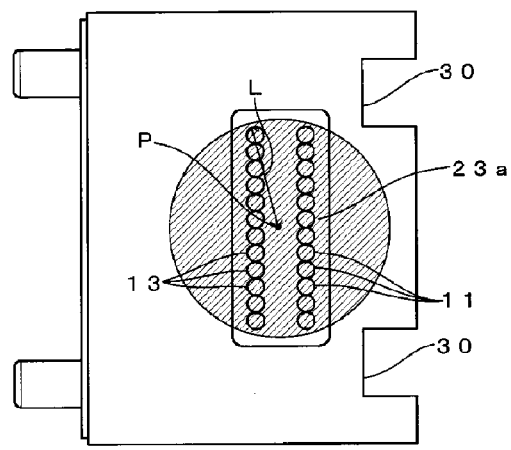
FIG. 40 is a first explanatory diagram used to describe ΔL in the fourth variation example according to the second embodiment.

Here, FIG. 40 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 40 is set to the gravitational center point of the lens formation surface 23a, in a manner similar to the first variation example.

Figure 41:
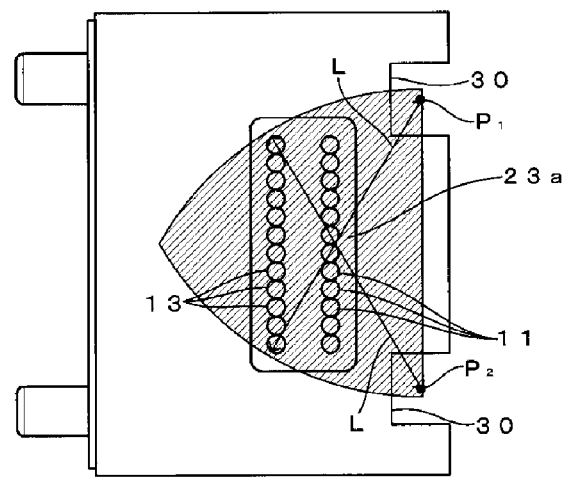
FIG. 41 is a second explanatory diagram used to describe ΔL in the fourth variation example according to the second embodiment.

On the other hand, FIG. 41 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 41 are set to the shape center points of the adhesive collecting sections 30, in a manner similar to the third variation example.

In the present variation example as well, operational effects similar to those of the configuration shown in FIG. 19 to FIG. 21 can be achieved.

Fifth Variation Example

Figure 42:
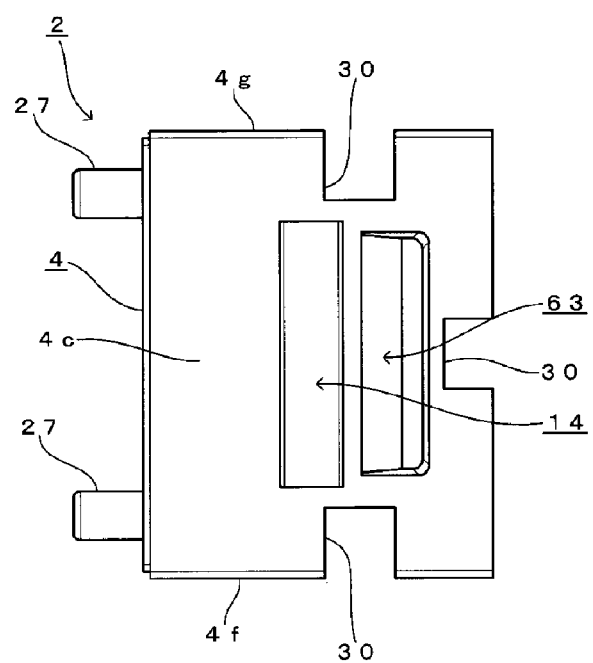
FIG. 42 is a planar view of a fifth variation example according to the second embodiment.
Figure 43:
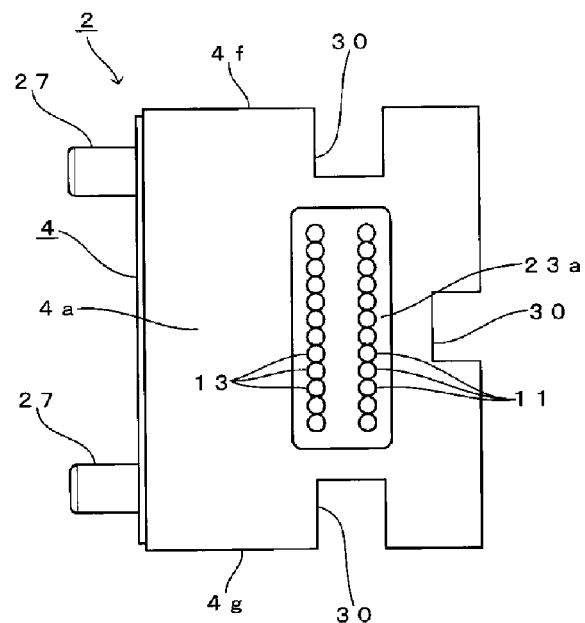
FIG. 43 is a bottom view of the fifth variation example according to the second embodiment.

FIG. 42 is a planar view of a fifth variation example of the lens array 2. FIG. 43 is a bottom view of the lens array 2 shown in FIG. 42.

As shown in FIG. 42 and FIG. 43, the lens array 2 of the present variation example differs from the second variation example only regarding the shape of the adhesive collecting sections 30. Specifically, in a manner similar to the third variation example, the planar shape of the adhesive collecting section 30 is formed into a square U-shape.

Figure 44:
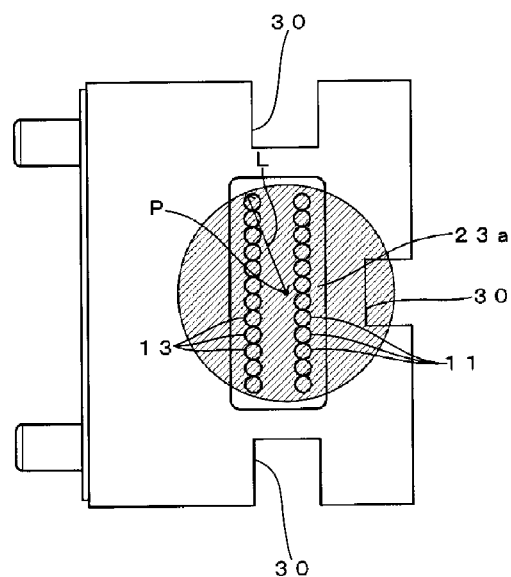
FIG. 44 is a first explanatory diagram used to describe ΔL in the fifth variation example according to the second embodiment.

Here, FIG. 44 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 44 is set to a center point on a virtual line segment connecting the shape center points of the pair of adhesive collecting sections 30 formed on the front end surface 4f and the back end surface 4g of the lens array main body 4, in a manner similar to the third variation example.

Figure 45:
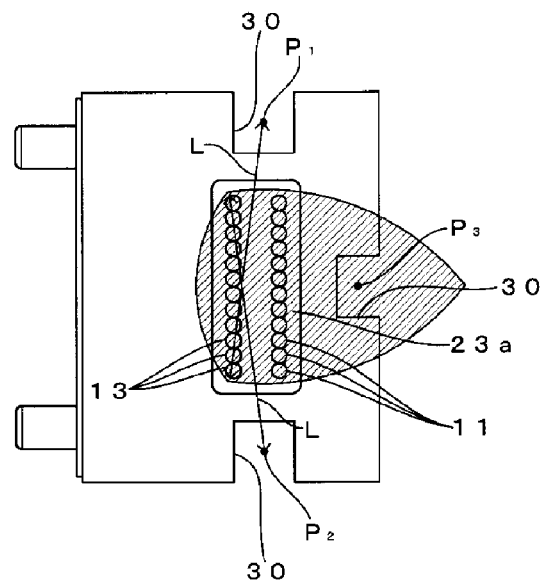
FIG. 45 is a second explanatory diagram used to describe ΔL in the fifth variation example according to the second embodiment.

On the other hand, FIG. 45 shows three fixed positions $P_1$, $P_2$, and $P_3$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$, $P_2$, and $P_3$ in the present variation example. The fixed positions $P_1$, $P_2$, and $P_3$ in FIG. 45 are set to the shape center points of the adhesive collecting sections 30, in a manner similar to the third variation example.

In the present variation example as well, operational effects similar to those of the configuration shown in FIG. 19 to FIG. 21 can be achieved.

Sixth Variation Example

Figure 46:
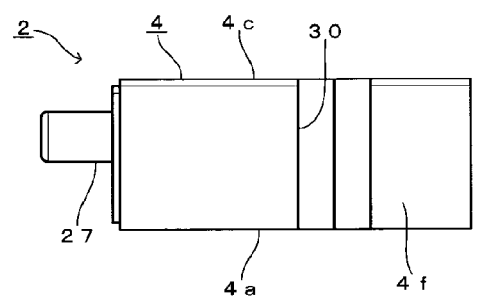
FIG. 46 is a front view of a sixth variation example according to the second embodiment.
Figure 47:
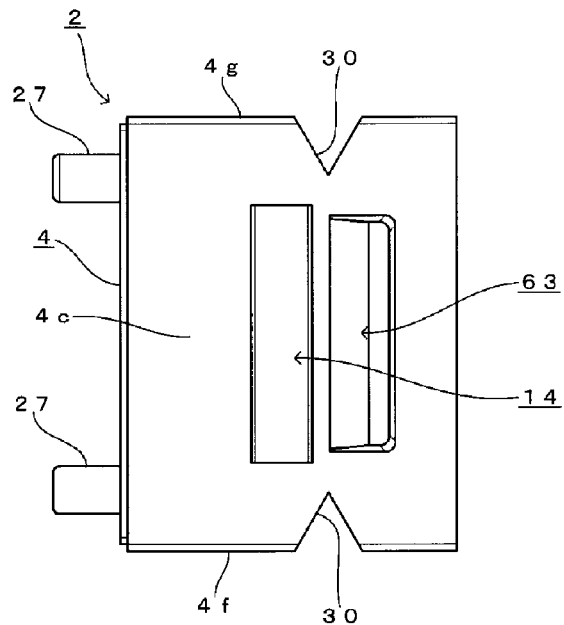
FIG. 47 is a planar view of the sixth variation example according to the second embodiment.
Figure 48:
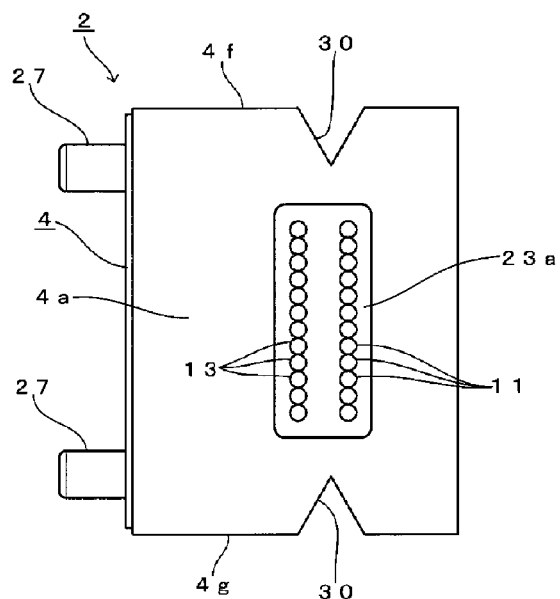
FIG. 48 is a bottom view of the sixth variation example according to the second embodiment.

FIG. 46 is a front view of a sixth variation example of the lens array 2. FIG. 47 is a planar view of the lens array 2 shown in FIG. 46. FIG. 48 is a bottom view of the lens array shown in FIG. 46.

As shown in FIG. 46 to FIG. 48, the lens array 2 of the present variation example differs from the configuration shown in FIG. 19 to FIG. 21 only regarding the shape of the adhesive collecting sections 30. In other words, as shown in FIG. 47 and FIG. 48, in the present variation example, the adhesive collecting section 30 is formed such that the planar shape is a V-shape (in other words, a triangle).

Figure 49:
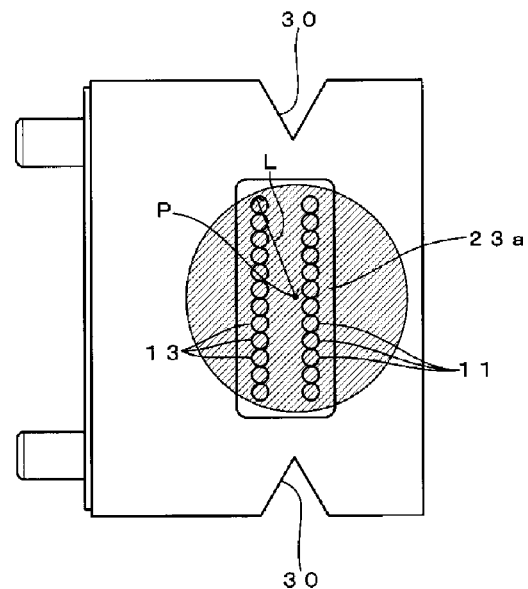
FIG. 49 is a first explanatory diagram used to describe ΔL in the sixth variation example according to the second embodiment.

Here, FIG. 49 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 49 is set to a center point on a virtual line segment connecting the shape center points of the pair of adhesive collecting sections 30. As the shape center point of the adhesive collecting section 30 in this instance, a geometric gravitational center point of the V-shape may be used. The gravitational center point may be an intersection of two perpendicular lines respectively perpendicular to line segments respectively passing through the respective center points of two line segments (end sides) of the adhesive collecting section 30 having the V-shape.

Figure 50:
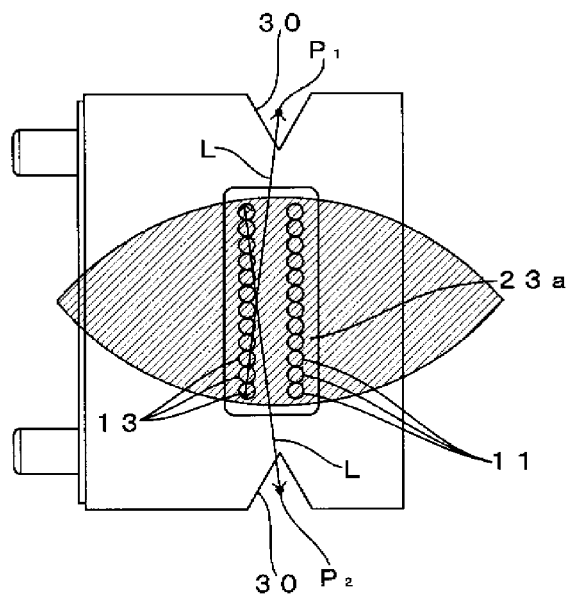
FIG. 50 is a second explanatory diagram used to describe ΔL in the sixth variation example according to the second embodiment.

On the other hand, FIG. 50 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 50 are set to the shape center points of the adhesive collecting sections 30 (such as the gravitational center point of the V-shape).

In the present variation example as well, operational effects similar to those of the configuration shown in FIG. 19 to FIG. 21 can be achieved.

Seventh Variation Example

Figure 51:
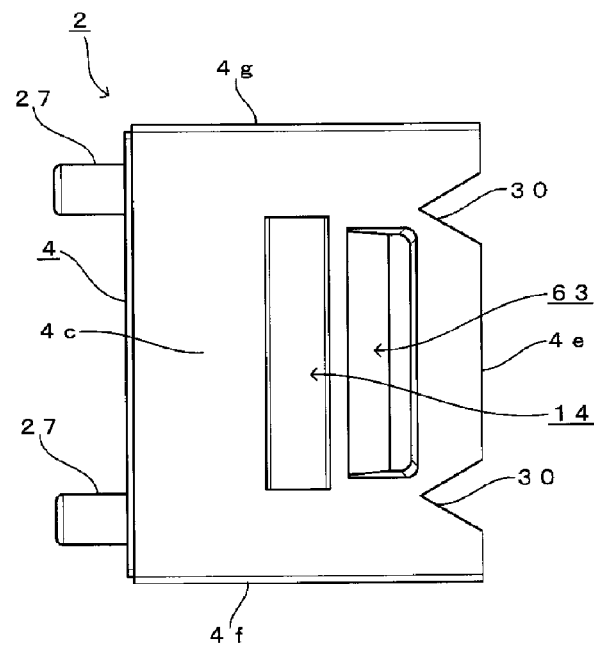
FIG. 51 is a planar view of a seventh variation example according to the second embodiment.
Figure 52:
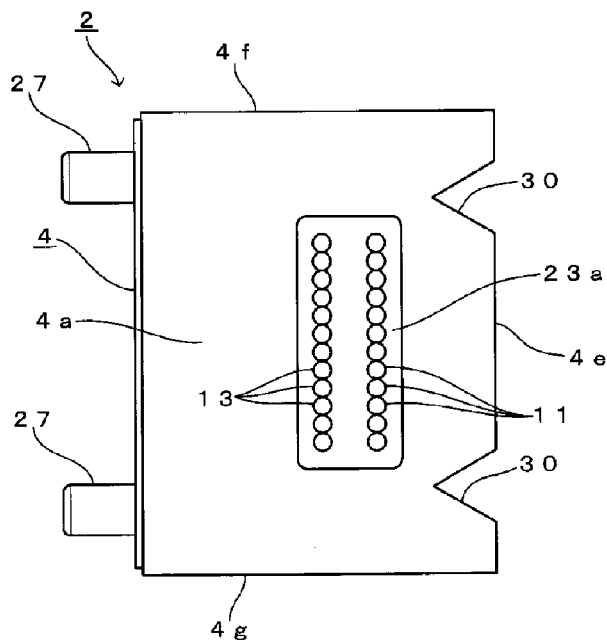
FIG. 52 is a bottom view of the seventh variation example according to the second embodiment.
Figure 53:
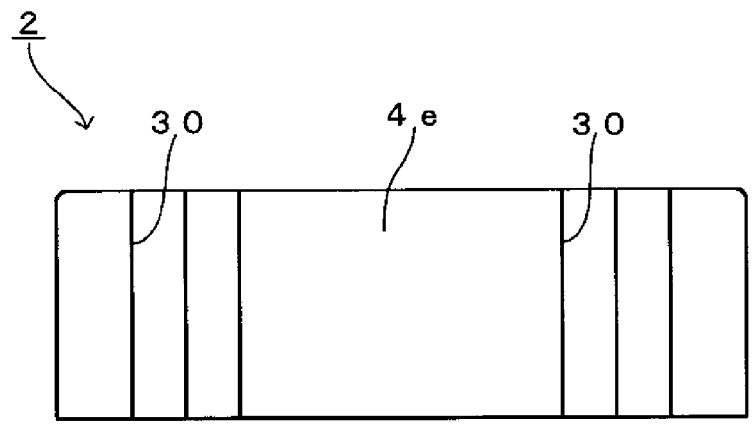
FIG. 53 is a right-side view of the seventh variation example according to the second embodiment.

FIG. 51 is a planar view of a seventh variation example of the lens array 2. FIG. 52 is a bottom view of the lens array 2 shown in FIG. 51. FIG. 53 is a right-side view of the lens array shown in FIG. 51.

As shown in FIG. 51 and FIG. 52, the lens array 2 of the present variation example differs from the first variation example only regarding the shape of the adhesive collecting sections 30. Specifically, in a manner similar to the sixth variation example, the planar shape of the adhesive collecting section 30 is formed into a V-shape.

Figure 54:
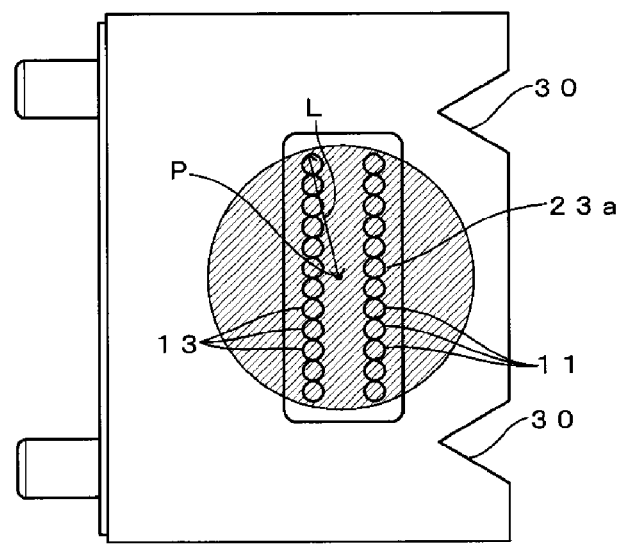
FIG. 54 is a first explanatory diagram used to describe ΔL in the seventh variation example according to the second embodiment.

Here, FIG. 54 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 54 is set to the gravitational center point of the lens formation surface 23a, in a manner similar to the first variation example.

Figure 55:
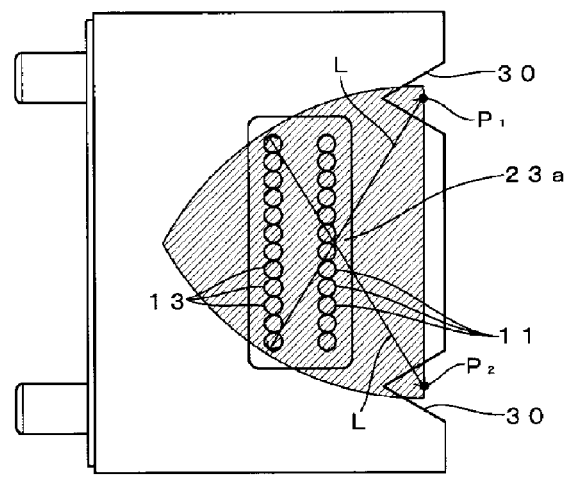
FIG. 55 is a second explanatory diagram used to describe ΔL in the seventh variation example according to the second embodiment.

On the other hand, FIG. 55 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 55 are set to the shape center points of the adhesive collecting sections 30, in a manner similar to the sixth variation example.

In the present variation example as well, operational effects similar to those of the configuration shown in FIG. 19 to FIG. 21 can be achieved.

Eighth Variation Example

Figure 56:
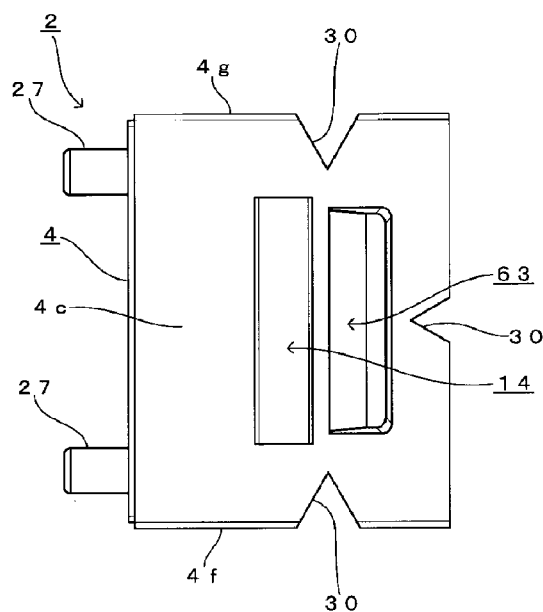
FIG. 56 is a planar view of an eighth variation example according to the second embodiment.
Figure 57:
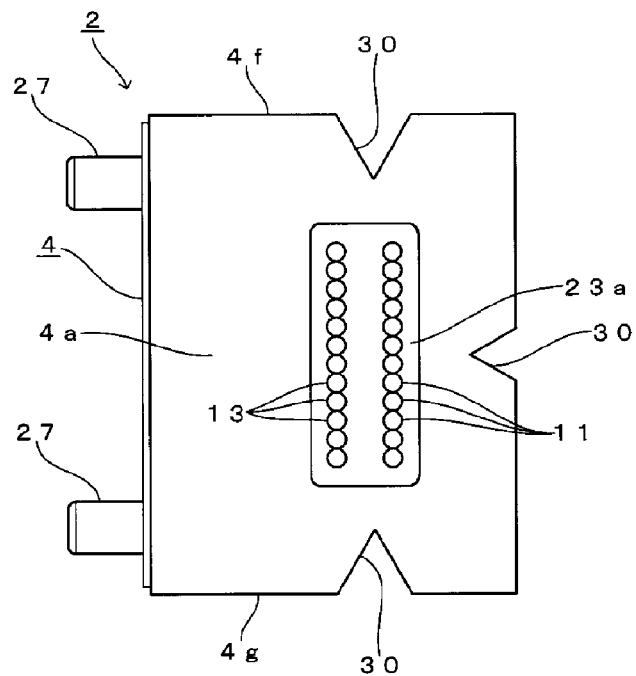
FIG. 57 is a bottom view of the eighth variation example according to the second embodiment.
Figure 58:
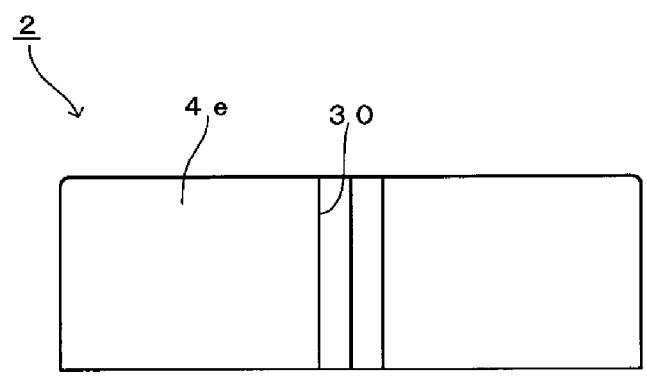
FIG. 58 is a right-side view of the eighth variation example according to the second embodiment.

FIG. 56 is a planar view of an eighth variation example of the lens array 2. FIG. 57 is a bottom view of the lens array 2 shown in FIG. 56. FIG. 58 is a right-side view of the lens array shown in FIG. 56.

As shown in FIG. 56 and FIG. 57, the lens array 2 of the present variation example differs from the second variation example only regarding the shape of the adhesive collecting sections 30. Specifically, in a manner similar to the sixth variation example, the planar shape of the adhesive collecting section 30 is formed into a V-shape.

Figure 59:
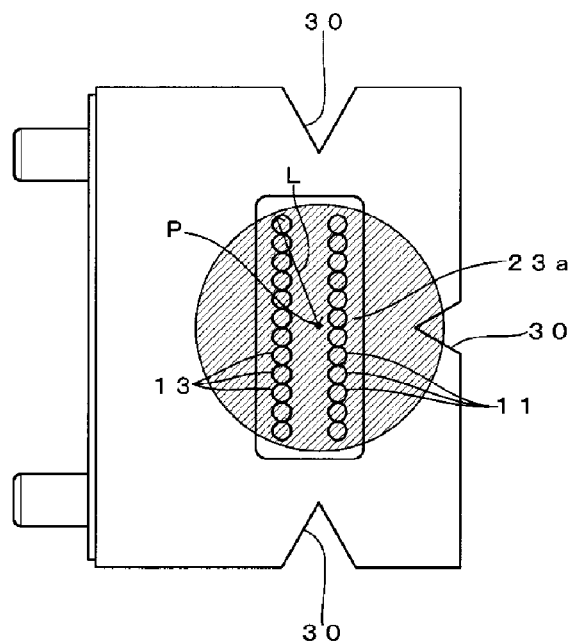
FIG. 59 is a first explanatory diagram used to describe ΔL in the eighth variation example according to the second embodiment.

Here, FIG. 59 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 59 is set to a center point on a virtual line segment connecting the shape center points of the pair of adhesive collecting sections 30 formed on the front end surface 4f and the back end surface 4g of the lens array main body 4, in a manner similar to the sixth variation example.

Figure 60:
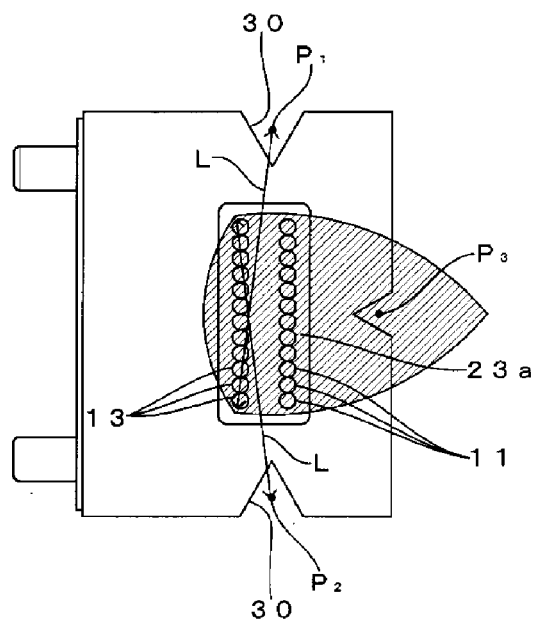
FIG. 60 is a second explanatory diagram used to describe ΔL in the eighth variation example according to the second embodiment.

On the other hand, FIG. 60 shows three fixed positions $P_1$, $P_2$, and $P_3$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$, $P_2$, and $P_3$ in the present variation example. The fixed positions $P_1$, $P_2$, and $P_3$ in FIG. 60 are set to the shape center points of the adhesive collecting sections 30, in a manner similar to the sixth variation example.

In the present variation example as well, operational effects similar to those of the configuration shown in FIG. 19 to FIG. 21 can be achieved.

Ninth Variation Example

Figure 61:
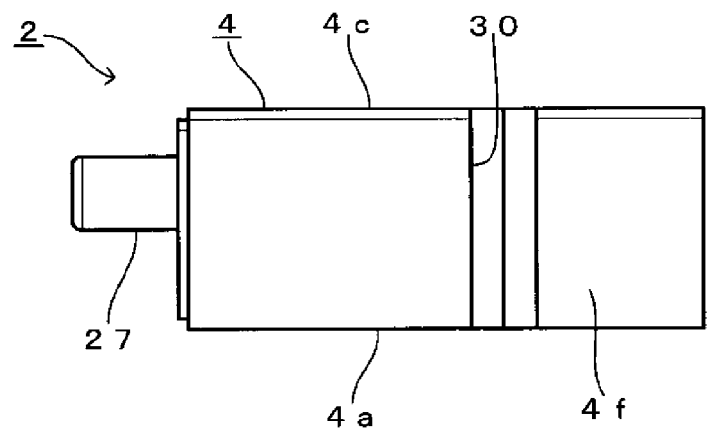
FIG. 61 is a front view of a ninth variation example according to the second embodiment.
Figure 62:
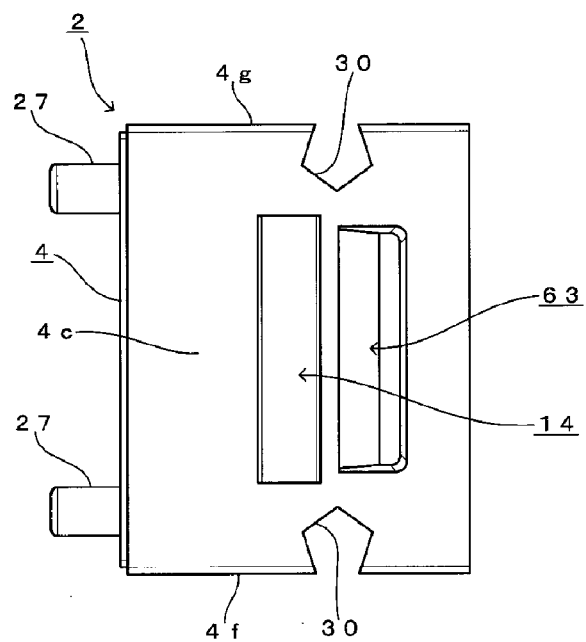
FIG. 62 is a planar view of the ninth variation example according to the second embodiment.
Figure 63:
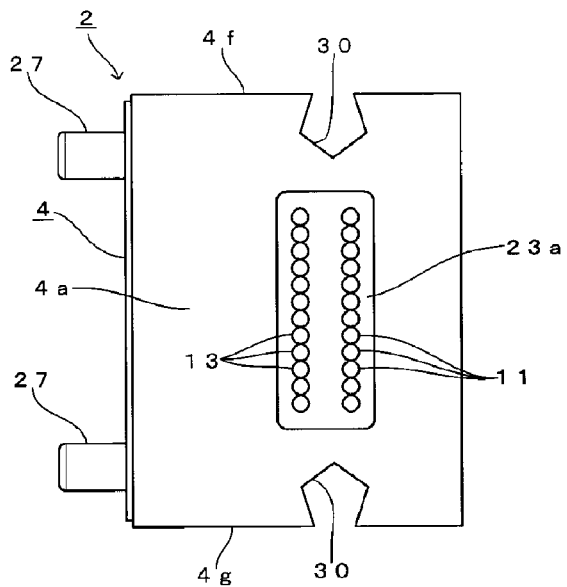
FIG. 63 is a bottom view of the ninth variation example according to the second embodiment.

FIG. 61 is a front view of a ninth variation example of the lens array 2. FIG. 62 is a planar view of the lens array 2 shown in FIG. 61. FIG. 63 is a bottom view of the lens array shown in FIG. 61.

As shown in FIG. 61 to FIG. 63, the lens array 2 of the present variation example differs from the configuration shown in FIG. 19 to FIG. 21 only regarding the shape of the adhesive collecting sections 30. In other words, as shown in FIG. 62 and FIG. 63, in the present variation example, the adhesive collecting section 30 is formed such that the planar shape is a pentagon.

Figure 64:
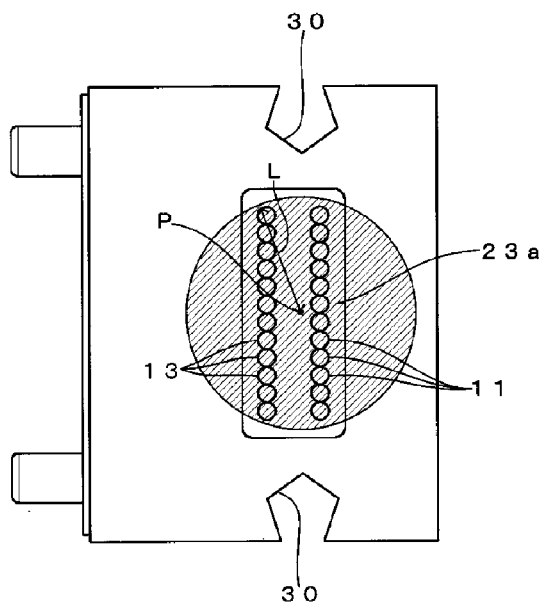
FIG. 64 is a first explanatory diagram used to describe ΔL in the ninth variation example according to the second embodiment.

Here, FIG. 64 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 64 is set to a center point on a virtual line segment connecting the shape center points of the pair of adhesive collecting sections 30. As the shape center point of the adhesive collecting section 30 in this instance, a geometric gravitational center point of the pentagon may be used.

Figure 65:
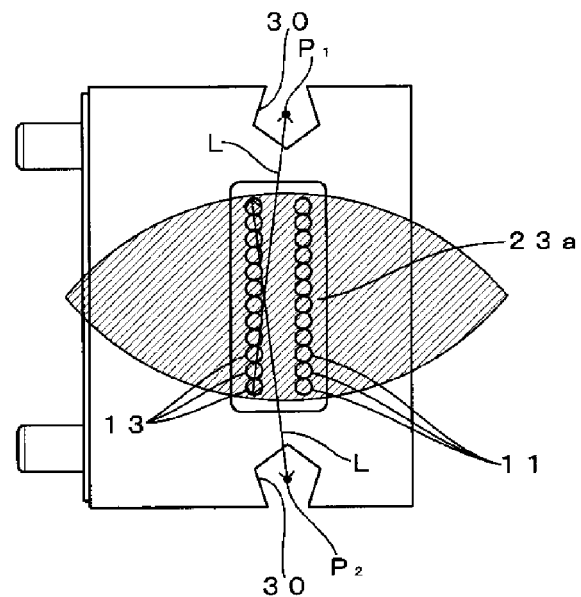
FIG. 65 is a second explanatory diagram used to describe ΔL in the ninth variation example according to the second embodiment.

On the other hand, FIG. 65 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 65 are set to the shape center points of the adhesive collecting sections 30 (such as the gravitational center point of the pentagon).

In the present variation example as well, operational effects similar to those of the configuration shown in FIG. 19 to FIG. 21 can be achieved.

Tenth Variation Example

Figure 66:
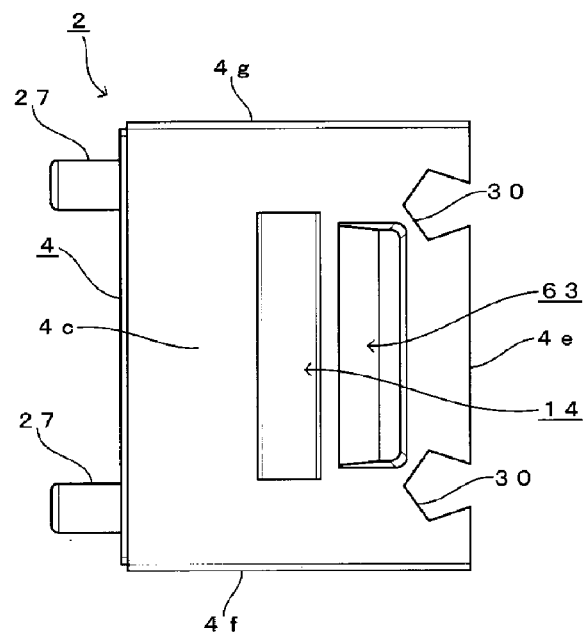
FIG. 66 is a planar view of a tenth variation example according to the second embodiment.
Figure 67:
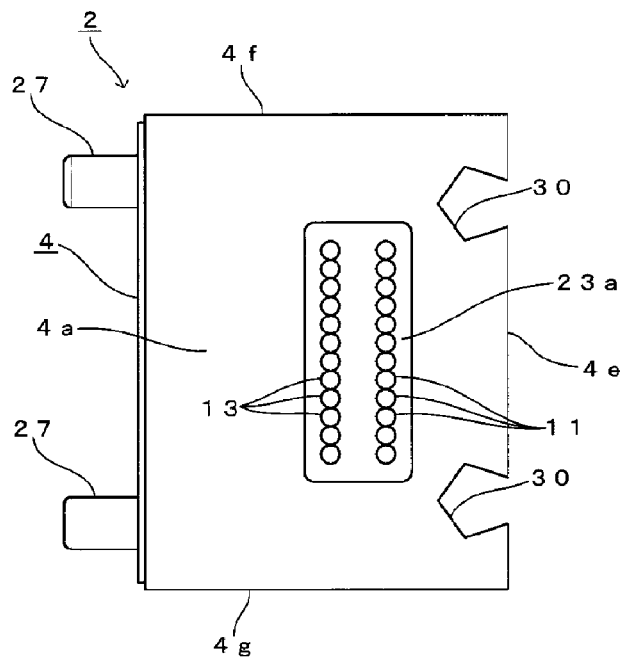
FIG. 67 is a bottom view of the tenth variation example according to the second embodiment.
Figure 68:
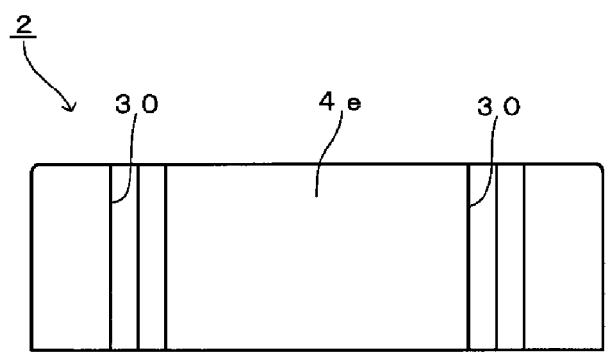
FIG. 68 is a right-side view of the tenth variation example according to the second embodiment.

FIG. 66 is a planar view of a tenth variation example of the lens array 2. FIG. 67 is a bottom view of the lens array 2 shown in FIG. 66. FIG. 68 is a right-side view of the lens array 2 shown in FIG. 66.

As shown in FIG. 66 and FIG. 67, the lens array 2 of the present variation example differs from the first variation example only regarding the shape of the adhesive collecting sections 30. Specifically, in a manner similar to the ninth variation example, the planar shape of the adhesive collecting section 30 is formed into a pentagon.

Figure 69:
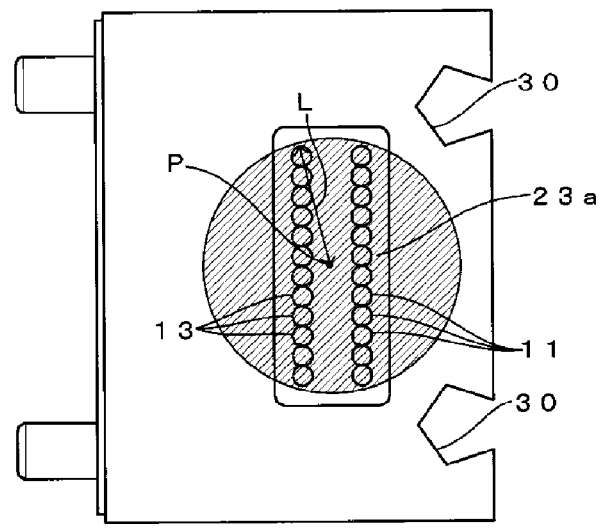
FIG. 69 is a first explanatory diagram used to describe ΔL in the tenth variation example according to the second embodiment.

Here, FIG. 69 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 69 is set to the gravitational center point of the lens formation surface 23a, in a manner similar to the first variation example.

Figure 70:
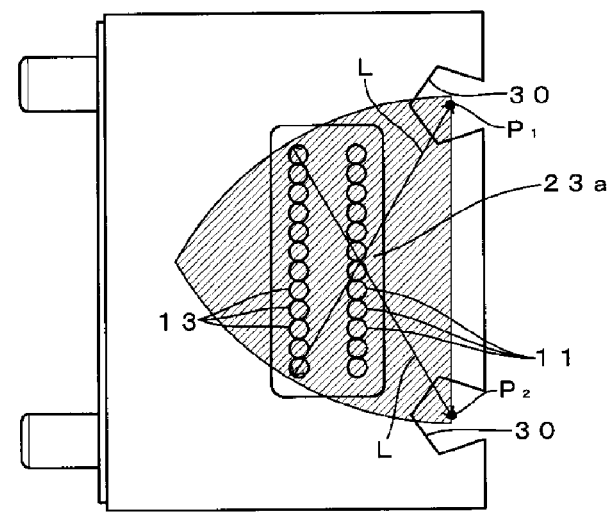
FIG. 70 is a second explanatory diagram used to describe ΔL in the tenth variation example according to the second embodiment.

On the other hand, FIG. 70 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 70 are set to the shape center points of the adhesive collecting sections 30, in a manner similar to the ninth variation example.

In the present variation example as well, operational effects similar to those of the configuration shown in FIG. 19 to FIG. 21 can be achieved.

Eleventh Variation Example

Figure 71:
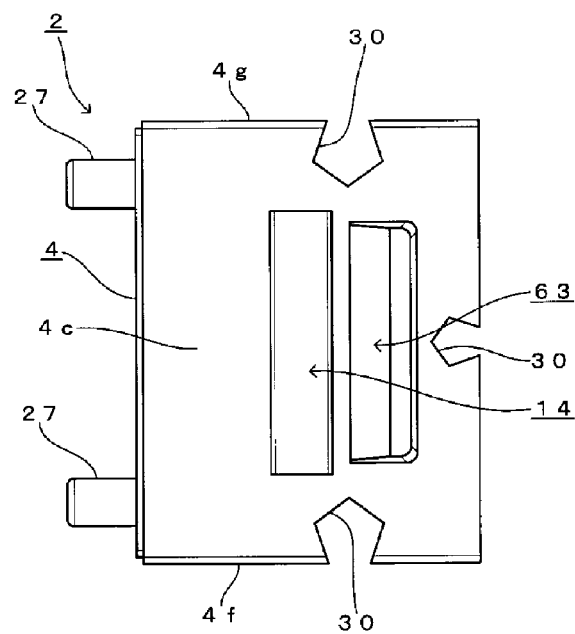
FIG. 71 is a planar view of an eleventh variation example according to the second embodiment.
Figure 72:
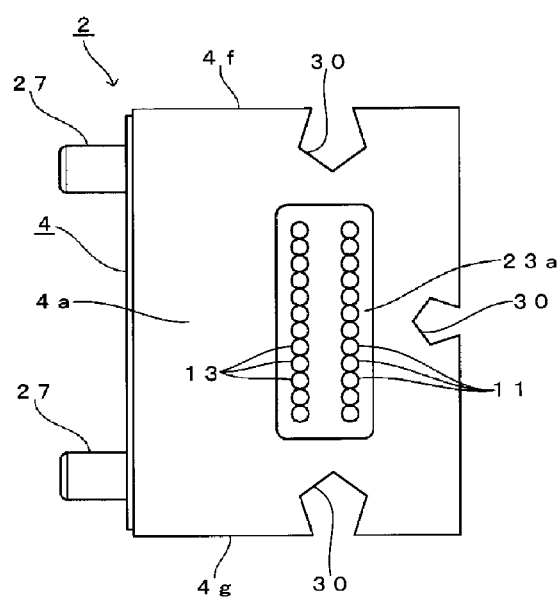
FIG. 72 is a bottom view of the eleventh variation example according to the second embodiment.
Figure 73:
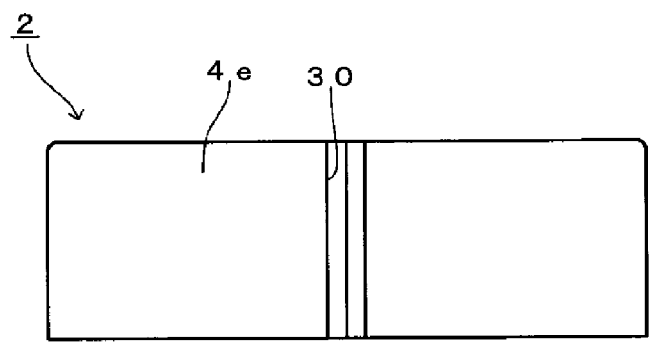
FIG. 73 is a right-side view of the eleventh variation example according to the second embodiment.

FIG. 71 is a planar view of an eleventh variation example of the lens array 2. FIG. 72 is a bottom view of the lens array 2 shown in FIG. 71. FIG. 73 is a right-side view of the lens array 2 shown in FIG. 71.

As shown in FIG. 71 and FIG. 72, the lens array 2 of the present variation example differs from the second variation example only regarding the shape of the adhesive collecting sections 30. Specifically, in a manner similar to the ninth variation example, the planar shape of the adhesive collecting section 30 is formed into a pentagon.

Figure 74:
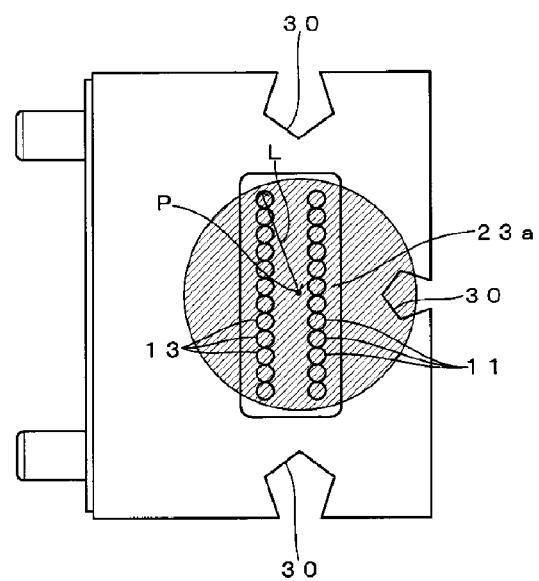
FIG. 74 is a first explanatory diagram used to describe ΔL in the eleventh variation example according to the second embodiment.

Here, FIG. 74 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 74 is set to a center point on a virtual line segment connecting the shape center points of the pair of adhesive collecting sections 30 formed on the front end surface 4f and the back end surface 4g of the lens array main body 4, in a manner similar to the ninth variation example.

Figure 75:
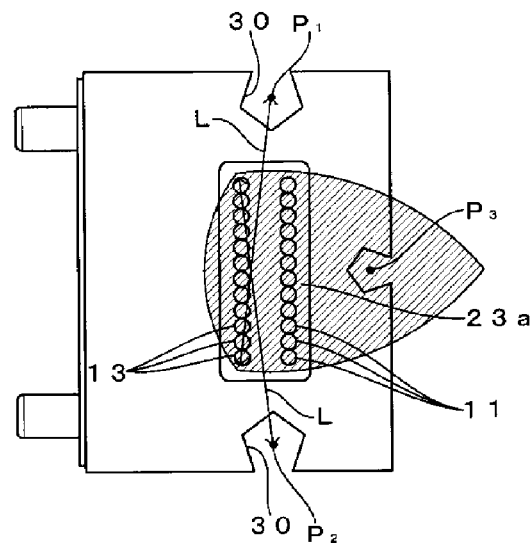
FIG. 75 is a second explanatory diagram used to describe ΔL in the eleventh variation example according to the second embodiment.

On the other hand, FIG. 75 shows three fixed positions $P_1$, $P_2$, and $P_3$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$, $P_2$, and $P_3$ in the present variation example. The fixed positions $P_1$, $P_2$, and $P_3$ in FIG. 75 are set to the shape center points of the adhesive collecting sections 30, in a manner similar to the third variation example.

In the present variation example as well, operational effects similar to those of the configuration shown in FIG. 19 to FIG. 21 can be achieved.

Twelfth Variation Example

Figure 76:
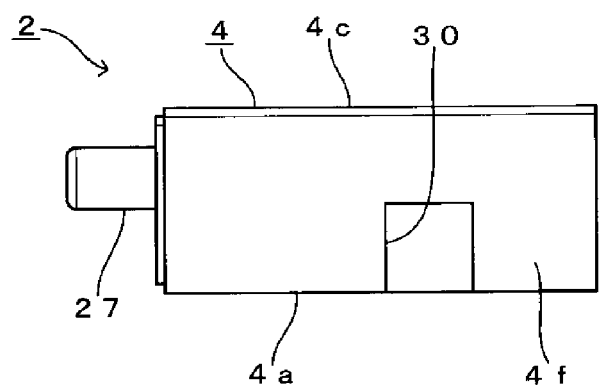
FIG. 76 is a front view of a twelfth variation example according to the second embodiment.
Figure 77:
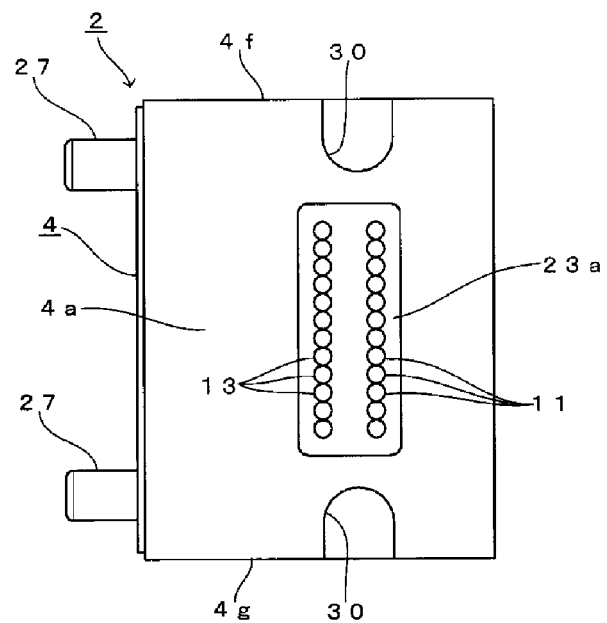
FIG. 77 is a bottom view of the twelfth variation example according to the second embodiment.

FIG. 76 is a front view of a twelfth variation example of the lens array 2. FIG. 77 is a bottom view of the lens array shown in FIG. 76.

As shown in FIG. 76 to FIG. 77, the lens array 2 of the present variation example differs from the configuration shown in FIG. 19 to FIG. 21 only regarding the shape of the adhesive collecting sections 30. In other words, as shown in FIG. 76 and FIG. 77, in the present variation example, the adhesive collecting section 30 is formed such that the planar shape is a U-shape similar to that in FIG. 19 to FIG. 21, and a front-view shape is a square U-shape. In other words, the adhesive collecting section 30 of the present variation example is formed into a bottomed recessing surface composed of a curved surface and a flat surface connected to the end side (curve side) of the curved surface, unlike a curve such as that in FIG. 19 to FIG. 21.

Figure 78:
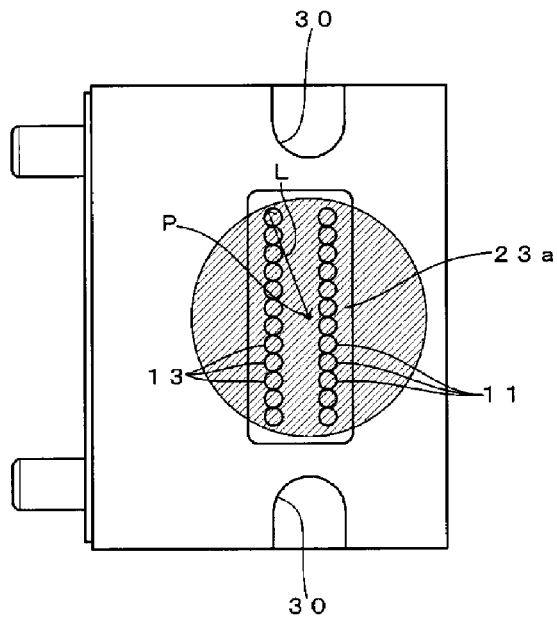
FIG. 78 is a first explanatory diagram used to describe ΔL in the twelfth variation example according to the second embodiment.

Here, FIG. 78 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 78 is similar to that in FIG. 22.

Figure 79:
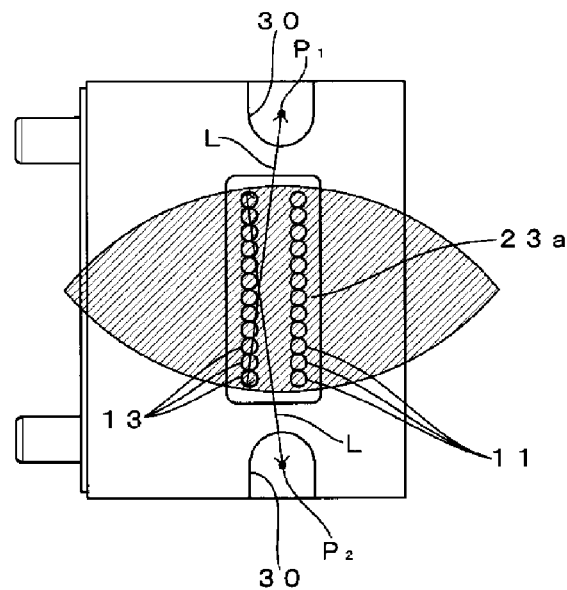
FIG. 79 is a second explanatory diagram used to describe ΔL in the twelfth variation example according to the second embodiment.

On the other hand, FIG. 79 shows two fixed positions $P_1$ and $P_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions $P_1$ and $P_2$ in the present variation example. The fixed positions $P_1$ and $P_2$ in FIG. 79 are similar to those in FIG. 23.

In the present variation example as well, operational effects similar to those of the configuration shown in FIG. 19 to FIG. 21 can be achieved.

Thirteenth Variation Example

Figure 80:
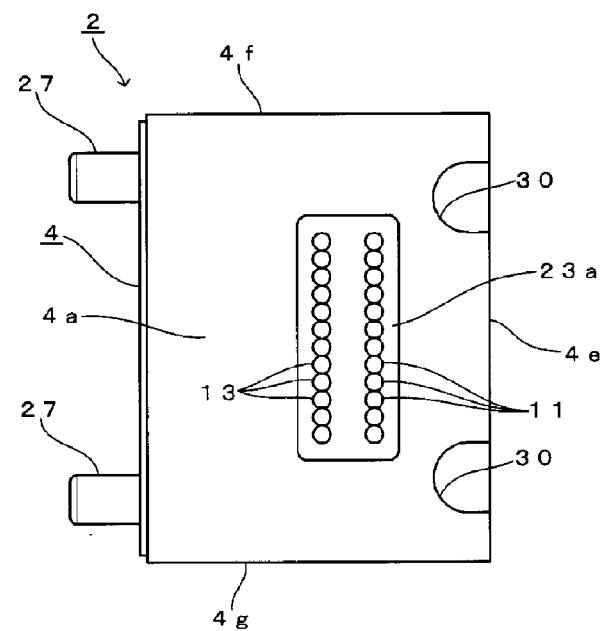
FIG. 80 is a bottom view of a thirteenth variation example according to the second embodiment.
Figure 81:
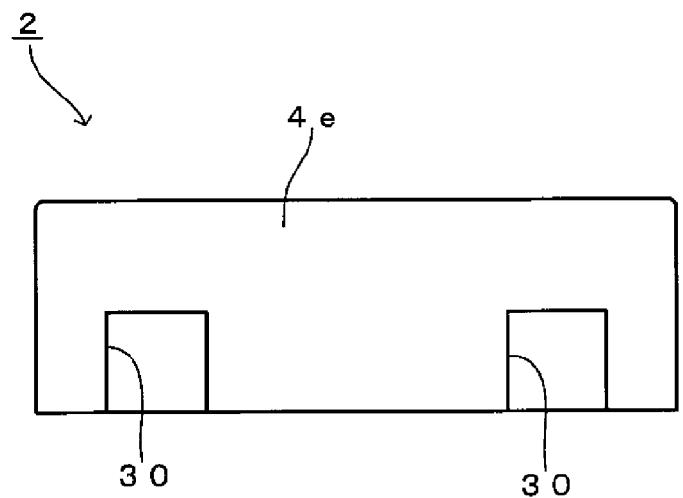
FIG. 81 is a right-side view of the thirteenth variation example according to the second embodiment.

FIG. 80 is a bottom view of a thirteenth variation example of the lens array 2. FIG. 81 is a right-side view of the lens array 2 shown in FIG. 80.

As shown in FIG. 80 and FIG. 81, the lens array 2 of the present variation example differs from the first variation example only regarding the shape of the adhesive collecting sections 30. Specifically, in a manner similar to the twelfth variation example, the planar shape is formed into a U-shape and the front-view shape is formed into a recessing surface having a square U-shape.

Figure 82:
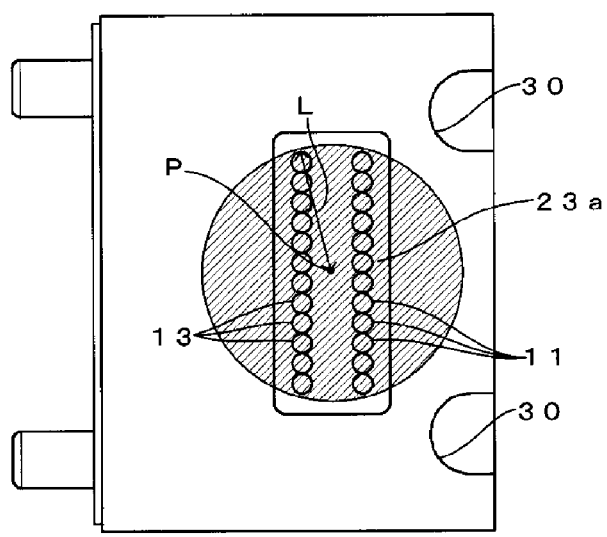
FIG. 82 is a first explanatory diagram used to describe ΔL in the thirteenth variation example according to the second embodiment.

Here, FIG. 82 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 82 is similar to that in FIG. 27.

Figure 83:
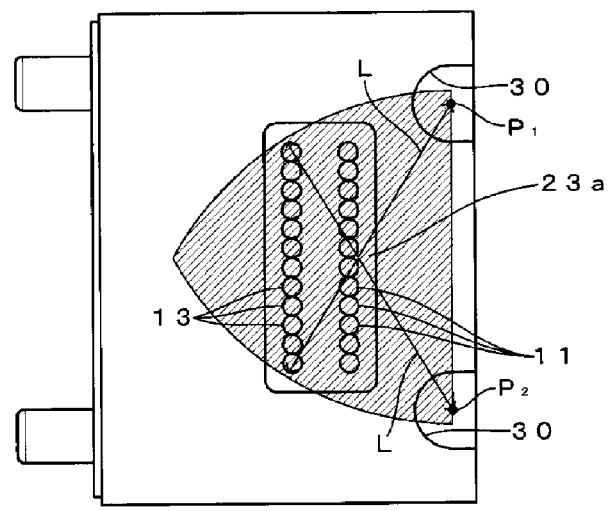
FIG. 83 is a second explanatory diagram used to describe ΔL in the thirteenth variation example according to the second embodiment.

On the other hand, FIG. 83 shows two fixed positions P$_1$ and P$_2$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions P$_1$ and P$_2$ in the present variation example. The fixed positions P$_1$ and P$_2$ in FIG. 83 are similar to those in FIG. 28.

In the present variation example as well, operational effects similar to those of the configuration shown in FIG. 19 to FIG. 21 can be achieved.

Fourteenth Variation Example

Figure 84:
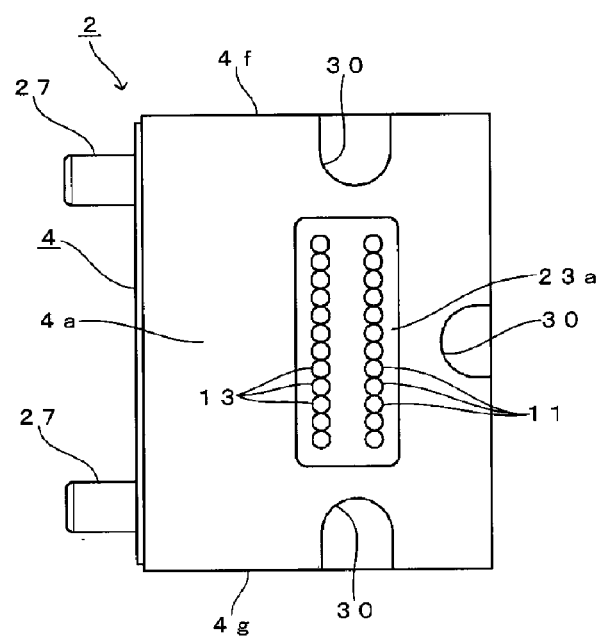
FIG. 84 is a bottom view of a fourteenth variation example according to the second embodiment.
Figure 85:
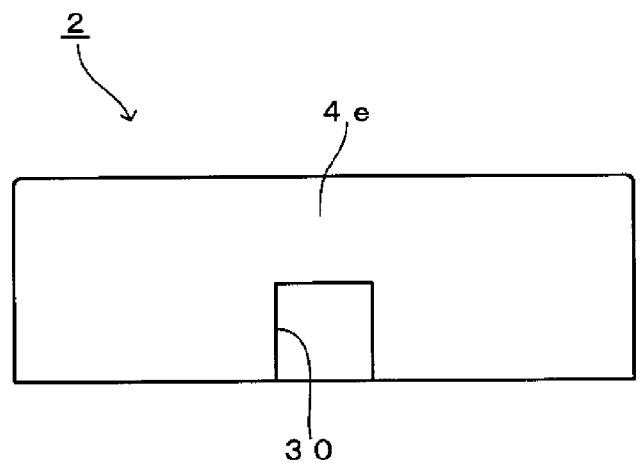
FIG. 85 is a right-side view of the fourteenth variation example according to the second embodiment.

FIG. 84 is a bottom view of a fourteenth variation example of the lens array 2. FIG. 85 is a right-side view of the lens array 2 shown in FIG. 84.

As shown in FIG. 84 and FIG. 85, the lens array 2 of the present variation example differs from the second variation example only regarding the shape of the adhesive collecting sections 30. Specifically, in a manner similar to the twelfth variation example, the planar shape is formed into a U-shape and the front-view shape is formed into a recessing surface having a square U-shape.

Figure 86:
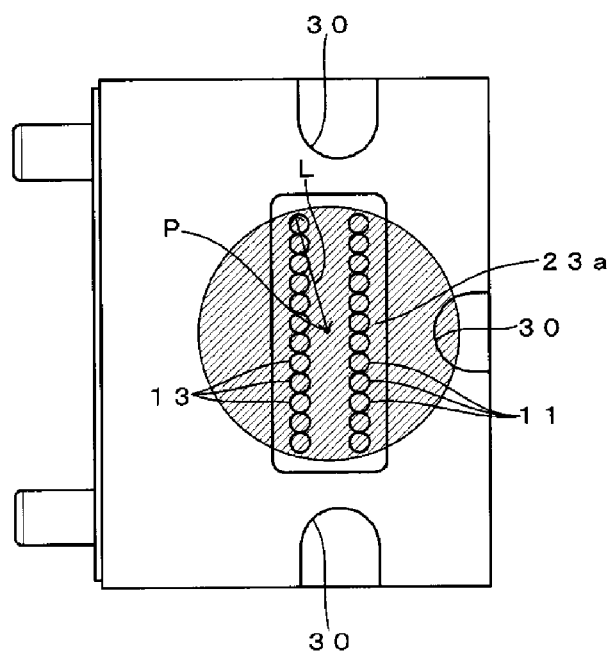
FIG. 86 is a first explanatory diagram used to describe ΔL in the fourteenth variation example according to the second embodiment.

Here, FIG. 86 shows a fixed position P in an instance in which the semiconductor substrate 6 less easily deforms as a result of temperature change than the lens array main body 4, as the fixed position on the lower end surface 4a of the lens array main body 4 when setting ΔL in expressions (1) and (2), and an area (shaded portion) corresponding with ΔL that satisfies the expressions (1) and (2) based on the fixed position P in the present variation example. The fixed position P in FIG. 86 is similar to that in FIG. 32.

Figure 87:
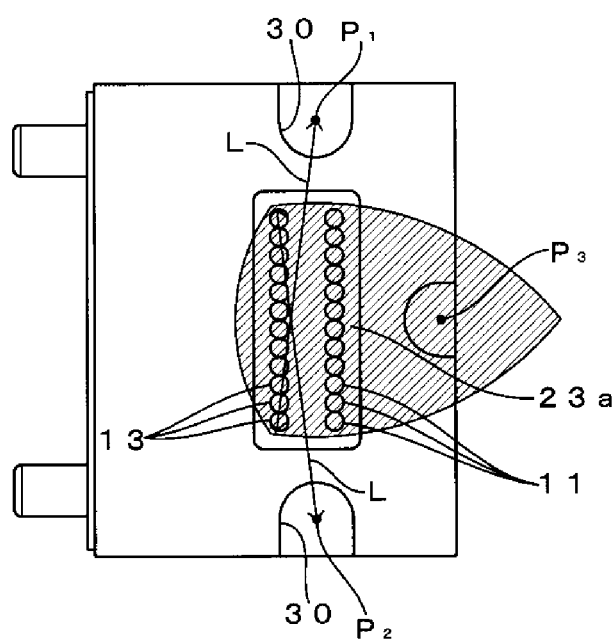
FIG. 87 is a second explanatory diagram used to describe ΔL in the fourteenth variation example according to the second embodiment.

On the other hand, FIG. 87 shows three fixed positions P$_1$, P$_2$, and P$_3$ in an instance in which the semiconductor substrate 6 more easily deforms as a result of temperature change than the lens array main body 4, as the fixed positions on the lower end surface 4a of the lens array main body 4 when setting ΔL in expressions (1) and (2), and the area (shaded portion) corresponding with ΔL that satisfies the expressions (1) and (2) based on the fixed positions P$_1$, P$_2$, and P$_3$ in the present variation example. The fixed positions P$_1$, P$_2$, and P$_3$ in FIG. 87 are similar to those in FIG. 33.

In the present variation example as well, operational effects similar to those of the configuration shown in FIG. 19 to FIG. 21 can be achieved.

The present invention is not limited to the above-described embodiments. Various modifications can be made to the extent that features of the present invention are not compromised.

For example, the adhesive collecting section 30 described in the third to eleventh variation examples according to the second embodiment can be changed to be bottomed recessing surfaces, similar to the twelfth to fourteenth variation examples, without changing the planar shape thereof. In addition, the planar shape of the adhesive collecting section 30 may be a polygon (including regular polygons) other than the shapes in the above-described variation examples, such as a hexagon.

The invention claimed is:

1. A lens array to which a photovoltaic device and a plurality of optical fibers can be attached, the photovoltaic device in which a plurality of light-emitting elements are formed in an array and at least one light-receiving element is formed that receives monitor light for monitoring light emitted from at least one of the plurality of light emitting elements, the lens array being capable of optically coupling the plurality of light-emitting elements and end faces of the plurality of optical fibers, the lens array comprising:
   a photovoltaic-device positioning structure on the lens array side that is formed on a first surface of a lens array main body to which the photovoltaic device is attached and that is used to perform positioning of the photovoltaic device when the photovoltaic device is attached;
   an optical-fiber positioning structure on the lens array side that is formed on a second surface of the lens array main body to which the plurality of optical fibers are attached and that is used to perform positioning of the plurality of optical fibers when the plurality of optical fibers are attached;
   a plurality of first lens faces that are formed on the first surface such as to be arrayed in a predetermined array direction corresponding with the plurality of light-emitting elements and into which the light emitted from each of the plurality of light-emitting elements enters;
   a plurality of second lens faces that are formed on the second surface such as to be arrayed along a predetermined direction corresponding with the end faces of the plurality of optical fibers and that emit the light of each of the plurality of light-emitting elements that has entered each of the plurality of first lens faces towards the end faces of the plurality of optical fibers, the number of second lens faces being the same as the number of first lens faces;
   at least one third lens face that is formed on the first surface and that emits the monitor light that has entered from an inner side of the lens array main body towards the light-receiving element; and
   a light control section that is disposed such as to be positioned on an optical path connecting the first lens faces and the second lens faces and an optical path connecting the first lens faces and the third lens face in the lens array main body, the light control section into which the light of each of the plurality of light-emitting elements that has entered the plurality of first lens faces enters, the light control section performing control such as to reflect the incident light of each of the plurality of light-emitting elements at a predetermined reflection factor and advance the light towards the third lens face side, and transmit the incident light at a predetermined transmission factor and advance the light towards the second lens face side, during which the light control section reflects at least the light from one of the plurality of light-emitting elements as the monitor light, wherein
   as the photovoltaic device, a photovoltaic device is attached that includes a photovoltaic-device positioning structure on the photovoltaic device side that engages with the photovoltaic-device positioning structure on the lens array side during positioning thereof,
   as the optical fibers, optical fibers are attached that include an optical-fiber positioning structure on the optical fiber side that engages with the optical-fiber positioning structure on the lens array side during positioning thereof, and
   together with the photovoltaic device and the optical fibers, the lens array satisfies a following conditional expression (1):

$$a+b+d_1+e+\Delta L \leq W_1 \tag{1}$$

where,
   a: positional accuracy [μm] of the first lens faces
   b: positional accuracy [μm] of the second lens faces $d_1$: positional accuracy [μm] of the light-emitting elements of the photovoltaic device e: positional accuracy [μm] of the optical fibers ΔL: amount of change [μm] in lens position as a result of temperature change expressed by a following expression:

ΔL=α×ΔT×L (where, α: coefficient of linear expansion [1/° C.] of the lens array main body; ΔT: temperature change [° C.] in the lens array main body; and L: distance [mm] between a fixed position on the first surface and a position of a lens face on the first surface farthest from the fixed position)

$W_1$: first tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements thereof and the end faces of the optical fibers indicates a maximum efficiency set in advance to an attachment position at which a reduction in optical coupling efficiency equivalent to 2 dB from the maximum efficiency is indicated.

2. The lens array according to claim 1, wherein:
together with the photovoltaic device and the optical fibers, the lens array further satisfies a following conditional expression (2):

$$a+c+d_1+d_2+\Delta L \leq W_2 \quad (2)$$

where, c: positional accuracy [μm] of the third lens face $d_2$: positional accuracy [μm] of the light-receiving element of the photovoltaic device $W_2$: second tolerance [μm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements and the light-receiving element thereof indicates a maximum efficiency set in advance to an attachment position at which a reduction in optical coupling efficiency equivalent to 2 dB from the maximum efficiency is indicated.

3. The lens array according to claim 2, wherein:
the photovoltaic-device positioning structure on the lens array side is formed into a circular hole, a circular through hole, or a circular pin; and as the photovoltaic device, a photovoltaic device can be attached that includes a photovoltaic-device positioning structure on the photovoltaic device side that is formed into a circular pin, a circular hole, or a circular through hole capable of engaging with the photovoltaic-device positioning structure on the lens array side.

4. The lens array according to claim 1, wherein:
the photovoltaic-device positioning structure on the lens array side is formed into a circular hole, a circular through hole, or a circular pin; and as the photovoltaic device, a photovoltaic device can be attached that includes a photovoltaic-device positioning structure on the photovoltaic device side that is formed into a circular pin, a circular hole, or a circular through hole capable of engaging with the photovoltaic-device positioning structure on the lens array side.

5. The lens array according to claim 1, wherein:
the optical-fiber positioning structure on the lens array side is formed into a circular pin, a circular hole, or a circular through hole; and as the plurality of optical fibers, optical fibers can be attached that includes an optical-fiber positioning structure on the optical fiber side that is formed into a circular hole, a circular through hole, or a circular pin capable of engaging with the optical-fiber positioning structure on the lens array side.

6. The lens array according to claim 1, wherein:
as the photovoltaic device, a photovoltaic device is attached in which the light-receiving elements are formed along the array direction of the light-emitting elements, the number of light-receiving elements being the same as the number of light-emitting elements; and the third lens faces are formed in an array along the array direction of the first lens faces, the number of third lens faces being the same as the number of first lens faces and the number of second lens faces.

7. The lens array according to claim 1, wherein:
the light control section includes a recessing section that is formed in a recessing manner in the lens array main body and into which the light of each of the plurality of light-emitting elements that has entered the plurality of first lens faces enters, a prism that is disposed within a space formed by the recessing section and forms an optical path for the light of each of the plurality of light-emitting elements that advances towards the second lens face side after entering the recessing section, and a reflective/transmissive layer that is disposed in a position within the space formed by the recessing section on an upstream side in an advancing direction of the light of each of the plurality of light-emitting elements in relation to the prism, and reflects the light of each of the plurality of light-emitting elements that has entered the recessing section at the predetermined reflection factor towards the third lens face side and transmits the light of each of the plurality of light-emitting elements that has entered the recessing section at the predetermined transmission factor towards the prism side, during which the reflective/transmissive layer reflects at least the light from one of the plurality of light-emitting elements as the monitor light.

8. A lens array to which a photovoltaic device and a plurality of optical fibers can be attached, the photovoltaic device in which a plurality of light-emitting elements are formed in an array and at least one light-receiving element is formed that receives monitor light for monitoring light emitted from at least one of the plurality of light emitting elements, the lens array being capable of optically coupling the plurality of light-emitting elements and end faces of the plurality of optical fibers, the lens array comprising:

an optical-fiber positioning structure on the lens array side that is formed on a second surface of the lens array main body to which the plurality of optical fibers are attached and that is used to perform positioning of the plurality of optical fibers when the plurality of optical fibers are attached;

a plurality of first lens faces that are formed on a first surface of the lens array main body to which the photovoltaic device is attached, such as to be arrayed in a predetermined array direction corresponding with the plurality of light-emitting elements and into which the light emitted from each of the plurality of light-emitting elements enters;

a plurality of second lens faces that are formed on the second surface such as to be arrayed along a predetermined direction corresponding with the end faces of the plurality of optical fibers and that emit the light of each of the plurality of light-emitting elements that has entered each of the plurality of first lens faces towards the end faces of the plurality of optical fibers, the number of second lens faces being the same as the number of first lens faces;

at least one third lens face that is formed on the first surface and that emits the monitor light that has entered from an inner side of the lens array main body towards the light-receiving element; and a light control section that is disposed such as to be positioned on an optical path connecting the first lens faces and the second lens faces and an optical path connecting the first lens faces and the third lens face in the lens array main body, the light control section into which the light of each of the plurality of light-emitting elements that has entered the plurality of first lens faces enters, the light control section performing control such as to reflect the incident light of each of the plurality of light-emitting elements at a predetermined reflection factor and advance the light towards the third lens face side, and transmit the incident light at a predetermined transmission factor and advance the light towards the second lens face side, during which the light control section reflects at least the light from one of the plurality of light-emitting elements as the monitor light, wherein the photovoltaic device is attached by positioning performed by an alignment operation, as the optical fibers, optical fibers are attached that include an optical-fiber positioning structure on the optical fiber side that engages with the optical-fiber positioning structure on the lens array side during positioning thereof, and together with the photovoltaic device and the optical fibers, the lens array satisfies a following conditional expression (1):

$$a+b+d_1+e+\Delta L \leq W_1 \quad (1)$$

where, a: positional accuracy [µm] of the first lens faces
b: positional accuracy [µm] of the second lens faces
$d_1$: positional accuracy [µm] of the light-emitting elements of the photovoltaic device
e: positional accuracy [µm] of the optical fibers
$\Delta L$: amount of change [µm] in lens position as a result of temperature change expressed by a following expression:
$\Delta L = \alpha \times \Delta T \times L$ (where, $\alpha$: coefficient of linear expansion [1/° C.] of the lens array main body; $\Delta T$: temperature change [° C.] in the lens array main body; and L: distance [mm] between a fixed position on the first surface and a position of a lens face on the first surface farthest from the fixed position)
$W_1$: first tolerance [µm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements thereof and the end faces of the optical fibers indicates a maximum efficiency set in advance to an attachment position at which a reduction in optical coupling efficiency equivalent to 2 dB from the maximum efficiency is indicated.

9. The lens array according to claim 8, wherein:

together with the photovoltaic device and the optical fibers, the lens array further satisfies a following conditional expression (2):

$$a+c+d_1+d_2+\Delta L \leq W_2 \quad (2)$$

where, c: positional accuracy [µm] of the third lens face
$d_2$: positional accuracy [µm] of the light-receiving element of the photovoltaic device
$W_2$: second tolerance [µm]: a distance between an attachment position before movement and an attachment position after movement, under a premise that the photovoltaic device is moved along a direction perpendicular to an optical axis of the first lens faces from an attachment position to the lens array main body at which optical coupling efficiency between the light-emitting elements and the light-receiving element thereof indicates a maximum efficiency set in advance to an attachment position at which a reduction in optical coupling efficiency equivalent to 2 dB from the maximum efficiency is indicated.

10. The lens array according to claim 8, wherein:

the optical-fiber positioning structure on the lens array side is formed into a circular pin, a circular hole, or a circular through hole; and as the plurality of optical fibers, optical fibers can be attached that includes an optical-fiber positioning structure on the optical fiber side that is formed into a circular hole, a circular through hole, or a circular pin capable of engaging with the optical-fiber positioning structure on the lens array side.

11. The lens array according to claim 8, wherein:

as the photovoltaic device, a photovoltaic device is attached in which the light-receiving elements are formed along the array direction of the light-emitting elements, the number of light-receiving elements being the same as the number of light-emitting elements; and the third lens faces are formed in an array along the array direction of the first lens faces, the number of third lens faces being the same as the number of first lens faces and the number of second lens faces.

12. The lens array according to claim 8, wherein:

the light control section includes a recessing section that is formed in a recessing manner in the lens array main body and into which the light of each of the plurality of light-emitting elements that has entered the plurality of first lens faces enters, a prism that is disposed within a space formed by the recessing section and forms an optical path for the light of each of the plurality of light-emitting elements that advances towards the second lens face side after entering the recessing section, and a reflective/transmissive layer that is disposed in a position within the space formed by the recessing section on an upstream side in an advancing direction of the light of each of the plurality of light-emitting elements in relation to the prism, and reflects the light of each of the plurality of light-emitting elements that has entered the recessing section at the predetermined reflection factor towards the third lens face side and transmits the light of each of the plurality of light-emitting elements that has entered the recessing section at the predetermined transmission factor towards the prism side, during which the reflective/transmissive layer reflects at least the light from one of the plurality of light-emitting elements as the monitor light.

13. An optical module comprising:
a lens array according to claim 1; and
a photovoltaic device corresponding with the lens array.

14. An optical module comprising:
a lens array according to claim 2; and
a photovoltaic device corresponding with the lens array.

15. An optical module comprising:
a lens array according to claim 4; and
a photovoltaic device corresponding with the lens array.

16. An optical module comprising:
a lens array according to claim 8; and
a photovoltaic device corresponding with the lens array.

17. An optical module comprising:
a lens array according to claim 9; and
a photovoltaic device corresponding with the lens array.

18. An optical module comprising:
a lens array according to claim 3; and
a photovoltaic device corresponding with the lens array.

* * * * *